(12) United States Patent
Mitchelmore et al.

(10) Patent No.: US 10,717,655 B2
(45) Date of Patent: *Jul. 21, 2020

(54) METHOD OF PRODUCTION OF A SILICA CONCENTRARE

(71) Applicant: GEO40 LIMITED, Taupo (NZ)

(72) Inventors: Andrew W. Mitchelmore, Taupo (NZ); Michael T. O'Sullivan, Taupo (NZ); John Lea, Taupo (NZ)

(73) Assignee: GEO40 Limited, Taupo (NZ)

( * ) Notice: Subject to any disclaimer, the term of this patent is extended or adjusted under 35 U.S.C. 154(b) by 174 days.

This patent is subject to a terminal disclaimer.

(21) Appl. No.: 15/737,178

(22) PCT Filed: Jun. 20, 2016

(86) PCT No.: PCT/NZ2016/050099
§ 371 (c)(1),
(2) Date: Dec. 15, 2017

(87) PCT Pub. No.: WO2016/204633
PCT Pub. Date: Dec. 22, 2016

(65) Prior Publication Data
US 2019/0144288 A1 May 16, 2019

(30) Foreign Application Priority Data
Jun. 19, 2015 (NZ) ........................ 709307

(51) Int. Cl.
*C01B 33/14* (2006.01)
*C02F 1/44* (2006.01)
(Continued)

(52) U.S. Cl.
CPC ............ *C01B 33/14* (2013.01); *B01D 61/025* (2013.01); *B01D 61/142* (2013.01);
(Continued)

(58) Field of Classification Search
CPC ...... C01B 33/14; B01J 13/0013; C02F 1/441; C02F 1/444; C02F 2101/10;
(Continued)

(56) References Cited

U.S. PATENT DOCUMENTS 3,969,266 A  7/1976 Iler
4,141,825 A  2/1979 Conger
(Continued)

FOREIGN PATENT DOCUMENTS

CN  104692554 A  6/2015
EP  0396242  11/1990
(Continued)

OTHER PUBLICATIONS

Harper et al. (1992) "Towards the efficient utilization of geothermal resources," Geothermics 21:5/6; pp. 641-651.
(Continued)

*Primary Examiner* — Anthony J Zimmer
(74) *Attorney, Agent, or Firm* — FisherBroyles, LLP; Cara L. Crowley-Weber

(57) ABSTRACT

The invention relates to methods of production of a silica concentrate from geothermal fluids. More particularly, although not exclusively, the invention relates to the production of a colloidal silica concentrate, colloidal silica or precipitated silica from high temperature geothermal fluids by ultrafiltration to produce size-specific silica colloids and step-wise concentration of silica to avoid precipitation or gelling.

20 Claims, 18 Drawing Sheets

(51) Int. Cl.

| | | |
|---|---|---|
| *B01D 61/02* | (2006.01) | |
| *B01D 61/14* | (2006.01) | |
| *B01D 61/58* | (2006.01) | |
| *B01D 63/10* | (2006.01) | |
| *B01J 13/00* | (2006.01) | |
| *B01D 63/06* | (2006.01) | |
| *C02F 103/06* | (2006.01) | |
| *C02F 101/10* | (2006.01) | |

(52) U.S. Cl.
CPC .......... *B01D 61/145* (2013.01); *B01D 61/58* (2013.01); *B01D 63/06* (2013.01); *B01D 63/10* (2013.01); *B01J 13/0013* (2013.01); *C02F 1/441* (2013.01); *C02F 1/444* (2013.01); *B01D 2311/06* (2013.01); *B01D 2311/25* (2013.01); *B01D 2311/2642* (2013.01); *B01D 2315/16* (2013.01); *C01P 2002/01* (2013.01); *C01P 2004/52* (2013.01); *C01P 2004/64* (2013.01); *C02F 2101/10* (2013.01); *C02F 2103/06* (2013.01)

(58) Field of Classification Search
CPC ... C02F 2103/06; B01D 63/06; B01D 61/145; B01D 63/10; B01D 61/58; B01D 61/142; B01D 61/025; B01D 2311/25; B01D 2315/16; B01D 2311/2642; B01D 2311/06; C01P 2004/64; C01P 2004/52; C01P 2002/01
See application file for complete search history.

(56) References Cited

U.S. PATENT DOCUMENTS

| | | |
|---|---|---|
| 4,437,995 A | 3/1984 | Rex |
| 5,200,165 A | 4/1993 | Harper |
| 5,595,717 A | 1/1997 | Harper et al. |
| 6,372,089 B1 | 4/2002 | Keiser et al. |
| 6,372,806 B1 | 4/2002 | Keiser et al. |
| 6,537,457 B1 | 3/2003 | Mukhopadhyay |
| 2004/0079700 A1 | 4/2004 | Wood |
| 2005/0061149 A1 | 3/2005 | Nieuwenhuizen et al. |
| 2008/0290033 A1 | 11/2008 | Kimball et al. |
| 2009/0008334 A1 | 1/2009 | Schoen et al. |
| 2009/0173692 A1 | 7/2009 | Laraway et al. |
| 2010/0032375 A1 | 2/2010 | Jagannathan et al. |
| 2011/0163031 A1 | 7/2011 | Kimball et al. |
| 2012/0055875 A1 | 3/2012 | Lien |
| 2013/0126174 A1 | 3/2013 | Henson et al. |
| 2014/0286847 A1 | 9/2014 | Bourcier |
| 2015/0158748 A1 | 6/2015 | Karlapudi |

FOREIGN PATENT DOCUMENTS

| | | |
|---|---|---|
| JP | S57-21981 | 2/1982 |
| JP | 58190816 A | 11/1983 |
| JP | 11-662 | 1/1999 |
| JP | 2005-522311 | 7/2005 |
| WO | 19970041954 A1 | 11/1997 |
| WO | 2002-026362 | 4/2002 |
| WO | 2003-084645 | 10/2006 |
| WO | 2009-079047 | 6/2009 |
| WO | 2015-178783 | 5/2015 |

OTHER PUBLICATIONS

Iler, R.K. (1979) "The Chemistry of Silica," John Wiley & Sons, New York. Ch 1, pp. 1-14.

Sears, G. W (1956) "Determination of Specific Surface Area of Colloidal Silica by Titration with Sodium Hydroxide," Analytical Chemistry, vol. 28:12; pp. 1981-1983.

International Search Report and Written Opinion, PCTNZ2016050099, dated Sep. 2, 2016.

EP Supplementary Search Report from EP App No. 16812024 dated Jan. 29, 2019.

Extended European Search Report from EP 15795667.3 dated Nov. 7, 2017.

Guerra et al. (2012) "pH Modifications for Silica Control in Geothermal Fluids" pp. 1-9 XP055418083, Retrieved from the Internet: URL:http://www.os.is/ gogn/unu-gtp-sc/UNU-GTP-SC-14-39.pdf.

International Preliminary Examination Report on Patentability from PCT/NZ2016/050026 dated Jul. 4, 2017.

International Preliminary Examination Report on Patentability from PCT/NZ2015/050064 dated Sep. 13, 2016.

Ning (2002) "Discussion of silica speciation, fouling, control and maximum reduction" Desalination 151:67-73.

Tomaszewska et al. (2012) "Desalination of Geothermal Waters Using a Hybrid UF-RO Process Part I" Boron Removal in Pilot-Scale Tests Desalination 319:99-106.

Tomaszewska et al. (2013) "Desalination of Geothermal Waters Using a Hybrid UF-RO Process Part II" Membrane Scaling after Pilot-Scale Tests Desalination 319:107-114.

Stöber et al. (1968) "Controlled Growth of Monodisperse Silica Spheres in the Micron Size Range" J. Colloid and Interface Science 26:62-69.

METHOD OF PRODUCTION OF A SILICA CONCENTRARE

FIELD

The invention relates to methods of production of a silica concentrate from geothermal fluids. More particularly, although not exclusively, the invention relates to the production of a colloidal silica concentrate or precipitated silica from high temperature geothermal fluids.

BACKGROUND

Geothermally heated fluid has historically been used for direct heating but has more recently been harnessed to produce electricity. Electricity generated through geothermal power stations has been shown to be reliable, sustainable and environmentally friendly. Since geothermal power requires no fuel (except for running pumps in some power stations) it is insulated from fossil fuel cost fluctuations and dependencies. Geothermal power production also has significantly lower emissions of greenhouse gases when compared to fossil fuel electricity production methods and therefore has the potential to help mitigate global warming if widely deployed in place of fossil fuels.

One major advantage over other renewable energy sources such as wind or solar is that geothermal power does not suffer from the intermittent supply inherent in these methods. As a result, it also reduces the need for energy storage capabilities. Despite the traditional limitations of geothermal power plants requiring near-surface geothermal activity, recent advances in technology have dramatically expanded the scope of areas which can support geothermal power production.

Geothermal electricity is mainly produced via two methods. The first method produced from flash steam power plants is generally employed in areas with high temperature geothermal fluids and involves "flashing" the geothermal fluid. This involves passing the high-pressure fluid into lower-pressure tanks to result in the separation of the fluid into steam and separated geothermal water (SGW). The resulting steam is used to drive turbines while the SGW is either re-injected into the ground or passed into a single stage binary cycle plant where further electricity is extracted from the SGW. The second method of electricity generation is through use of a two stage binary cycle power station. These plants involve the separating of steam and SGW in a flash plant with both the geothermal fluid and the steam being passed through different heat exchangers and used to vaporise a low boiling point secondary fluid (typically pentane) which in turn drives a turbine for electricity production. Again, the cooled geothermal fluid is typically re-injected or passed into above-ground watercourses. Binary cycle power stations are able to operate with much cooler initial geothermal fluid temperatures.

Geothermal fluids contain a number of ionic species and particulate matter originating from rocks in the earth's crust. When energy is extracted from the geothermal source stream, the reduction in temperature causes a decrease in solubility of a number of dissolved species which can lead to their precipitation. This process of precipitation can be beneficial when used to extract the dissolved species. However, if too much heat is extracted, the dissolved species will precipitate out of solution in an uncontrolled manner leading to scaling and fouling of pipes, watercourses and other equipment. In addition, where geothermal fluids are re-injected into the ground, precipitation of species around the re-injection site can result in underground blockages and reduction in flow. Geothermal sources differ in the concentrations of dissolved species depending on geological composition. However, the precipitation problem is a major limitation preventing effective use and energy recovery from geothermal sources. Enabling further energy recovery from existing geothermal sources would have major economic benefits and assist in the movement away from fossil fuel power.

A significant component of the geothermal fluid is silica (silicon dioxide). Extraction of silica is desirable to avoid the precipitation problems described above during energy recovery. One study estimates that 25% more power could be generated from exploitable geothermal resources if silica could be successfully extracted (Harper et al. 1992). In addition, precipitated silica and colloidal silica are valuable commodities in their own right with a range of industrial applications.

Prior to precipitation, silica particles form by spontaneous nucleation of the parent monomeric silicic acid species. These monomers subsequently grow by polymerization to form polymeric primary silica particles which attain a physical dimension of about 1.5 nm (Harper, 1997—U.S. Pat. No. 5,595,717A). These particles can either grow by acquiring more monomers to form a colloid, or the particles can aggregate leading to formation of a gelatinous substance known as silica gel. Silica colloids are simply large silica polymers that naturally take on a spherical shape due to surface forces. A ten nanometre colloid contains approximately 15,000 silica molecules. Depending on the conditions and presence of certain coagulants, silica particles may precipitate out of solution as a solid to form a suspension.

Colloidal silica is most often prepared in a multi-step process from sodium silicate. The general principle is to remove sodium from sodium silicate via cation exchange. Without the sodium, polymerization takes place and particles begin to grow. An alkali-silicate solution is partially neutralized which leads to the formation of silica nuclei in the range of 1 to 5 nm. Initial acidification of a sodium silicate solution yields $Si(OH)_4$. The pH is kept slightly on the alkaline side of neutral to ensure that the subunits stay separated and colloidal silica gradually grows. The colloidal suspension is stabilized by pH adjustment and then concentrated, usually by evaporation. The maximum concentration obtainable depends on the particle size. For example, 50 nm particles can be concentrated to greater than 50 m % solids while 10 nm particles can only be concentrated to approximately 30 m % solids before the suspension becomes too unstable.

It is an object of the invention to provide a method of producing a colloidal silica concentrate and/or precipitated silica from a geothermal fluid, or at least to provide the public with a useful choice.

BRIEF SUMMARY

The invention provides a method of producing a colloidal silica concentrate from a geothermal fluid comprising silica, the method comprising:
a. cooling a geothermal fluid from an initial temperature to a nucleation temperature between 25-700° C. to initiate silica colloid growth and produce a UF feed;
b. passing the UF feed to at least one UF unit to yield a UF retentate and a UF filtrate;
wherein the UF retentate comprises a colloidal silica concentrate with a mean silica colloid size of between 2 and 10 nm.

In a first aspect, the invention provides a method of producing a colloidal silica concentrate from a geothermal fluid comprising silica, the method comprising:
a. cooling a geothermal fluid from an initial temperature of over about 85° C. to a nucleation temperature between about 25° C. and about 70° C. to initiate silica colloid growth;
b. curing the geothermal fluid after cooling to produce an ultrafiltration (UF) feed with a mean silica colloid size of between about 3 nm and about 8 nm;
c. treating the UF feed using ultrafiltration to yield a U F retentate;
d. diafiltering the UF retentate during or after ultrafiltration to produce a colloidal silica concentrate.

Preferably the size of the silica colloid particles in the colloidal silica concentrate has a standard deviation of less than 5 nm or a polydispersity index of less than 1.5. Preferably the size of the silica colloid particles have a coefficient of variation of less than or equal to 20%.

Preferably ultrafiltration occurs in a first UF unit which operates continuously to concentrate the silica.

Preferably the method of producing a colloidal silica concentrate includes further steps prior to step a. comprising:
i. determining the pH of the fluid;
ii. if the pH of the fluid lies outside an optimum range, adjusting the pH to be within the optimum range.

Preferably, the optimum pH range is between 7 and 10. More preferably, the optimum pH range is between 7 and 9.5. More preferably, the optimum pH range is between 8 and 9. Preferably, the pH is adjusted to at least 7.5, at least 8.0, at least 8.5, at least 9.0, or at least 9.5. Preferably the pH is adjusted to approximately 7.5, 8.0, 8.5, 9.0, 9.5 or 10.0.

Preferably the pH of the geothermal fluid is adjusted to between about pH7.5 and pH8.6 or between about 8.0 and about 8.5.

Preferably, the nucleation temperature is between about 30-40° C., 30-50° C., 30-60° C., approximately 30° C., 40° C., 50° C., 60° C. or 70° C. In particular embodiments, the step of cooling a geothermal fluid from an initial temperature of over 85° C. to a nucleation temperature occurs in a period of less than about 30 seconds, less than about 20 seconds or less than about 10 seconds. Preferably the step of cooling a geothermal fluid from an initial temperature of over 85° C. to a nucleation temperature occurs substantially continuously.

In one embodiment, the method further comprises pressurising the system for cooling the geothermal fluid to a pressure greater than the saturation pressure of the geothermal fluid at the fluid temperature.

Preferably the silica saturation index (551) achieved during nucleation is at least 1.5, more preferably at least 2, at least 3 or most preferably at least 4.

Preferably, the method of producing a colloidal silica concentrate comprises the step of curing the geothermal fluid by holding the geothermal fluid after cooling at the nucleation temperature for a curing period to produce a desired colloidal silica concentrate having a desired mean colloid size. Preferably, the temperature of the fluid during curing is maintained at the nucleation temperature.

Preferably, the method of producing a colloidal silica concentrate does not include the dosing of a dispersant.

Preferably, the curing period is sufficient to produce a colloidal silica concentrate with a mean colloid size of between about 3 nm and 8 nm. Preferably, the curing period is between about 1 minute and 2 hours, or between 10 minutes and 2 hours. More preferably, the curing period is between about 10 minutes and 40 minutes, more preferably between 15 minutes and 35 minutes. In one embodiment, the curing period is between 20 and 30 minutes or is at least 20 minutes.

Preferably, a "seed" colloid in the range from about 3 nm to 8 nm or 4 nm to 8 nm is produced by cooling the geothermal fluid to a nucleation temperature of between 25 and 50° C. or between 25 and 40° C. and using a curing time of from 15 minutes to 40 minutes. More preferred is to use a nucleation temperature of approximately 30-35° C. in combination with a curing time of 15 minutes to 40 minutes. To provide a more monodisperse "seed" of approximately 5-6 nm, it is preferable to use a nucleation temperature of approximately 25-35° C. in combination with a curing time of 20 to 30 minutes.

In alternative embodiments, the curing time is greater than about 5 minutes, greater than 10 minutes, greater than 15 minutes, greater than 30 minutes, greater than 1 hour, greater than 2 hours.

Alternatively, the curing period may be less than about 2 hours, less than 1 hour, less than 30 minutes, less than 15 minutes, approximately 5 minutes, approximately 10 minutes, approximately 15 minutes, approximately 20 minutes, approximately 30 minutes, approximately 45 minutes, approximately 1 hour or approximately 2 hours.

Preferably the UF retentate comprises a silica concentration of between about 1 m % and about 15 m %.

Preferably ultrafiltration according to the first aspect comprises two or more ultrafiltration steps.

Preferably, a first UF retentate produced by a first UF unit is further concentrated at a second or further UF unit to yield a second or further UF retentate.

Preferably the UF retentate or the first UF retentate comprises between about 1 m % and about 7 m % silica, more preferably between about 2 m % and about 5 m % silica. In one embodiment, the ultrafiltration of the first aspect comprises a first ultrafiltration step to yield a first UF retentate and a second ultrafiltration step to yield a second UF retentate, wherein the second UF retentate comprises a colloidal silica concentration of between about 8 m % and 15 m %.

Preferably, the silica concentration of the first U F retentate is selected from the group consisting of between about 0.5 m % and 5 m %, between 1 m % and 4 m %, between 1.5 m % and 3 m %, greater than 0.1 m %, greater than 0.5 m %, greater than 1 m %, greater than 1.5 m %, greater than 2 m %, greater than 5 m %, greater than 10 m %, greater than 15 m %, between 0.1 m % and 15 m %, approximately 0.5 m %, approximately 1 m %, approximately 1.5 m %, approximately 2 m %, approximately 3 m %, approximately 4 m %, approximately 5 m %, or approximately 10 m %.

Preferably the second UF retentate comprises silica colloids with a particle size of between 3 nm and 8 nm.

Preferably, the second or further UF produces a second or further UF retentate of at least 10 m %.

Preferably, the second or further UF produces a UF retentate wherein the silica concentration is selected from the group consisting of between 2 m % and 15 m %, between 5 m % and 12 m %, greater than 2 m %, greater than 5 m %, greater than 10 m %, between 2 m % and 50 m %, approximately 10 m %, approximately 20 m %, approximately 30 m %, approximately 40 m % and approximately 50 m %.

Preferably the first ultrafiltration unit comprises a spiral wound ultrafiltration membrane. Preferably the second UF unit comprises a spiral wound membrane. Preferably the UF membrane used to concentrate to 15 m % is a spiral wound UF membrane.

Preferably a first UF filtrate is yielded by a first ultrafiltration step. Preferably the first UF filtrate comprises a silica concentration of less than about 300 ppm.

Preferably the method of producing a colloidal silica concentrate includes a further step comprising diafiltering the UF retentate with a diafiltration stream to reduce the concentration of undesirable ions or impurities (salts). Preferably the step of diafiltering the first or further UF retentate reduces salt content to less than 600 ppm salts. Preferably the concentration of salts in the UF retentate is reduced to less than S00 ppm, more preferably less than 400 ppm. Preferably the diafiltration stream comprises a liquid with a lower concentration of ions or impurities than the UF retentate. More preferably, the diafiltration stream comprises a reverse osmosis permeate received from a reverse osmosis unit. Preferably the UF retentate is diafiltered prior to the colloidal silica concentration reaching about 2 m %, more preferably prior to it reaching about 5 m %.

In one embodiment, diafiltration is carried out to reduce the salts concentration of a first or further UF retentate to a level of less than 0.7 mS/cm.

Preferably diafiltration is carried out using at least 3 times the amount of diafiltration fluid compared to the amount of UF retentate. In one embodiment, between 3 and 10 times the amount of diafiltration fluid is used compared to the amount of UF retentate.

In one embodiment the invention provides a method of producing a colloidal silica concentrate of between about 15 m % and about 50 m % from a geothermal fluid comprising silica, the method comprising:
 a. cooling a geothermal fluid from an initial temperature of over 85° C. to a nucleation temperature of between about 25° C. and about 70° C. to initiate silica colloid growth;
 b. curing the geothermal fluid after cooling for a curing period sufficient to produce an ultrafiltration (UF) feed with a mean silica colloid size of between about 3 nm and about 8 nm;
 c. passing the UF feed to at least one UF unit to yield a first UF retentate;
 d. diafiltering the first UF retentate to produce a second UF feed;
 e. passing the second UF feed to a second UF unit to yield a second UF retentate;
 f. heat curing the second UF retentate, wherein heat curing comprises heating the UF retentate to a temperature and for a period sufficient to produce a colloidal silica concentrate with a mean silica colloid size of between about 8 nm and about 25 nm;
 g. passing the heat cured second UF retentate to a third or further UF unit to yield a colloidal silica concentrate.

Preferably the method of producing a colloidal silica concentrate according to the first aspect further comprises a step of heat curing the UF retentate, wherein heat curing comprises heating the UF retentate to a heat curing temperature for a heat curing period to increase the mean silica colloid size. Preferably heat curing is undertaken after at least the second UF step.

Preferably the heat curing temperature is from 90° C. to 200° C. and the colloid size in the colloidal silica concentrate is from 5 nm to 120 nm, or from 5 nm to 50 nm. In other embodiments, the heat curing temperature is approximately 200° C., approximately 180° C., approximately 160° C., approximately 150° C., approximately 140° C., approximately 130° C., approximately 120° C., approximately 110° C., approximately 100° C., approximately 95° C., approximately 97° C. or approximately 90° C., from 95° C. to 125° C., from 93° C. to 98° C., from 95° to 100°, from 100° to 110°, from 93° to 100°, from 105° to 115°, from 107° to 113° C., or from 80° C. to 115° C.

Preferably, the heat curing time is sufficient to produce a colloidal silica concentrate with a mean silica colloid size of between 8 nm and 25 nm or between 8 nm and 13 nm. Preferably the heat curing period is between 10 and 50 hours, between 20 and 40 hours, or between 25 and 35 hours.

The colloid size varies according to the heat curing temperature and the heat curing period. In particular embodiments the colloid size in the colloidal silica concentrate is from 6 to 30 nm, more preferably approximately 5 nm, 8 nm, 10 nm, 12 nm, 15 nm, 20 nm, 25 nm or 50 nm, 75 nm, 100 nm, 120 nm. In one embodiment, the heat curing increases the mean silica colloid size to between 8 and 12 nm.

In one particular embodiment, the method of producing a colloidal silica concentrate according to the first aspect further comprises a step of heat curing the UF retentate, wherein heat curing comprises heating the UF retentate to between 80° C. and 180° C. for a heat curing period sufficient to obtain a mean silica colloid size in the colloidal silica concentrate of between 8 and 30 nm. Preferably the colloid particles have a standard deviation of less than 5 nm or a polydispersity index of less than 1.5. Preferably, the polydispersity index is less than 1.2. Preferably the colloid particles have a coefficient of variation of less than or equal to 25%.

In another particular embodiment, the method of producing a colloidal silica concentrate according to the first aspect further comprises a step of heat curing the UF retentate, wherein heat curing comprises heating the UF retentate to between 80° C. and 115° C. for a heat curing period of between 20 and 40 hours and the mean silica colloid size in the colloidal silica concentrate increases to between 8 and 12 nm.

Preferably the colloid particles have a standard deviation of less than 5 nm or a polydispersity index of less than 1.5. Preferably, the polydispersity index is less than 1.2. Preferably the colloid particles have a coefficient of variation of less than or equal to 20%.

Preferably heat curing further comprises pressurisation of the first or further UF retentate. Preferably the heat curing pressure is atmospheric pressure, at least 1.5 bar, at least 1.8 bar, from 1 bar to 4 bar, more preferably approximately 1.5 bar, 2 bar, 2.5 bar or 3 bar. Pressure may be autogenous or induced.

Preferably the step of heat curing the UF retentate further comprises the step of adding a growth colloid to the seed colloid, wherein the growth colloid is smaller than the seed colloid. Preferably, the seed fluid comprises silica colloids of between 4-10 nm, more preferably between 5-8 nm. Preferably, the seed fluid has colloidal silica concentration of from 2-15 m %, more preferably from 5-10 m %.

Preferably the growth fluid comprises silica colloids of approximately 2-10 m % and a colloid size of approximately 3-5 nm.

In one embodiment of the first aspect the method further comprises treating the heat cured UF retentate using ultrafiltration to yield a silica concentrate between about 15 m % and about 50 m %. More preferably between about 25 m % and 40 m % or approximately 30 m %. Preferably, the ultrafiltration comprises passing a second UF retentate to a third or further UF unit to yield a third or further UF retentate. Preferably the third or further UF unit comprises a tubular membrane. Preferably the UF retentate passed to the third UF unit has been heat cured and diafiltered as described above. Preferably the ultrafiltration carried out at the third or further UF unit comprises a batch concentration.

In one embodiment, the invention provides a method of producing a colloidal silica concentrate from a geothermal fluid comprising silica, the method comprising:
  a. cooling a geothermal fluid from an initial temperature to a nucleation temperature between 25-700 C to initiate silica colloid growth and produce a UF feed;
  b. passing the UF feed to at least one UF unit to yield a UF retentate and a UF filtrate;
  c. heat curing the UF retentate to increase the colloid size;
wherein the UF retentate comprises a colloidal silica concentrate with a mean silica colloid size of between 5 and 120 nm.

Preferably the step of heat curing comprises holding the U F retentate at between 95-100°, at atmospheric pressure, for between 1 and 168 hours. Preferably heat curing produces a colloidal silica concentrate with a mean silica colloid size of between about 7 and 12 nm.

In one particular embodiment, the method of producing a colloidal silica concentrate according to the first aspect further comprises a step of heat curing the UF retentate, wherein heat curing comprises heating the UF retentate to between 80° C. and 180° C. for a heat curing period sufficient to obtain a mean silica colloid size in the colloidal silica concentrate of between 8 and 30 nm. Preferably the colloid particles have a standard deviation of less than 5 nm or a polydispersity index of less than 1.5. Preferably, the polydispersity index is less than 1.2. Preferably the colloid particles have a coefficient of variation of less than or equal to 25%.

Preferably the step of heat curing comprises holding the U F retentate at between 115 and 125° C., with greater than 1 bar pressure, for between 1 and 168 hours to produce a colloidal silica concentrate of between 12 and 30 nm.

Preferably the method of producing a colloidal silica concentrate does not include the use of a dispersant.

In one embodiment, the heat curing step comprises heating the UF retentate to between 95° C. and 100° C., more preferably approximately 97° C. and holding the retentate for a curing period at atmospheric pressure, wherein the mean silica colloid size is between about 5 nm to 12 nm. In another embodiment, the heat curing step comprises heating the UF retentate to greater than 100° C., more preferably approximately 115 to 125° C. at greater than atmospheric pressure, wherein the mean silica colloid size is from about 12 nm to 35 nm.

Preferably, the method for the production of a colloidal silica concentrate further comprises a step of producing precipitated silica from the UF retentate after ultrafiltration or after heat curing. Preferably, the step of producing precipitated silica comprises adding a precipitant to the UF retentate or the heat cured UF retentate to produce a precipitant feed mixture. Preferably, the precipitant is at least one of NaCl, CaCl2, FeCl3, MgCl2, Polyaluminium chloride and PLC.

Preferably, the step of producing precipitated silica further comprises:
  a. settling the precipitant feed mixture to allow precipitated silica to settle; and
  b. removing the precipitated silica;
Preferably, the precipitant feed mixture is agitated. Preferably, the precipitated silica is washed.
Preferably, the precipitated silica is dried.

Preferably the step of producing precipitated silica is carried out on a UF retentate comprising silica colloids of from 5 nm to 50 nm. Preferably, the precipitation step is carried out on a colloid of size 5-8 nm, or from 7-12 nm, or from 8-11 nm, or from 15 to 30 nm, or from 15 to 25 nm, or approximately 5 nm, 8 nm, 10 nm, 12 nm, 15 nm, 20 nm, 25 nm or 50 nm.

Preferably, the step of removing precipitated silica comprises filtering the precipitant feed mixture.

Preferably, the filter is a vacuum filter or a filter press.

Preferably the method of producing a colloidal silica concentrate includes a further step comprising adjusting the pH of the colloidal silica concentrate to between 7 and 9.5, more preferably between 8 and 9. This step may be carried out after heat curing, before heat curing, or on the UF retentate in the absence of heat curing.

Preferably the initial temperature of the geothermal fluid referred to in the first aspect or any embodiment thereof immediately prior to cooling is at least 85° C. Preferably the initial temperature of the geothermal fluid is from 90° C. to 150° C. Preferably, the initial temperature of the geothermal fluid is at least 90° C., at least 100° C., at least 110° C., at least 120° C., at least 130° C., at least 140° C., at least 150° C., at least 160° C., at least 170° C., at least 180° C. or at least 190° C. Preferably the temperature of the geothermal fluid is less than 200° C., less than 190° C., less than 180° C., less than 170° C., less than 160° C., less than 150° C., less than 140° C., less than 130° C., less than 120° C., less than 110° C., less than 100° C., or less than 90° C.

Preferably the initial temperature of the geothermal fluid is approximately 80° C., 90° C., 100° C., 110° C., 120° C., 130° C., 140° C., 150° C., 160° C., 170° C., 180° C., 190° C. or 200° C.

Preferably, the concentration of silica in the geothermal fluid referred to in the first aspect or any embodiment thereof is at least 300 ppm. More preferably, the concentration of silica in the geothermal fluid is at least 400 ppm, at least 500 ppm, or at least 600 ppm. Preferably, the concentration of silica in the silica concentrate is at least 600 ppm, at least 700 ppm, at least 800 ppm, at least 900 ppm, at least 1000 ppm, at least 1100 ppm, at least 1200 ppm, at least 1300 ppm, at least 1400 ppm, at least 1500 ppm, at least 1600 ppm, at least 1700 ppm, at least 1800 ppm, at least 1900 ppm, at least 2000 ppm, at least 2100 ppm, at least 2200 ppm, at least 2200 ppm, at least 2300 ppm, at least 2400 ppm, at least 2500 ppm, at least 2600 ppm, at least 2700 ppm, at least 2800 ppm, at least 2900 ppm, at least 3000 ppm, at least 4000 ppm or at least 5000 ppm.

In one embodiment of the first aspect or any embodiment thereof, the concentration of silica in the geothermal fluid is at least 400 ppm, or between 400 ppm and 1000 ppm.

In one embodiment of the first aspect or any embodiment thereof, the total silica recovery from the geothermal fluid is greater than 45% or greater than 50%. In a further embodiment, the concentration of silica in the geothermal fluid is between 400 ppm and 1000 ppm and the total silica recovery is greater than 45%.

Preferably the method of producing a colloidal silica concentrate includes a further step comprising filtering the geothermal fluid to remove particulate material prior to ultrafiltration. Preferably, the filtration is carried out by a cartridge or bag filter. Preferably the filter comprises a screen between 10 microns and 200 microns.

Preferably, the heat from the geothermal fluid recovered during the cooling from an initial temperature to a nucleation temperature is used to heat an ultrafiltration filtrate produced during ultrafiltration wherein the ultrafiltration filtrate is sent for reinjection to the ground. This embodiment is useful where the geothermal operator wishes to prevent excessive cooling of the geothermal field or minimise scaling or blocking of the re injection site.

In one embodiment the invention provides a method of producing a colloidal silica concentrate from a geothermal fluid comprising silica, the method comprising:
 a. cooling a geothermal fluid from an initial temperature of over 85° C. to a nucleation temperature of between about 25° C. and about 70° C. to initiate silica colloid growth;
 b. curing the geothermal fluid after cooling for a curing period of at least 10 minutes to produce an ultrafiltration (UF) feed;
 c. passing the UF feed to at least one UF unit to yield a first UF retentate comprising colloidal silica with a mean silica colloid size of between about 3 nm and about 8 nm and a UF filtrate;
 d. diafiltering the first UF retentate to produce a second UF feed;
 e. passing the second UF feed to a second UF unit to yield a second UF retentate;
 f. heat curing the second UF retentate, wherein heat curing comprises heating the UF retentate to a temperature and holding for a period sufficient to produce a colloidal silica concentrate with a mean silica colloid size of between about 8 nm and about 25 nm;
 g. passing the heat cured second UF retentate to a third or optionally further UF unit to yield a third or further UF retentate comprising a colloidal silica concentrate of between about 15 m % and about 50 m %.

In one embodiment the invention provides a method of producing a colloidal silica concentrate from a geothermal fluid comprising silica, the method comprising:
 a. cooling a geothermal fluid from an initial temperature of over 85° C. to a nucleation temperature of between about 25° C. and about 70° C. to initiate silica colloid growth;
 b. curing the geothermal fluid after cooling for a curing period of at least 10 minutes to produce an ultrafiltration (UF) feed;
 c. passing the UF feed to at least one UF unit to yield a first UF retentate comprising colloidal silica with a mean silica colloid size of between about 3 nm and about 8 nm and a UF filtrate;
 d. diafiltering the UF feed to reduce the concentration of salts;
 wherein the step of cooling a geothermal fluid from an initial temperature of over 85° C. to a nucleation temperature occurs substantially continuously and in a period of less than about 30 seconds, and
 wherein the method further comprises pressurising the system for cooling the geothermal fluid to a pressure greater than the saturation pressure of the geothermal fluid at the fluid temperature; and
 wherein size of the silica colloid particles in the colloidal silica concentrate has a polydispersity index of less than 1.5.

In a further embodiment of the first aspect, the geothermal fluid after cooling is cured for a curing period of at least 10 minutes, and wherein ultrafiltration comprises:
 i. a first ultrafiltration to yield a first UF retentate comprising colloidal silica with a mean silica colloid size of between about 3 nm and about 8 nm;
 ii. a second ultrafiltration to yield a second UF retentate; wherein the first UF retentate is diafiltered before or during the second ultrafiltration;
 wherein the second UF retentate undergoes heat curing comprising heating the UF retentate to a temperature and for a period sufficient to produce a colloidal silica concentrate with a mean silica colloid size of between about 8 nm and about 25 nm; and
 wherein the heat cured second UF retentate is treated using a further ultrafiltration to yield a colloidal silica concentrate of between about 15 m % and about 50 m %.

In a second aspect, the invention provides a method for producing a colloidal silica concentrate from geothermal fluid comprising silica, the method comprising:
 a. receiving a silica concentrate of between about 5 m % and 15 m % produced from a geothermal fluid;
 b. heat curing the concentrate, wherein heat curing comprises heating the concentrate to a temperature and for a period sufficient to produce a colloidal silica concentrate with a mean silica colloid size of between about 5 nm and 120 nm, more preferably between about 8 nm and about 25 nm;
 c. treating the heat cured concentrate using ultrafiltration to yield a colloidal silica concentrate of between about 15 m % and about 50 m %.

Preferably the heat curing temperature is from 90° C. to 200° C. and the colloid size in the colloidal silica concentrate is from 5 nm to 120 nm, or from 5 nm to 50 nm. In other embodiments, the heat curing temperature is approximately 200° C., approximately 180° C., approximately 160° C., approximately 150° C., approximately 140° C., approximately 130° C., approximately 120° C., approximately 110° C., approximately 100° C., approximately 95° C., approximately 97° C. or approximately 90° C., from 95° C. to 125° C., from 93° C. to 98° C., from 95° to 100°, from 100° to 110°, from 93° to 100°, from 105° to 115°, from 107° to 113° C., or from 80° C. to 115° C.

Preferably, the heat curing time is sufficient to produce a colloidal silica concentrate with a mean silica colloid size of between 8 nm and 25 nm or between 8 nm and 13 nm. Preferably the heat curing period is between 10 and 50 hours, between 20 and 40 hours, or between 25 and 35 hours.

The colloid size varies according to the heat curing temperature and the heat curing period. In particular embodiments the colloid size in the colloidal silica concentrate is from 6 to 30 nm, more preferably approximately 5 nm, 8 nm, 10 nm, 12 nm, 15 nm, 20 nm, 25 nm or 50 nm, 75 nm, 100 nm, 120 nm. In one embodiment, the heat curing increases the mean silica colloid size to between 8 and 12 nm.

In another particular embodiment, the method of producing a colloidal silica concentrate according to the second aspect further comprises a step of heat curing the UF retentate, wherein heat curing comprises heating the UF retentate to between 80° C. and 115° C. for a heat curing period of between 20 and 40 hours and the mean silica colloid size in the colloidal silica concentrate increases to between 8 and 12 nm.

Preferably the colloid particles have a standard deviation of less than 5 nm or a polydispersity index of less than 1.5. Preferably, the polydispersity index is less than 1.2. Preferably the colloid particles have a coefficient of variation of less than or equal to 20%.

Preferably heat curing further comprises pressurisation of the first or further UF retentate. Preferably the heat curing pressure is atmospheric pressure, at least 1.5 bar, at least 1.8 bar, from 1 bar to 4 bar, more preferably approximately 1.5 bar, 2 bar, 2.5 bar or 3 bar. Pressure may be autogenous or induced.

Preferably the step of heat curing the UF retentate further comprises the step of adding a growth colloid to the seed colloid, wherein the growth colloid is smaller than the seed colloid. Preferably, the seed fluid comprises silica colloids of between 4-10 nm, more preferably between 5-8 nm. Preferably, the seed fluid has colloidal silica concentration of from 2-15 m %, more preferably from 5-10 m %.

Preferably the growth fluid comprises silica colloids of approximately 2-10 m % and a colloid size of approximately 3-5 nm.

In one embodiment of the second aspect the method further comprises treating the heat cured UF retentate using ultrafiltration to yield a silica concentrate between about 15 m % and about 50 m %. More preferably between about 25 m % and 40 m % or approximately 30 m %.

Preferably, the ultrafiltration comprises passing the heat cured concentrate to a UF unit to yield a UF retentate. Preferably the UF unit comprises a tubular membrane. Preferably the ultrafiltration carried out at the third or further UF unit comprises a batch concentration.

Preferably the step of heat curing comprises holding the U F retentate at between 95-100°, at atmospheric pressure, for between 1 and 168 hours. Preferably heat curing produces a colloidal silica concentrate with a mean silica colloid size of between about 7 and 12 nm.

In one particular embodiment, the method of producing a colloidal silica concentrate according to the second aspect comprises a step comprising heating the U F retentate to between 80° C. and 180° C. for a heat curing period sufficient to obtain a mean silica colloid size in the colloidal silica concentrate of between 8 and 30 nm.

Preferably the step of heat curing comprises holding the U F retentate at between 115 and 125° C., with greater than 1 bar pressure, for between 1 and 168 hours to produce a colloidal silica concentrate of between 12 and 30 nm.

Preferably the method of producing a colloidal silica concentrate does not include the use of a dispersant.

In one embodiment, the heat curing step comprises heating the UF retentate to between 95° C. and 100° C., more preferably approximately 97° C. and holding the retentate for a curing period at atmospheric pressure, wherein the mean silica colloid size is between about 5 nm to 12 nm. In another embodiment, the heat curing step comprises heating the UF retentate to greater than 100° C., more preferably approximately 115 to 125° C. at greater than atmospheric pressure, wherein the mean silica colloid size is from about 12 nm to 35 nm.

In a further aspect, the invention provides a method of modifying the colloid size in a colloidal silica concentrate comprising adjusting the nucleation temperature and curing period of the method described in the first aspect.

In a third aspect, the invention provides a system for concentrating silica from a geothermal fluid, the system comprising:
a. a heat exchanger adapted to receive geothermal fluid at a temperature of greater than 85° C. and to reduce the temperature to between 25° C. and 70° C.;
b. at least one curing tank adapted to receive geothermal fluid from the heat exchanger;
c. at least one ultrafiltration (UF) unit adapted to receive fluid from the curing tank and to produce a silica concentrate from it.

In a further embodiment of the third aspect, the system comprises:
a. a heat exchanger adapted to receive geothermal fluid at above 85° C. and to reduce the temperature to between 25° C. and 70° C.;
b. at least one curing tank adapted to receive geothermal fluid from the heat exchanger;
c. a first ultrafiltration (UF) unit comprising a spiral wound membrane adapted to receive fluid from the curing tank and to produce a silica concentrate from it;
d. a diafiltration stream adapted to diafilter the silica concentrate received from the first UF unit;
e. a second or optionally further UF unit comprising a spiral wound membrane adapted to receive the silica concentrate from the first UF unit fluid and concentrate it to yield a second silica concentrate.

Preferably the system further comprises one or more heat curing tanks adapted to heat a silica concentrate received from the first, second or optionally further UF unit.

Preferably the further UF unit comprises a third UF unit adapted to receive the second silica concentrate.

Preferably the curing tank comprises a serpentine channel.

Preferably, the heat exchanger is a plate heat exchanger, a pipe-type heat exchanger or a tube and shell heat exchanger.

Preferably, the system further comprises a dosing means for dosing the geothermal fluid with one or more pH adjusting substances prior to entering the curing tank.

Preferably, the heat exchanger is adapted to heat a UF filtrate obtained from a UF unit.

Preferably, the system further comprises at least one of an agitated tank and a settling tank capable of receiving at least a portion of the UF retentate (i.e. the silica concentrate) from the UF unit or the heat curing tank. Preferably, the system further comprises a filter capable of collecting precipitated silica from the settling tank. Preferably, the filter is a vacuum filter or a filter press.

In one embodiment of the third aspect, the invention provides a system for concentrating silica from a geothermal fluid, the system comprising:
a. a heat exchanger adapted to receive geothermal fluid and reduce the temperature to between 25° C. and 70° C.;
b. at least one curing tank adapted to receive geothermal fluid from the heat exchanger;
c. a first ultrafiltration (UF) unit comprising a spiral wound membrane adapted to receive fluid from the curing tank and concentrate it;
d. a diafiltration feed adapted to diafilter fluid from the first UF unit;
e. a second UF unit comprising a spiral wound membrane adapted to receive diafiltered fluid from the first UF unit.

In a further embodiment, the system further comprises:
f. a heat curing tank adapted to heat a UF retentate received from the second UF unit;
g. a third or further UF unit adapted to receive heat cured fluid from the heat curing tank.

In a fourth aspect, the invention provides at least one of a colloidal silica concentrate, colloidal silica or precipitated silica when obtained by a method as described in the first aspect of the invention.

In a further aspect, the invention provides a method of concentrating silica from a geothermal fluid as described in the first or other aspects while minimizing the concentration of one or more of the toxic components.

In a further aspect, the invention provides a method of reducing precipitation of silica during a geothermal electricity production process or prior to or during reinjection of a geothermal fluid into the ground, the method comprising:

a. removing silica by ultrafiltration according to the method described in the first, second or further aspects or any embodiment thereof;
b. using heat obtained during the initial temperature drop to a nucleation temperature to produce geothermal electricity;

wherein the amount of silica removed is sufficient to prevent deleterious precipitation of the silica remaining in a UF filtrate.

Preferably, the silica concentration in the UF filtrate for reinjection is less than 300 ppm silica.

Further aspects of the invention, which should be considered in all its novel aspects, will become apparent to those skilled in the art upon reading of the following description which provides at least one example of a practical application of the invention.

BRIEF DESCRIPTION OF THE FIGURES

Embodiments of the invention will now be described, by way of example only, with reference to the accompanying drawings in which.

DETAILED DESCRIPTION OF PREFERRED EMBODIMENTS

Definitions

Figure 1A:
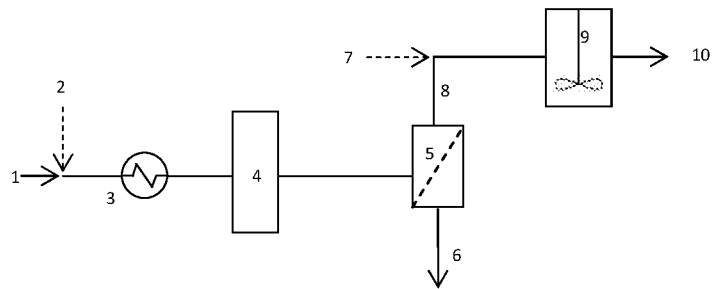
FIGS. 1A and 1B show process flow diagrams of embodiments of the invention in which colloidal silica is produced.

"Geothermal fluid" refers to any liquid fraction of a fluid stream principally obtained from the ground and heated by geothermal energy. The geothermal fluid may be separated geothermal water (SGW) which is produced following flashing of a high temperature pressurised geothermal stream to separate steam, or unseparated geothermal water.

A "colloid" refers to a non-crystalline substance consisting of large molecules or ultra microscopic particles of one substance dispersed in a continuous phase through a second substance. "Colloidal silica" or "silica colloids" refers to a dispersed suspension of silicon dioxide (silica) particles in a liquid phase. Typically colloidal silica comprises large silica polymers that naturally take on a spherical shape due to surface forces.

"Precipitated silica" or a "silica precipitate" refers to solid silica which has precipitated out of a solution.

This precipitated silica may be present as a suspension or in a "slurry" form. Precipitated silica can be recognized as being different to colloidal silica because precipitated silica will eventually settle whereas colloidal silica will be retained in a dispersed phase.

"Silica concentration" and the like refer to the total silica concentration in a liquid phase.

Total silica (i.e. monomeric silica plus colloidal silica) may be measured by an ionic coupled plasma (ICP) test or an X-ray fluorescence (XRF) test. Monomeric concentration of silica may be measured using any known method however unless indicated otherwise, the values provided herein were measured using the molybdate method. This method generally involves a molybdate powder being added to the sample which turns yellow. The resulting liquid is then measured using a colour disc method. Kits to perform such measurements will be known to those skilled in the art, as an example, kits and colorimeters provided by Hach may be used. In the present invention the kit used was Hach Molybdate Test Unit Model M0-2.

Unless stated otherwise, colloidal silica concentration was measured using a density meter or hydrometer by calculation of its specific gravity. Total silica and colloidal silica are expressed in terms of parts per million (ppm) or mass percentage (m %).

"Colloidal silica concentrate" refers to a fraction of geothermal fluid containing silica at a higher concentration than the concentration of the source geothermal fluid.

"Ultrafiltration" or "UF" refers to a filtration method that uses a semi-permeable membrane to separate a feed fluid to yield a concentrate and a permeate. Ultrafiltration is used to filter matter from a feed fluid in a range from 0.005-0.01 μm (>1000 Dalton).

An "ultrafiltration unit" as referred to herein comprises an ultrafiltration housing (vessel) containing one or more semi-permeable membranes (elements). The unit may be any suitable unit and such units will be known to those of skill in the art. By way of example, the housing of the unit may comprise a Pentair Codeline model 80860. The membrane received within the housing may comprise any suitable membrane.

In a particular embodiment, the membrane comprises a spiral wound membrane, optionally a 4 inch spiral wound membrane. In alternative embodiments, the membrane may comprise an 8 inch spiral wound 19 membrane or another size of spiral wound membrane. Those of skill in the art will appreciate membranes and housings appropriate for the process. However, by way of example, the membrane may be a high temperature polysulfone membrane sourced from Membrane Development Specialists, San Diego, USA. It will be appreciated by those of skill in the art that several UF housings and membranes may be connected in parallel or series to produce a single "UF unit" as referred to herein. In addition, a UF unit is intended to encompass a UF storage or buffer tank when directly associated with said UF vessels. "UF retentate" is the portion of the fluid that enters the UF unit that does not pass through the semi-permeable membrane.

"UF filtrate" refers to the fraction of fluid exiting an ultrafiltration unit that has passed through the semipermeable membrane of the unit.

"Diafiltration" comprises the addition of a solvent (typically water) with a lower concentration of ions or impurities to a feed of higher concentration to dilute the components of the feed. Diafiltration may be carried out according to known methods.

"Curing tank" refers to any apparatus suitable to retain the fluid for the curing period and facilitate the growth of silica colloids (i.e. curing). A curing tank may be a pipe through which the fluid passes during the curing period. A curing tank may also be a serpentine channel or similar apparatus. Suitable curing tanks and materials to make such tanks will be known to those of skill in the art. By way of example, the curing tank may be made from stainless steel, carbon steel painted, carbon steel painted and HOPE lined, or high density polyethylene (HOPE).

An "agitated tank" is a tank with an agitator. In the context of the present invention, the agitated tank is adapted to receive a colloidal silica concentrate and mix it with a precipitant (e.g. NaCl) to destabilize it and result in the production of precipitated silica.

A "thickener" or "settling tank" is an apparatus used to separate out the precipitated silica from the retained geothermal fluid. The apparatus may be agitated (stirred), for example using a rake-type agitator.

A "system comprising the UF unit" or similar wording comprises pipework and other features that would be typically employed to enable the transport and flow of geothermal fluids from a feed to the UF unit and onward to any further processing apparatus (e.g. one or more ultrafiltration units). By way of example, the "system" may include pressure release valves, heat exchangers, filters, instrumentation (pressure sensors, flow sensors, pH sensors), mixing tees (static mixers).

A "reverse osmosis unit" as referred to herein comprises a reverse osmosis vessel which includes a number of semi-permeable membranes. The unit may be any suitable reverse osmosis unit. Such units will be known to those of skill in the art. However, by way of example, the unit may comprise hand wound reverse osmosis membranes using Filmtech 8040F membranes and high temperature ADT and permeate tubes or GE Industrial RO elements. Reverse osmosis membranes referred to herein and used by the present inventors were sourced from Membrane Development Specialists, San Diego, USA.

"Sodium hydroxide" may also be referred to as "caustic" herein. The concentration of sodium hydroxide to achieve a particular pH will depend on several factors and will be able to be readily ascertained by one of skill in the art.

"Dispersity" is the IUPAC-approved measure of the distribution of molecular mass in a given polymer/colloid sample. Dispersity may be measured by the polydispersity index (PDI) calculated according to known means (see examples). The dispersity indicates the distribution of individual molecular masses in a batch of polymers/colloids.

"Substantially monodisperse" when referring to a liquid containing colloids means that the polydispersity index is less than 1.5.

"Initial temperature of the geothermal fluid" refers to the temperature of the geothermal fluid (which may be separated or unseparated geothermal water) immediately prior to undergoing the steps of the methods described herein.

"Size of silica colloids", "mean silica colloid size", "particle size" and like terminology refers to the mean diameter of the silica colloids. This is measured using transmission electron microscopy (TEM) or can be calculated based on colloid surface area.

"Nucleation temperature" is the temperature to which the geothermal fluid is cooled to allow for colloid growth. Colloid growth is started by individual silica "nuclei" being further polymerised by silica monomers, until a discrete particle is formed, thus forming a colloid. It will be appreciated by those of skill in the art that nucleation may actually occur prior to the nucleation temperature being reached, for example in the pipework prior to the cooling apparatus. The term "nucleation" is therefore intended to encompass the situation where colloid nuclei are formed before the nucleation temperature is reached, but substantially grow from small colloids into larger colloids at the nucleation temperature.

"Dispersant" is a chemical additive designed to charge the outer shell of the silica colloids with a negative charge which will cause individual silica particles to repel each other, thus resulting in a more stable suspension. This prevents colloids agglomerating/growing. Dispersants will be known to those of skill in the art, however by way of example, the dispersant is selected from the group consisting of Nalco 980 and Accumer 5000.

"Salts" as referred to herein is used to refer to the total dissolved solids which are undesirable ions or impurities present in the geothermal fluid or another fluid referred to herein. Total dissolved solids may be measured by methods known to those of skill in the art such as gravimetric analysis and conductivity.

"Substantially continuously" as referred to herein means that there are zero or only very minor interruptions or plateaus during the step of cooling a geothermal fluid from an initial temperature to a nucleation temperature. Where such minor interruptions or plateaus do occur they do not affect the polydispersity index of the colloidal silica concentrate product by greater than 10%. Unless the context clearly requires otherwise, throughout the description and the claims, the words "comprise", "Silica saturation index" (SSI) refers to the degree of saturation of silica in the fluid. Measurement of the (SSI) would be known to those of skill in the art.

"Comprising", and the like, are to be construed in an inclusive sense as opposed to an exclusive or exhaustive sense, that is to say, in the sense of "including, but not limited to".

DESCRIPTION OF THE INVENTION

In order to efficiently extract silica from a silica concentrate, it is desirable to use the concentrate at a relatively high silica concentration, i.e. greater than 20 m %. The higher the concentration of silica in the concentrate, the more is able to be extracted. In addition, in an industrial context, it is possible that extraction of silica from the fluid will take place at a different location and different time to the energy extraction and silica concentration. In these situations it is desirable for a number of reasons (e.g. logistical and cost) to have a highly concentrated silica concentrate. The invention described herein provides a method of concentrating a geothermal fluid containing silica to produce a colloidal silica concentrate with a colloidal silica concentration appropriate for commercial sale. Although each geothermal source differs in its particular characteristics, in general terms, it is commercially desirable to obtain a fluid comprising colloidal silica at a concentration of at least 15 m % and up to 50 m %. Although higher concentrations may be achievable using the methods described herein, the viscosity of such compounds is typically too high to yield a usable product.

Previous attempts to extract silica from geothermal waters have foundered due to the difficulties of working with silica-containing fluids that have a propensity to form highly viscous silica gels. Other components of the geothermal fluid commonly cause uncontrolled fouling and scaling of equipment.

Where geothermal fluids are re-injected, precipitation and gelling can block the re-injection site and require costly remedial action such as drilling new boreholes. Where geothermal fluids are disposed of in above-ground watercourses, precipitation and gelling can cause detrimental effects on wildlife, water quality and flow characteristics.

The complexity of the mineral mix in such fluids also gives rise to unexpected chemical interactions and unpredictable precipitation characteristics. Overall, the difficulties encountered in dealing with such fluids mean that such ventures are expensive and high-risk. Despite initial setbacks and considerable work on process development and testing, the inventors have developed a process for the rapid and cost-effective production of a commercial grade colloidal silica concentrate from a geothermal fluid. Analyses indicate that the elemental composition and dispersity of the product compares favourably with silica commercially produced using traditional methods such as the sodium silicate method. Example 1 shows the composition of colloidal silica produced by the methods described herein compared to commercially available LUDOX HS-40 (Sigma-Aldrich). This improved process enables geothermal fluid to become a viable silica source and provides a commercially viable alternative to known methods of colloidal silica production (for example the sodium silicate method). The methods described herein also provide a low cost alternative to traditional colloidal silica production methods.

The invention described herein also provides value for geothermal field operators by reducing silica content in the geothermal fluid following cooling and energy extraction. Reduced silica content allows a greater amount of energy to be extracted from the fluid as well as reducing problems associated with reinjection or discharge of fluids high in silica.

In traditional colloidal silica production processes, fossil fuels are typically used to produce energy to power heaters and pumps. The present method uses a renewable energy resource—geothermal energy.

The methods described herein to produce a colloidal silica concentrate have very low energy consumption due to the temperature of the fluid already being high. The geothermal energy extracted during cooling can be used for downstream re-heating of the discharged fluid, or used to power pumps and other equipment. The invention therefore provides environmental benefits by increasing energy efficiency for the production of commercial grade silica, as well as reducing environmental effects associated with discharge of high silica fluids from geothermal power plants.

In a first aspect, the invention provides a method of producing a colloidal silica concentrate from a geothermal fluid comprising silica, the method comprising:
a. cooling a geothermal fluid from an initial temperature to a nucleation temperature between 25° C. and 70° C. to initiate silica colloid growth;
b. passing the UF feed to at least one UF unit to yield a UF retentate and a UF filtrate;
wherein the UF retentate comprises a colloidal silica concentrate with a mean silica colloid size of between 2 and 10 nm.

The above method produces a "seed" colloid which the inventors have found can be used as a base material. The seed colloid can be sold, or may be subjected to further process steps (e.g. precipitation or heat curing as described below) to produce silica of differing characteristics depending on the desired colloid size and form.

The inventors have found that colloids with a mean silica colloid size of 3.6 nm or less are less stable than larger colloids (i.e. greater than 4 nm). Although the smaller colloids could be used in the processes of the invention, once the concentration of the colloidal silica concentrate increases past about 6 m %, colloids less than 4 nm formed silica gels which fouled the UF membranes and prevented further UF to produce a more concentrated silica concentrate. Accordingly, a mean silica colloid size is preferably at least 4 nm.

The invention described herein provides a method of concentrating colloidal silica from a geothermal source to at least 30 m %. Being able to concentrate silica to about 30 m % in the absence of a dispersant is a significant achievement that was previously not thought to be possible. Previously it was believed that concentration to this high level without a dispersant would result in gelling of the silica thus compromising the stability of any product. However, through the inventor's research, they have found that if the colloids are grown to a minimum size of 10 nm with a substantially monodisperse particle size distribution, the overall stability of the colloids is increased. In one embodiment, the methods of the invention comprise growing a 5 nm colloid to approximately 10 nm by heat curing then concentrating to approximately 30 m %.

The colloid size is determined to a large degree by the nucleation temperature and curing period. The inventors have found that cooling the geothermal fluid to a temperature of between 25° C. and 70° C. and using a curing period of between 5 minutes and two hours results in a commercially useful colloidal silica concentrate.

The cooling process may be carried out in any appropriate cooling apparatus. Advantageously, the energy removed during cooling may be used within the geothermal power plant to produce electricity. In one aspect, the invention provides a method of producing electricity or harnessing energy in any of the methods of production of a colloidal silica concentrate described herein.

The methods of the invention not only provide an effective method for the extraction and concentration of silica, they also enable the heat extracted from cooling the SGW to be used to generate further electrical power. Studies have determined that 20% extra power could be generated if re-injection temperatures were reduced from 120° C. to 60° C. This reduction in re-injection temperature is possible if silica concentrations of the SGW are reduced to less than 300 ppm $SiO_2$.

Accordingly, in a further aspect, the invention provides a method of improving the efficiency of a geothermal energy and reinjection process comprising removing silica (according to the processes of the invention described herein) so that the reinjection fluid (i.e. the UF filtrate) has a silica concentration of less than 300 ppm silica. It will be understood by those of skill in the art that geothermal fluids with a relatively low native silica concentration may be reduced to less than 300 ppm. Preferably the method comprises the step of curing the cooled geothermal fluid at a nucleation temperature ranging from 25° C. to 70° C. for a curing period sufficient to reduce the monomeric silica concentration to less than 300 ppm.

Preferably, the curing period to reduce the monomeric silica to less than 300 ppm is greater than 30 minutes, greater than 45 minutes, greater than 60 minutes or greater than 90 minutes.

Colloid Size

The nucleation temperature to which the fluid is cooled directly relates to the size of colloid produced. The rate of cooling also has an important effect on the colloid dispersity. If the initial cooling step to a nucleation temperature occurs in stages, different sized colloids will form at the differing temperatures.

This results in a polydisperse product that is generally undesirable. As such, the inventors have invented a method where the nucleation temperature is reached rapidly. In particular embodiments, the step of cooling a geothermal fluid from an initial temperature of over 85° C. to a nucleation temperature occurs in a period of less than 1 minute, less than 30 seconds or less than 20 seconds. Preferably the step of cooling a geothermal fluid from an initial temperature of over 85° C. to a nucleation temperature occurs substantially continuously. A continuous and rapid cooling step has been found to yield a monodisperse colloid which has advantages for commercial value and the predictability of gelling characteristics. This enables the method to be used effectively in a commercial context.

The rapid cooling step used in the present invention results in the silica in the geothermal fluid achieving a supersaturated state in which both the nucleation and polymerization occur substantially simultaneously which provides a substantially monodisperse colloid. In addition, rapid cooling means that additional cooling and aging steps are rendered unnecessary thus making the process more efficient. Using a slow cooling step or multiple cooling and curing steps requires additional process steps, equipment, control of conditions, and time. In a particular embodiment the silica saturation index (SSI) achieved during nucleation/polymerisation is at least 1.5, more preferably at least 2, at least 3 or most preferably at least 4.

At these SSIs, the silicic acid is more quickly displaced from the fluid. To assist reaching a SSI of at least 1.5, the inventors have found that using a reasonably concentrated initial silica concentration is important.

This is described in more detail below but in particular embodiments the initial silica concentration of the geothermal fluid is at least 300 ppm. Further, the inventors have founds that pressurising the system for cooling the fluid to a pressure greater than the saturation pressure of the geothermal fluid at the fluid temperature was beneficial in achieving and maintaining an SSI as described above.

Figure 4:
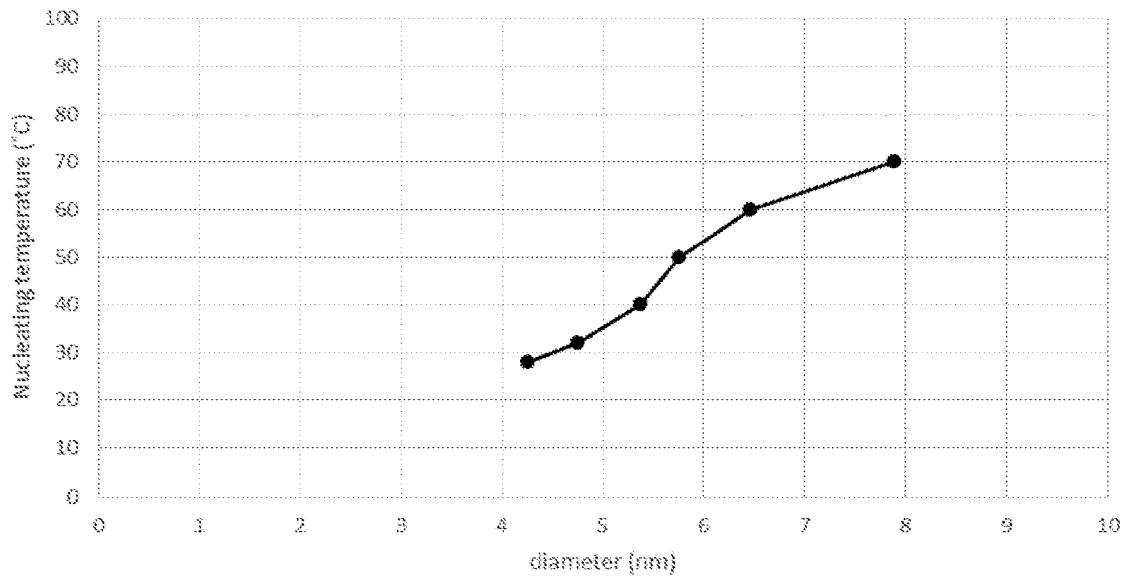
FIG. 4 shows the silica colloid particle size attained at various nucleating temperatures from a geothermal fluid containing silica as described in example 2.

The inventors have found that a colloid with a mean size of approximately 5 nm-6 nm can be produced by rapidly cooling the fluid to between about 30° C. and 40° C. (FIG. 4). The inventors have also found that colloids with a mean size of approximately 8 nm can be produced by cooling the fluid to a temperature of approximately 70° C. (FIG. 4). In alternative embodiments, the fluid is cooled to a nucleation temperature of approximately 30° C., 40° C., 50° C., 60° C. or 70° C.

Preferably, the colloids in the colloidal silica concentrate are substantially monodisperse. Preferably, the size of the colloids in the colloidal silica concentrate is between 4 and 9 nm, more preferably between 3 and 7 nm.

Figure 8:
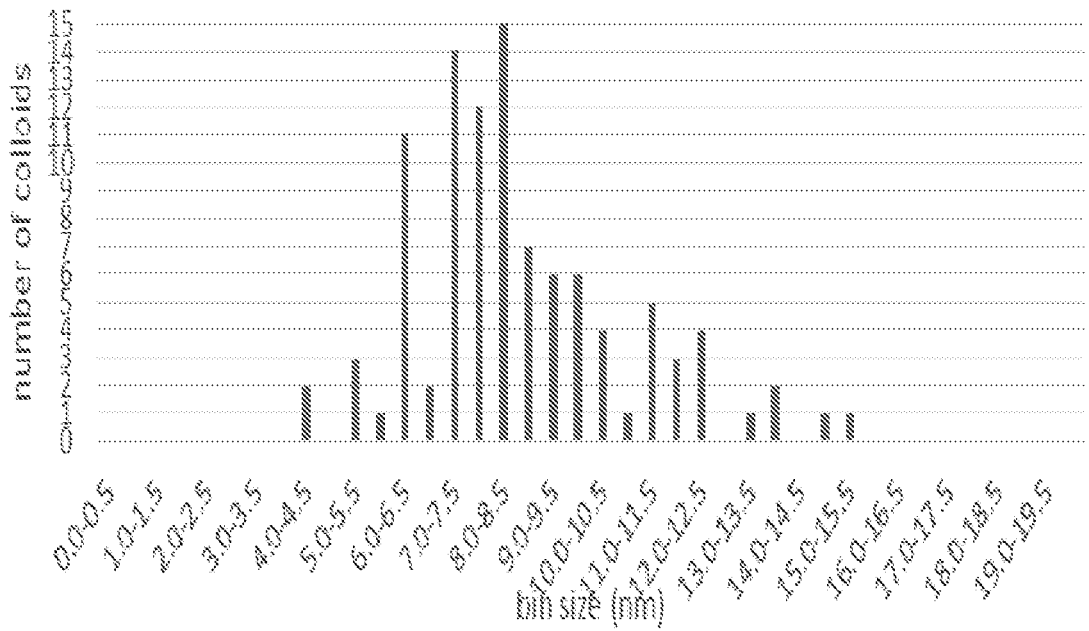
FIG. 8 shows a histogram of TEM measurements of 102 individual silica colloids. This graph shows the size distribution (dispersity) of the colloidal silica concentrate.
Figure 9:
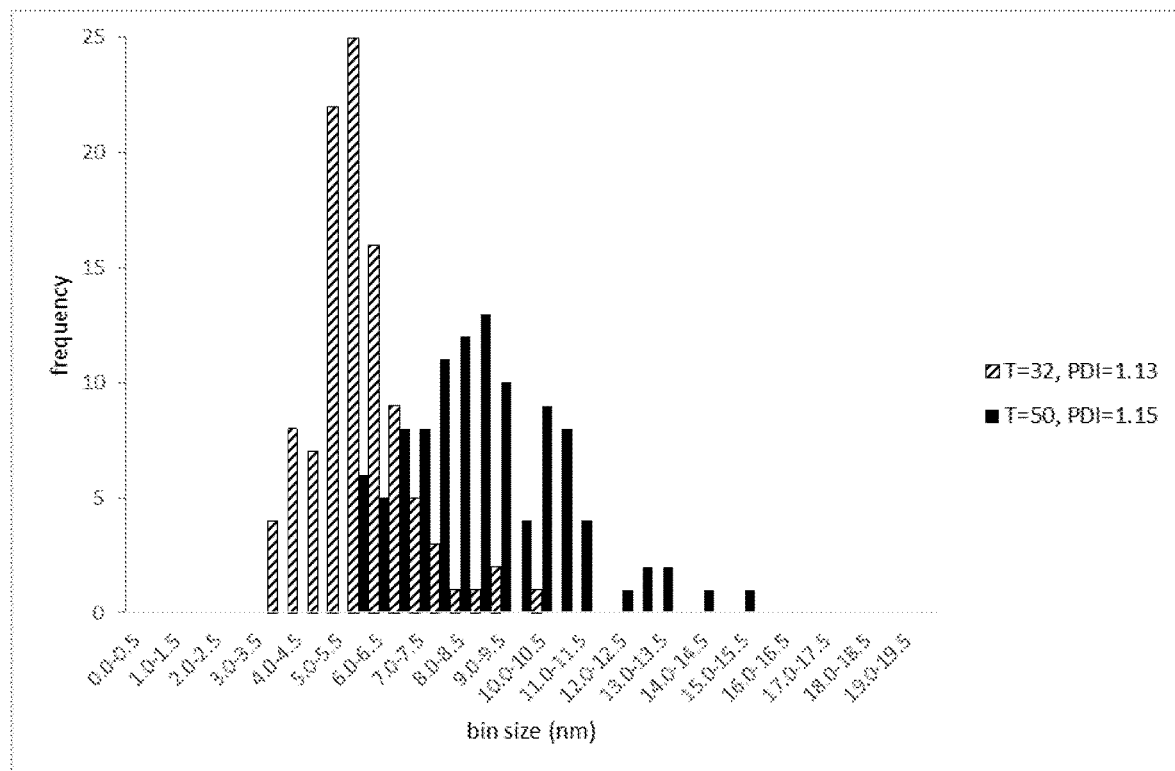
FIG. 9 shows a histogram of TEM measurements of silica particles of 15 m % silica colloids at a nucleating temperature of 32° C. and 50° C. as described in example 7.

The dispersity of the colloids produced by the methods of the present invention was acceptably monodisperse and typical examples are shown in FIGS. 8 and 9.

Curing

The method of producing a colloidal silica concentrate involves reducing the temperature of a fluid containing silica to cause the silica saturation point to be reached and exceeded. The over-saturation of the silica in solution then results in polymerisation or curing occurring, i.e. silica colloids form. Preferably curing is carried out on the cooled fluid, preferably in one or more curing tanks. Curing is carried out for a curing period which is sufficient for silica colloids of the desired size to form from the monomeric silica in the oversaturated solution. As noted above, the nucleation temperature of the geothermal fluid is critical in determining the dispersity (colloid particle size distribution) of the final colloidal silica product.

Preferably, the temperature of the fluid during curing is maintained at the nucleation temperature.

In particular embodiments, the temperature is maintained by heating the curing tank or a section thereof.

In one embodiment, the curing tank comprises a serpentine channel. The ensures that the fluid passing through the tank has a constant residence time prior to ultrafiltration.

Figure 3A:
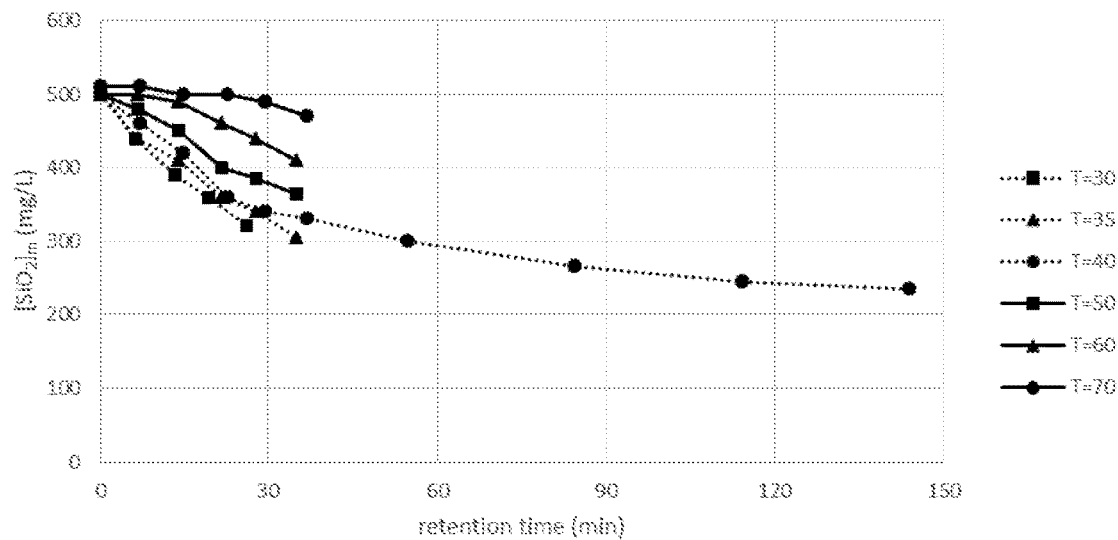
FIGS. 3A and 3B shows silica recovery at various nucleation temperatures by rate of molybdate reactive silica disappearance as described in example 2 at two sites (Trial A—3A and Trial B—3B). The silica feed is a geothermal fluid at approximately 124° C. (trial A) and approximately 97° C. (Trial B).
Figure 3B:
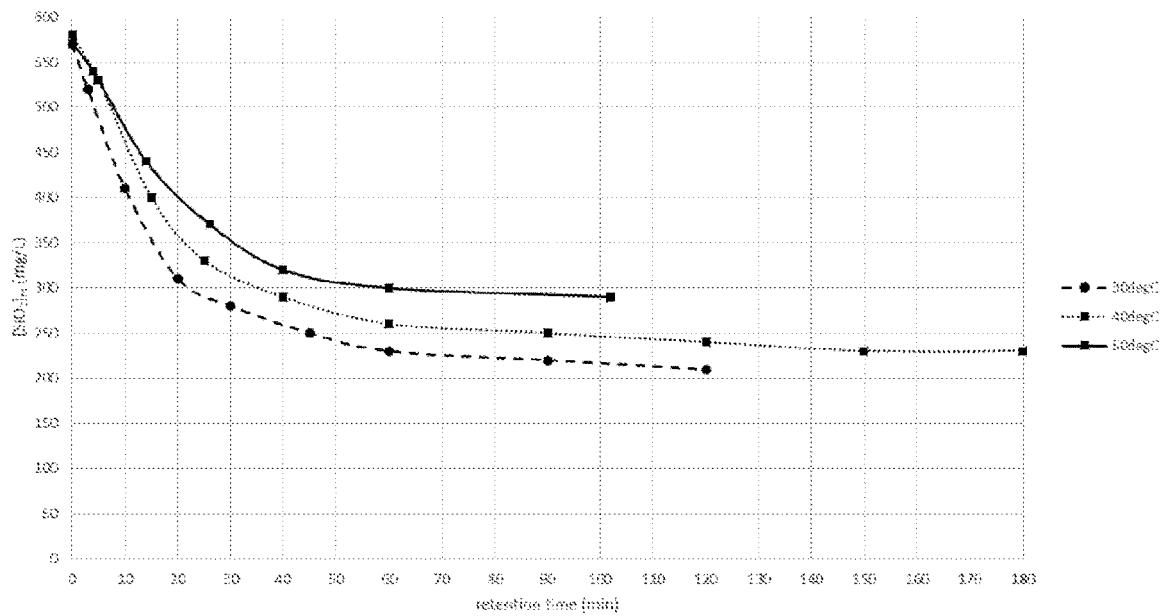

Without wishing to be bound by theory, it is believed that the curing process proceeds by way of nucleation and polymerisation. Polymerisation continues until a critical size is reached, producing colloids of a uniform size (substantially monodisperse). As more monomeric silica is displaced from solution, the degree of oversaturation decreases, and as a result the rate of polymerization also decreases with respect to time, resulting in a logarithmic growth rate (FIGS. 3A and 3B). Polymers typically contain hundreds to thousands of molecules to make a single colloid (0.003-3 µm).

In some embodiments, the curing period may very short (e.g. less than one minute). In this instance, the silica colloids will have very little time to grow so will be of a relatively small size (e.g. less than 3 nm). If this is the case, using a standard UF membrane (as described in the examples) to concentrate the silica in the fluid will be less efficient because many colloids will pass through the membrane. In these circumstances, it would be preferable to use a tighter weave (i.e. lower molecular weight cutoff) to capture the smaller particles. This embodiment may be appropriate for particular colloid applications with a bespoke colloid size requirement. Using a standard membrane, the amount of monomeric silica left in the fluid will be relatively high. However, for highly concentrated silica fluids, this may be acceptable because the benefit of higher colloidal silica yield will outweigh the disadvantage of requiring extra time and equipment for the curing to occur. Although this may be desirable for some applications, it is generally preferable to obtain a higher recovery of colloidal silica from the available monomeric silica. This is achieved by increasing the curing period to an optimum. As the concentration of monomeric silica in the oversaturated fluid nears the saturation point, fewer colloids will have the propensity to form and therefore the rate of colloid formation will decrease. This effect is observed in FIGS. 3A and 3B which relates to example 2. Accordingly, the curing period may be between 0 minutes and 4 hours although it is preferred that the curing period is between 5 minutes and 2 hours. The longer curing period allows for the growth of the desired size silica colloids from the monomeric silica. More preferably, the curing period is between 10 minutes and 40 minutes, more preferably between 15 minutes and 35 minutes. In one embodiment, the curing period is between 20 and 30 minutes. The inventors have found that if the curing period is less than 20 minutes, the recovery of colloidal silica from monomeric is sub-optimal (see FIG. 3).

Accordingly to obtain an optimal recovery of colloidal silica, it is preferable that the curing period is at least 20 minutes. A period between 20 mins and 2 hours is therefore preferred for this.

The inventors have demonstrated the production of colloidal silica at nucleation temperatures ranging from about 30° C. to 70° C. (see FIGS. 3A and 3B). As well as affecting particle growth rate, the nucleation temperature was also found to affect particle size (FIG. 4). Accordingly, in a further aspect, the invention provides a method of producing a size-specific silica colloid obtained by cooling, curing and ultrafiltration whereby the particle size is varied by varying the nucleation temperature. Preferably, the nucleation temperature is approximately 30° C. and the particle size is between 4 and 5 nm. Preferably, the nucleation temperature is approximately 40° C. and the particle size is between 5 and 6 nm. Preferably, the nucleation temperature is approximately 50° C. and the particle size is between 5 and 6 nm. Preferably, the nucleation temperature is approximately 60° C. and the particle size is between 6 and 7 nm. Preferably, the nucleation temperature is approximately 70° C. and the particle size is between 7 and 8 nm.

Where the curing is used in combination with heat curing to produce a larger colloid, it is generally desirable to obtain a substantially monodisperse colloid that is large enough to be stable (i.e. greater than 4 nm) but which does not require too long a curing time. The inventors have found that a "seed" colloid in the range from 4 nm to 8 nm can be produced by cooling the geothermal fluid to a nucleation temperature of between 25-40° C. and using a curing time of from 15 minutes to 40 minutes. More preferred is to use a nucleation temperature of approximately 30-35° C. in combination with a curing time of 15 minutes to 40 minutes. To provide a more monodisperse "seed" of approximately 5-6 nm, it is preferable to use a nucleation temperature of approximately 30-35° C. in combination with a curing time of 20 to 30 minutes.

In alternative embodiments, the curing time is greater than 5 minutes, greater than 10 minutes, greater than 15 minutes, greater than 30 minutes, greater than 1 hour, greater than 2 hours. Alternatively, the curing period may be less than 2 hours, less than 1 hour, less than 30 minutes, less than 15 minutes, approximately 5 minutes, approximately 10 minutes, approximately 15 minutes, approximately 20 minutes, approximately 30 minutes, approximately 45 minutes, approximately 1 hour or approximately 2 hours.

The methods of producing a colloidal silica concentrate described herein are extremely flexible in that different sized colloids can easily be produced by varying critical factors. Accordingly, in one aspect, the invention provides a method of modifying the colloid size in a colloidal silica concentrate comprising adjusting the nucleation temperature and curing period of the method described herein.

Ultrafiltration

Preferably, the UF feed is passed through a first ultrafiltration unit to yield a first UF retentate and a first UF filtrate. Preferably, the UF retentate has a colloidal silica concentration of between 1 m % and 15 m %.

More preferably, the UF retentate comprises a colloidal silica concentration of from 2-7% because at this concentration, the salt concentration is such that it does not yet induce gelling of the silica. If the concentration is increased beyond this without taking action to dilute the salt concentration, uncontrolled gelling of the silica can occur. It is believed that these issues come about as a result of the myriad interactions between the different components of the geothermal fluid. The inventors have found that a method combining the aforementioned steps of the method in combination with diafiltration to reduce salt concentration enables a more highly concentrated silica concentrate to be produced, for example from 15 m % to 50 m %.

Preferably, the silica concentration of the first UF retentate is from 1-15 m % and colloid size is from 3-8 nm. More preferably, the silica concentration of the first UF retentate is from 1-10 m % and colloid size is from 5-8 nm. The inventors have found that an optimal colloid size in the UF retentate for the production of commercial quality colloidal silica is from 5-6 nm and at 8-12 m %. However, the inventors have found that to achieve a concentration above about 7 m %, the UF retentate must be diafiltered as described below.

Preferably, the method of producing a colloidal silica concentrate comprises the use of more than one UF step. The inventors have found that using multiple UF steps allows the step-wise concentration of the UF feed to produce steadily more concentrated colloidal silica concentrate. Using multiple steps allows diafiltration or other processes to be carried out between or during each UF unit/step. It also allows different types of UF unit to be employed. In one embodiment, the method comprises concentrating silica to a concentration of between about 1 m % and 5 m % in a first UF step. A second UF step is preferably employed to raise the concentration further. Heat curing as described below may be carried out between UF steps. Diafiltration as described below may be carried out between or during UF steps. The second UF step takes the UF retentate from the first UF step and preferably increases colloidal silica concentration to approximately 8 m % to 15 m %. Preferably, the second UF unit concentrates to between 8 m % and 12 m %. A third UF step is preferably employed in which a third UF unit concentrates colloidal silica to between 15 m % and 50 m %, more preferably between about 15 m % and about 35 m %. Again, diafiltration is preferable prior to the third UF unit to reduce concentration of undesirable ions and impurities in the final colloidal silica concentrate. Further UF steps may be carried out as required. In a further embodiment, the first UF unit may be combined with the second UF unit to produce a single UF unit which produces a colloidal silica concentrate of from 2 m % to 15 m %.

In a particular embodiment, the invention provides a method comprising three UF units. Preferably, the silica concentrate or the cured silica concentrate is concentrated by ultrafiltration in at least one ultrafiltration unit to yield a first UF retentate. The first UF unit preferably concentrates the colloidal silica from the natural silica content (between 300 ppm and 1000 ppm i.e. 0.03-0.1 m %) to between 0.5 m % and 5 m %, between 1 m % and 4 m %, between 1.5 m % and 3 m % or approximately 2 m % in the first UF retentate. In alternative embodiments, the silica concentration of the first UF retentate is selected from the group consisting of greater than 0.1 m %, greater than 0.5 m %, greater than 1 m %, greater than 1.5 m %, greater than 2 m %, greater than 5 m %, greater than 10 m %, greater than 15 m %, between 0.1 m % and 20 m %, approximately 0.5 m %, approximately 1 m %, approximately 1.5 m % and approximately 2 m %, approximately 3 m %, approximately 4 m %, approximately 5 m %, or approximately 10 m %.

Preferably, the first UF unit comprises a spiral wound UF unit. Although other forms of UF unit (for example tubular or cartridge units) may be used, the inventors have found that the spiral wound UF units are particularly effective at filtering geothermal fluids and providing a highly concentrated retentate with minimal energy input. Preferably, the first UF unit comprises a single UF vessel with four UF elements contained therein. Preferably the first UF retentate is further concentrated at a second or further UF unit to yield a second or further UF retentate. Preferably, the second or further UF unit produces a second or further UF retentate of between 2 m % and 15 m %, between 8 m % and 15 m % or approximately 10 m %. Preferably, the second or further UF unit produces a UF retentate wherein the silica concentration is selected from the group consisting of greater than 2 m %, greater than 5 m %, greater than 10 m %, greater than 15 m %, greater than 20 m %, greater than 30 m %, greater than 40 m %, between 2 m % and 50 m %, approximately 10 m %, approximately 20 m %, approximately 30 m %, approximately 40 m % and approximately 50 m %.

Preferably the second UF unit comprises a single spiral wound UF vessel with a single, 4-inch element therein. In alternative embodiments, the second UF unit comprises an 8-inch membrane. UF units may be arranged in parallel or series to achieve the desired concentration properties.

Preferably the second UF retentate is further concentrated at a third UF unit to yield a third UF retentate. Preferably, the third UF unit concentrates the silica colloids from approximately 10 m % to between 15 m % and 50 m %, more preferably approximately 30 m %. Preferably the third UF unit comprises a tubular UF unit. Tubular UF units have been found by the inventors to provide a good flow for more highly concentrated (i.e. greater than 10 m %) colloidal silica-containing fluids.

The inventors have found that higher concentration geothermal fluids provide a greater yield of silica (see example 9). As such, the invention has particular use for silica containing geothermal fluids of greater than 300 ppm. If fluids with a lower concentration are used, the efficiency of the method is reduced and becomes less economically viable due to the increased time and resources needed to concentrate the silica to a commercially acceptable level. Accordingly, in one embodiment, the concentration of silica in the geothermal fluid is at least 300 ppm, or between 300 ppm and 1000 ppm. In one embodiment, the total silica recovery from the geothermal fluid is greater than 45% or greater than 50%. In a further embodiment, the concentration of silica in the geothermal fluid is between 400 ppm and 1000 ppm and the total silica recovery is greater than 45%.

In particular embodiments, the invention provides a method of producing a colloidal silica concentrate comprising concentrating 4-6 nm colloids using a spiral wound ultrafiltration element to 1.5 to 2.5 m % (UF1), diafiltering with water, concentrating the UF1 retentate to between 8 m % and 10 m % using a second UF unit then concentrating using a 3rd ultrafiltration unit to at least 25 m %. Preferably, a step of heat curing the concentrate is carried out prior to the third UF unit.

The UF filtrate is typically discharged or a portion processed through a reverse osmosis unit to produce demineralised water which may be used in diafiltration and other processes in the plant. Advantageously, the UF filtrate has a much lower silica concentration than present in the original geothermal fluid which therefore reduces issues with fouling of re-injection sites and watercourses. In one embodiment, the invention provides a method of production of a commercial grade colloidal silica concentrate with a concentration of approximately 13 m % to 17 m %, more preferably approximately 15 m % with a mean silica colloid size from 4 nm to 7 nm, more preferably 5-6 nm.

Figure 19:
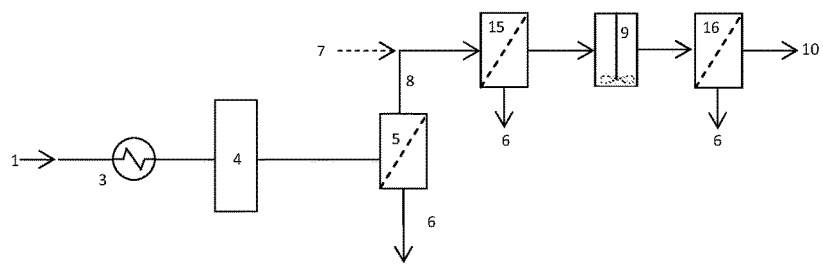
FIG. 19 shows a process flow diagram of an embodiment of the invention in which colloidal silica is produced.

FIG. 19 shows a further embodiment of the invention in which geothermal fluid 1 is passed at native pH to a heat exchanger 3. The cooled fluid is passed to a curing tank 4 where colloid growth proceeds. The cured UF feed is passed to a first ultrafiltration unit 5. The UF filtrate 6 may be discarded or passed to a diafiltration stream 7. The diafiltration stream 7 is added to the UF retentate 8 which is passed to a second UF unit 15. Once the silica is present in the UF retentate at the desired concentration, it is passed to a heat curing vessel 9 where this "seed" silica undergoes heating and optionally pressure. The larger size-specific colloids are then further concentrated in a third UF unit 16 and the colloidal silica concentrate is collected 10.

pH Adjustment

Preferably the method of producing a colloidal silica concentrate includes further steps prior to step a. comprising:
 i. determining the pH of the fluid;
 ii. if the pH of the fluid lies outside an optimum range, adjusting the pH to be within the optimum range.

Preferably, the optimum pH range is between 7 and 10. More preferably, the optimum pH range is between 7 and 9.5. More preferably, the optimum pH range is between 8 and 9. The step of adjusting the pH is only desirable if the pH is outside of an optimum pH range. The pH adjustment to adjust to within this range is desirable to prevent gelling and stabilise the colloidal silica concentrate formed. Preferably, the pH of the geothermal fluid is increased prior to passing the fluid to the curing tank, or prior to UF. Preferably, the pH is increased by adding sodium hydroxide to the silica concentrate. Preferably, the pH is adjusted to at least 7.5, at least 8.0, at least 8.5, at least 9.0, or at least 9.5. Preferably the pH is adjusted to approximately 7.5, 8.0, 8.5, 9.0, 9.5 or 10.0. Alternatively, the pH adjustment may be performed after curing and UF and optionally heat curing to produce a more stable colloidal silica concentrate for storage.

Diafiltration

Ultrafiltration not only concentrates the silica, but also concentrates other less desirable species such as salt ions or impurities (referred to as "salts"). Where impurities are soluble, they pass seamlessly into filtrate stream. However, some impurities are associated with the colloid by being either incorporated into the structure or held by a double layer. The inventors have found that one of the unexpected problems with using geothermal fluids as a source fluid containing silica is that other undesirable species such as salt ions or impurities are also present. The inventors had considerable issues with precipitation and gelling of silica in the presence of these undesirable species once a particular concentration of silica was reached. It is believed that the undesirable species reacted with the silica in solution and resulted in uncontrolled precipitation and gelling of the silica which blocked equipment and prevented further concentration. By diafiltering the UF retentate with a diafiltration liquid of lower concentration of salt ions or impurities than the UF retentate contained, the inventors have reduced the concentration of such ions or impurities. When diafiltering a fluid containing silica, the diafiltration acts to dilute the silica to some degree and therefore works against the UF concentrating steps. Despite this counteracting effect on overall silica concentration, the inventors have found that the disproportionately larger effect of diafiltration in reducing salt concentration unexpectedly inhibits gelling thus enabling silica concentration to commercial levels (i.e. 15 m % or greater).

The salt content of the UF retentate is determined by measuring total dissolved solids (TDS) or measuring conductivity in units of millisiemens per centimetre. Preferably, the salt content is reduced as far as possible and preferably to less than 600 ppm. Ideally, the salt content is reduced to less than 500 ppm or 400 ppm TDS. The undesirable species may also include toxic components such as arsenic, antimony, mercury and boron and the concentration of these species is also reduced by diafiltration. Diafiltration is typically carried out by adding the diafiltration liquid to the fluid after or during ultrafiltration. Further ultrafiltration steps may also be used and diafiltration may be carried out on one or more of the ultrafiltration feeds. In one embodiment, the volume of diafiltration water used is approximately five times the volume of the colloidal silica concentrate obtained from a first or further UF unit.

Tests by the inventors have shown that during silica colloid production, toxic components including arsenic, antimony, mercury and boron are not bound in the silica colloids and can therefore be effectively removed from the concentrate by combined ultrafiltration and diafiltration. Accordingly, in a further aspect, the invention provides a method of concentrating silica from a geothermal fluid while minimising the concentration of one or more of the toxic components. This aspect is particularly useful because some silica is used as a flocculent in the beverage industry and therefore must have safe levels of toxic components. In an alternative aspect, the invention provides a method of extracting toxic components from the geothermal fluid while concentrating silica by collecting the toxic components for disposal or further treatment. This aspect has particular utility for geothermal source fluids with high levels of toxic components where there is a risk that of contamination of groundwater or watercourses.

Preferably the method of producing a colloidal silica concentrate includes a further step comprising diafiltering the UF retentate with a diafiltration stream to reduce the concentration of undesirable salts, ions or impurities. A diafiltration step as described below may be used in conjunction with any other method described herein. Preferably, diafiltration is carried out on the colloidal silica concentrate after the first UF step when the colloidal silica concentration is approximately 4 m %. At this concentration, colloids that are preferably maintained at approximately 5 nm in size become unstable when concentrated to over about 7 m % without diafiltration. At 2 m % 98% of the water has been removed which significantly reduces the amount of diafiltration fluid required. Preferably the diafiltration stream comprises a liquid with a lower concentration of ions or impurities than the UF retentate. Preferably the diafiltration stream comprises a liquid with a lower conductivity than the UF retentate. More preferably, the diafiltration stream comprises a reverse osmosis permeate received from a reverse osmosis unit. Preferably, the step comprising diafiltering the UF retentate is carried out on a colloidal silica concentrate of between 1-15 m %. Within this range, if the colloid size is smaller, it is believed that it is less stable and more prone to gelling. Accordingly, where the colloid size is less than 6 nm, it is preferable to diafilter at a concentration of between 1 m % and 10 m %. More preferably, diafiltration is carried out where the colloidal silica concentration is between 2% and 5%. In some embodiments, the salt concentration of the geothermal fluid is such that diafiltration is preferably carried out where the colloidal silica concentration is lower than or equal to approximately 4 m %. In one embodiment, diafiltration is carried out to reduce the salts concentration of a first or further UF retentate to less than 600 ppm salts. In one embodiment, diafiltration is carried out to reduce the salts concentration of a first or further UF retentate to a level of less than 0.7 mS/cm.

Preferably diafiltration is carried out using at least 3 times the amount of diafiltration fluid compared to the amount of UF retentate. In one embodiment, between 3 and 10 times the amount of diafiltration fluid is used compared to the amount of UF retentate.

Preferably the diafiltration stream comprises a reverse osmosis permeate produced by a reverse osmosis unit adapted to receive at least a portion of the ultrafiltration filtrate. The RO is configured to retain the undesirable feed components in the RO concentrate thus providing an RO permeate low in salts/ions and other undesirable components.

In one embodiment, geothermal fluid was cured to form 4-6 nm colloids then transferred into the first stage of ultrafiltration where the fluid was initially concentrated to between 2-10 m % using spiral wound ultrafiltration elements. The resulting concentrate was diafiltrated with low salinity water produced by a reverse osmosis circuit treating some of the ultrafiltration filtrate stream. Once diafiltration has been completed the concentrate pH is optionally adjusted to between pH 8-9 to stabilise the concentrate.

However, in some embodiments, the inventors have found that this step of pH adjustment is not required. This concentrate can be used as a "seed" to grow larger colloids or used as the feed to produce precipitated silica.

Heat Curing

Following trials of the process to produce silica colloids, the inventors have found that the size and dispersity of colloids produced can be modified by adjusting the temperature and pressure during the curing process. Accordingly, the method of producing a colloidal silica concentrate may include a further step of heat curing the U F retentate to increase the colloid size in the colloidal silica concentrate. The heat curing step may be carried out on the first or a further UF retentate. This step is referred to as heat curing because the fluid containing the silica is heated to a heat curing temperature and maintained at that temperature for a heat curing period. It is believed that in this process the smaller colloids of silica dissolve, which produces monomeric silica which precipitates onto the larger colloids which increases the size of the larger colloids. The inventors have found that heat curing may be used to produce a substantially monodisperse colloidal silica concentrate with a particular dispersity in a size from 5 to 120 nm in diameter. Heat curing may be achieved using any appropriate heating apparatus and may be carried out in any appropriate vessel such as a tank, a channel or a pipe. A heat curing step as described below may be used in conjunction with any other method described herein in order to increase the size of colloid. The inventors have found that methods comprising a cooling step (to initiate colloid growth), concentration by ultrafiltration, diafiltration and heat curing can provide a size specific colloidal silica concentrate from geothermal fluids with a silica concentration of greater than 300 ppm. This is despite the difficulties inherent in using such fluids with high levels of dissolved silica and other species that typically block pipework. Such fluids were generally considered to be unusable before the invention described herein was conceived. In particular embodiments, the heat curing step is carried out after the second ultrafiltration step when the silica concentration if from 7.5 to 12.5 m %, more preferably 9-11 m %.

FIG. 1A shows an embodiment of the invention in which the pH of geothermal fluid 1 is adjusted to between pH8-9 via a dosing means 2 then passed to a heat exchanger 3. The cooled fluid is passed to a curing tank 4 where colloid growth proceeds. The cured U F feed is passed to a first ultrafiltration unit 5. The UF filtrate 6 is discarded or sent for re-injection to the well. A diafiltration stream 7 is added to the UF retentate 8. Once the silica is present in the U F retentate at the desired concentration, it is passed to a heat curing vessel 9 where this "seed" silica undergoes heating and optionally pressure. The larger size specific colloids produced in the colloidal silica concentrate are then collected 10.

Figure 1B:
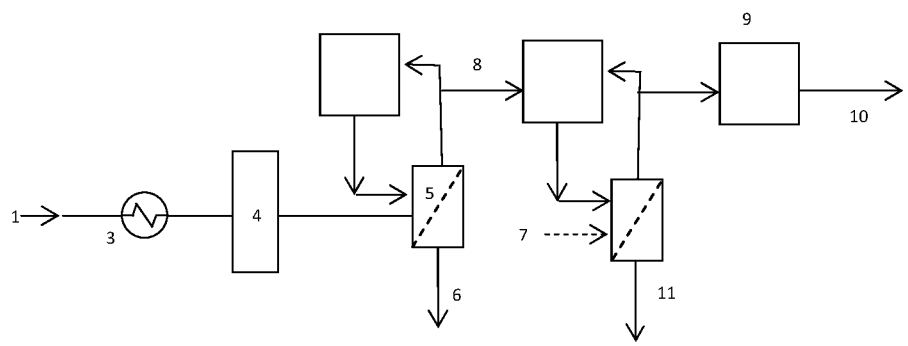

In a further embodiment of the invention shown in FIG. 1B, the geothermal fluid 1 is passed to a heat exchanger 3. The cooled fluid is passed to a curing tank 4 where colloid growth proceeds. The cured UF feed is passed to a first ultrafiltration unit 5 where it is recirculated around the UF1 unit to concentrate the colloidal silica solution. The UF filtrate 6 is discarded or sent for re-injection to the well. Once desired concentration is achieved in the first ultrafiltration unit, it is sent to the second ultrafiltration unit for further processing. A diafiltration stream 7 is added to the UF retentate 8 that is being recirculated around the UF2 unit. The UF filtrate 11 is discarded or sent for re-injection to the well. Once the silica is present in the UF retentate at the desired concentration, it is passed to a heat curing vessel 9 where this "seed" silica undergoes heating and optionally pressure. The larger size-specific colloids produced in the colloidal silica concentrate are then collected 10.

The UF retentate produced by the method of producing a colloidal silica concentrate (described herein) contains colloidal silica. Preferably, the heat curing step comprises heating the UF retentate to a heat curing temperature for a heat curing period. The heat curing temperature helps to determine the final mean size of the colloid. Preferably the heat curing temperature is from 90° C. to 200° C. and the colloid size in the colloidal silica concentrate is from 5 nm to 120 nm, or from 5 nm to 50 nm, or from 5 nm to 30 nm. The inventors have demonstrated the efficacy of methods incorporating heat curing to produce larger colloids at curing temperatures as high as 200° C. or slightly lower at 180° C. or 160° C. However, for energy efficiency purposes and ease of use, it is generally desirable to use lower temperatures. Accordingly, the heat curing temperature is preferably from 95° C. to 125° C., from 93° C. to 98° C., from 95° C. to 100° C., or from 100° C. to 110° C. In one embodiment, the heat curing temperature is from 93° C. to 100° C. and the colloid size in the colloidal silica concentrate is from 7-12 nm. Alternatively, the temperature is from 95° C. to 97° C. and the colloid size in the colloidal silica concentrate is from 8-11 nm.

Alternatively, the temperature is from 105° C. to 115° C. and the colloid size in the colloidal silica concentrate is from 15 to 30 nm. In one embodiment, the heat curing temperature is from 107° C. to 113° C. and the colloid size in the colloidal silica concentrate is from 15 to 25 nm. In a further embodiment, the colloid size in the colloidal silica concentrate is approximately 5 nm, 8 nm, 10 nm, 12 nm, 15 nm, 20 nm, 25 nm, 50 nm, 75 nm, 100 nm, or 120 nm. Accordingly, in a further aspect, the invention provides a method of producing a substantially monodisperse colloidal silica concentrate comprising a colloid size of approximately 5 nm, 8 nm, 10 nm, 12 nm, 15 nm, 20 nm, 25 nm, 30 nm, 50 nm, 75 nm, 100 nm, or 120 nm.

In one particular embodiment, the method of producing a colloidal silica concentrate according to the first aspect further comprises a step of heat curing the UF retentate, wherein heat curing comprises heating the UF retentate to between 80° C. and 180° C. for a heat curing period sufficient to obtain a mean silica colloid size in the colloidal silica concentrate of between 8 and 30 nm. Example 4 and example 10, and FIGS. 10A, 10B, 11A, 11B and 11C show spontaneous growth of colloidal silica particles in the region of about 8 to about 30 nm in various trials using heat curing. In these trials the colloid particles have a standard deviation of less than 5 nm and a polydispersity index of less than 1.5.

The pressure during the heat curing step can also affect the size of the colloids formed. Preferably, the pressure is sufficient to obtain a colloid of between 5 nm and 120 nm. The inventors have found that using atmospheric pressure typically forms smaller colloids than using increased pressure for the same heating duration. The pressure is desirable to keep the fluid as a liquid at temperatures over 100° C. Accordingly, in one embodiment, the heat curing pressure is increased to greater than atmospheric pressure and the colloid size is greater than 10 nm. More preferably the heat curing pressure is at least 1.5 bar and the colloid size is greater than 15 nm. In alternative embodiments the heat curing pressure is from 1 bar to 4 bar, more preferably approximately 1.5 bar, 2 bar, 2.5 bar or 3 bar. Pressure may be autogenous (i.e. result from the heating) or induced using a pressurising means. Pressurisation is used so that the cured colloidal silica feed or the colloidal silica concentrate remains in the liquid phase.

In a preferred embodiment, the colloid size in the UF retentate comprises approximately 3 nm to 8 nm, 4 nm to 8 nm, more preferably approximately 5-6 nm, and this colloid is used as a "seed" to produce larger colloids during the heat curing process. This seed colloid is preferable because colloids of approximately 5 nm are prone to gelling if concentrated past 12 m % without a dispersant. Accordingly, the methods described herein concentrate the "seed" colloid to a certain level then grow the colloid to a larger size so as to produce a larger mean silica colloid size to increase the stability of the more concentrated solution (i.e. reduce the likelihood of gelling). The seed colloid is subjected to heat curing and optionally pressure to produce larger colloids that are still substantially monodisperse.

In one embodiment, the heat curing method comprises combining a colloidal silica "seed" fluid from the UF retentate comprising silica colloids with a "growth" colloidal silica concentrate. Preferably, the growth fluid comprises silica colloids of a smaller size than the colloids in the seed fluid. Preferably, the growth fluid is combined with the seed fluid at a heat curing temperature as described herein. The growth fluid is typically titrated into the seed fluid at a specified rate. The rate can be calculated according to principles outlined in the Iler silica reaction calculation (Iler 1979 page 315). The heat curing is typically carried out in an agitated vessel.

Preferably, the seed fluid comprises silica colloids of between 4-10 nm, more preferably between 5-8 nm. Preferably, the seed fluid has colloidal silica concentration of from 2-15 m %, more preferably from 5-10 m %. Preferably the growth fluid comprises silica colloids of approximately 2-10 m % and a colloid size of approximately 3-6 nm).

The inventors have found that the pH of the solution typically increases during the heat curing reaction. It is believed that this occurs due to hydroxide ions being formed during the dissolution and re-precipitation of silica. In order to retain the pH in an optimum range for colloid growth and storage, the method may comprise a step of adjusting the pH. Preferably, the pH is in a range of from pH8-9. pH may be adjusted by methods known to those of skill in the art. An increase or decrease in pH may be achieved by any method known to those of skill in the art but is typically carried out by addition of an acid or alkali to the fluid.

Heat curing may be carried out in any suitable vessel, and such vessels will be known to those of skill in the art. Preferably the heating is carried out in an autoclave if temperatures over 100° C. are required (i.e. pressurised), or in a jacketed tank if temperatures below 100° C. are required (i.e. atmospheric pressure). Preferably the energy used to heat the cured colloidal silica feed or the colloidal silica concentrate is sourced from the heat of the incoming geothermal fluid.

Preferably, a heat curing temperature of between 95 to 100° C., or from 96 to 98° C. is used to produce colloids varying in size from 7-12 nm, preferably 7-10 nm. Pressurised systems at between 115 and 125° C., more preferably 118-122° C. are preferably used to grow colloids from 10-50 nm.

Preferably, the heat curing period is from 20 minutes to 168 hours. Preferably the heat curing period is approximately 1, 1.5, 2, 3, 5, 12, 24, 36, 48, 60, 72 or 84 hours. In alternative embodiments, the heat curing period is approximately 20, 30, 60, 90, 120, 240, 300, 360, 420 or 480 minutes. The inventors have found that this method is effective in producing silica colloids from 5 to 50 nm in diameter which are suitable for commercial sale. The heat cured fluid may be further concentrated according to UF means described herein, for example using a second, third or further UF unit.

In particular embodiments, the UF retentate is concentrated to between 8 m % and 12 m % with a colloid size of from 4 to 6 nm and heat curing at between 95° C. and 100° C. is carried out for between 1-168 hours to produce a product varying in size from 7-12 nm. Preferably, the product is then cooled and concentrated to between 25 m % and 40 m %, more preferably 28 m % to 32 m % by a further UF unit.

Heat curing may be carried out in any appropriate vessel that is able to retain the fluid and maintain the pressurised (optional) and heated liquid. It is also desirable that the vessel is able to be cleaned easily. Preferably the heat curing vessel is a glass jar, a pressure cooker, a jacketed tank, pressure tubing or an autoclave. Heating may be carried out using any appropriate method, however, by way of example, the heating may be carried out by electric heater or by heat obtained during the initial cooling of the geothermal fluid, or passing geothermal fluid through a jacketed tank or autoclave.

In one embodiment, the seed solution produced by the ultrafiltration plant (2-10 m % at 5-8 nm) was batched into an autoclave which was heated to temperatures of at least 110° C. The majority of the energy used to heat the autoclave is sourced from the heat of the incoming geothermal fluid (90-150 degrees C.). The autoclave was pressurised to greater than 1 bar, and preferably at least 2 bar to ensure that the colloidal silica solution remains liquid. The concentrate remains in the autoclave for a period of at least 2 hours. After 2 hours the concentrate is removed from the autoclaved and cooled. This method is used to grow colloids from 10 to 120 nm in diameter.

In another embodiment, a measured amount of colloidal silica seed solution (2-15 m % and 5-8 nm) was added to heated vessel which was agitated and heated to 95-97° C. Growth colloidal silica (2-10 m % and 3-5 nm) was then continuously added to the seed solution at a measured rate by a based on a percentage of the Iler silica reaction calculation (Iler 1979 page 315). In this process the smaller colloids of silica dissolve, which produces monomeric silica which precipitates onto the larger colloids which makes them grow.

During the reaction the pH of the solution was monitored as OH— ions are formed during the dissolving and re-precipitation of silica. If the pH rose (>9.5) then the solutions pH is lowered through the addition of colloidal silica concentrate where the pH has been lowered by passing the solution through ion exchange resins.

In particular embodiments, the invention provides a method of producing a colloidal silica concentrate from a geothermal fluid comprising silica, the method comprising:
a. cooling a geothermal fluid from an initial temperature to a nucleation temperature between 25 and 70° C. to initiate silica colloid growth;
b. curing the geothermal fluid for at least 5 minutes or at least 20 minutes to produce an ultrafiltration (UF) feed;
c. passing the UF feed to a first UF unit to yield a first UF retentate;
d. diafiltering the UF retentate with water;
e. passing the diafiltered UF retentate to a second UF unit to yield a second UF retentate;
f. heat curing the second UF retentate at between 95-100° C., at atmospheric pressure, for between 1 and 168 hours to produce a colloidal silica concentrate of between 7 and 12 nm;
g. concentrating the heat cured colloidal silica concentrate in a third UF unit to between 15 and 50 m %.

Preferably, the first UF retentate has a silica concentration of between 1 m % and 5 m %, more preferably 1.5 to 3 m %. Preferably, the second UF retentate has a silica concentration of between 2 m % and 15 m %, more preferably 8 to 12 m %.

In particular embodiments, the invention provides a method of producing a colloidal silica concentrate from a geothermal fluid comprising silica, the method comprising:
  a. cooling a geothermal fluid from an initial temperature to a nucleation temperature between 25 and 70° C. to initiate silica colloid growth;
  b. curing the geothermal fluid for at least 5 minutes to produce an ultrafiltration (UF) feed;
  c. passing the UF feed to a first UF unit to yield a first UF retentate;
  d. diafiltering the UF retentate with water;
  e. passing the diafiltered UF retentate to a second UF unit to yield a second UF retentate;
  f. heat curing the second UF retentate at between 110 and 130° C., with greater than 1 bar pressure, for between 1 and 168 hours to produce a colloidal silica concentrate of between 12 and 30 nm;
  g. concentrating the heat cured colloidal silica concentrate in a third UF unit to between 15 and 50 m %.

Preferably, the first UF retentate has a silica concentration of between 1 m % and 5 m %, more preferably 1.5 to 3 m %. Preferably, the second UF retentate has a silica concentration of between 2 m % and 15 m %, more preferably 8 to 12 m %.

In summary, the methods of producing colloidal silica concentrates described herein represent a considerable improvement on known technologies. Traditional methods require the purchase of sodium silicate and also the use of expensive ion exchange resins to remove the sodium and induce polymerisation to produce the colloidal silica. Using ion exchange resins in particular causes difficulties because they can break down and contaminate the colloidal silica concentrate. The present invention provides significant advantages including:
  cost savings and increased purity by omitting the use of ion exchange resins;
  "free" energy for pumps and other equipment from geothermal power;
  "free" silica from geothermal fluid;
  increased value for geothermal power plant operators by reducing silica issues thus enabling greater energy extraction and less likelihood of scaling and blocking of the operators reinjection wells;
  negating the need to add acid to the SGW to prevent blockage of the reinjection well;
  reduction in carbon emissions compared to traditional processes due to using renewable energy for concentrate production;
  flexibility in being able to be apply the process to feeds of differing concentration, thus being applicable to many different geothermal sites around the world. The process can be customised to those sites based on the degree of ultrafiltration (i.e. processing time or cycling through the membranes) required to produce the silica concentrate without substantive modifications to the method.

Cleaning Frequency

Using UF to produce a colloidal silica concentrate can require cleaning or replacement of UF units which become blocked with colloidal and precipitated silica. In an industrial context, cleaning frequency is a major consideration because plant shutdown for cleaning can cause decreased economic efficiency and issues with silica scaling and fouling in downstream equipment and processes. The inventors have found that their methods described herein provide for the production of a colloidal silica concentrate in which the cleaning frequency of the UF units is less frequent than one clean per month. Preferably, the cleaning frequency is less frequent than once every two weeks or less frequent than once per week. In a particular embodiment, cleaning typically comprises:
  a flush through the entire system of the UF vessels with permeate sourced from the UF filtrate by processing it through a RO vessel or any other suitable demineralised source of water such as condensate from the geothermal plant; and
  a flush through the system or recirculation around the UF system with sodium hydroxide at a concentration of 0.25% NaOH for a period of at least 2 hours and hydrochloric or any other suitable acid at a concentration of 0.1% for a period of 2 hours.

The inventors have found that the process comprising two or three UF stages can be carried out with minimal cleaning. A flush of the UF units can be carried out after concentration of the silica to a desired level wherein the flush is carried out using potable water, for example the filtrate solution, or tap water. The ability to flush the system using water provides benefits over having to use cleaning chemicals in terms of safety, cost and availability. Availability of such chemicals in the often remote locations where geothermal fluids are found is a major advantage.

Particulate Screen

Preferably the method of producing a colloidal silica concentrate includes a further step comprising filtering the geothermal fluid to remove any particulate material prior to ultrafiltration. Preferably, the filtration is carried out by a cartridge filter. Preferably the filter comprises a screen between 10 microns and 200 microns. This step enables geothermal fluid from a variety of sources to be efficiently processed by removing silt, sand or particulate material from the fluid. These components could potentially cause mechanical blockage in the UF membranes downstream, thus hindering the UF performance.

Geothermal Fluid

Previous methods dealing with silica extraction from geothermal waters used temperatures of around 50-70° C. At this temperature, problems with silica scaling were not encountered because the concentration of silica in the geothermal fluid is inherently lower, due to the saturation level also being lower. Therefore the problem of silica precipitation is greatly reduced. The methods described herein are expected to work with geothermal fluids of any initial temperature provided it can be cooled to achieve oversaturation and colloid formation. Fluids have a higher silica saturation point at higher temperatures therefore higher temperature fluids have the capacity to carry a higher concentration of silica. The commercial viability of the process depends to some degree on having a highly concentrated silica concentrate. Accordingly, it is generally preferable for the geothermal fluid comprising silica to have an initial temperature of at least 85° C. Preferably, the concentration of silica in the geothermal fluid is at least 300 ppm. Most geothermal sources have a temperature much higher than this, and have a concomitant high silica concentration that is at, or near saturation. If the original temperature of the geothermal source fluid is reduced, this lowers the silica saturation concentration and can cause uncontrolled precipitation of silica. This in turn can block equipment and watercourses causing serious problems.

The inventors have found that the method of producing a colloidal silica concentrate described herein, and the associated system (apparatus), are flexible enough to be adapted to fluids over a range of temperatures. This is a particular advantage because geothermal sources can differ in initial temperature.

Accordingly, in one embodiment, the initial temperature of the geothermal fluid is from 85° C. to 200° C. In an alternative embodiment, the initial temperature of the geothermal fluid is from 90° C. to 150° C. Preferably, the initial temperature of the geothermal fluid is at least 90° C., at least 100° C., at least 110° C., at least 120° C., at least 130° C., at least 140° C., at least 150° C., at least 160° C., at least 170° C., at least 180° C. or at least 190° C. Preferably the temperature of the geothermal fluid is less than 200° C., less than 190° C., less than 180° C., less than 170° C., less than 160° C., less than 150° C., less than 140° C., less than 130° C., less than 120° C., less than 110° C., less than 100° C., or less than 90° C. Preferably the initial temperature of the geothermal fluid is approximately 80° C., 90° C., 100° C., 110° C., 120° C., 130° C., 140° C., 150° C., 160° C., 170° C., 180° C., 190° C. or 200° C.

At this range of temperatures and at a relatively high silica concentration (i.e. over 300 ppm), obtaining a stable silica concentrate with minimal fouling of equipment represents a major advance in the field and has the potential to lead to substantial efficiency gains in geothermal energy power generation. The invention also provides a breakthrough in being able to collect the silica component of the geothermal fluid at high temperatures and high silica concentrations thus increasing extraction efficiency and yield of components from the source fluid.

The concentration of silica in geothermal fluid varies depending on the source. This is predominantly determined by the temperature (which influences silica saturation point) and the geological composition. Previous studies (e.g. WO2009/079047) have found that sources with a higher concentration of silica in the source geothermal fluid (e.g. over 275 ppm) are unusable due to the tendency for the silica to precipitate out of solution on cooling and foul equipment. Due to the inventor's endeavours in this field of research, source fluids with even higher silica concentration can now be successfully processed. The precipitation and fouling issues experienced in the past are mitigated or avoided altogether during silica concentration. Accordingly, the methods described herein are effective for treatment of geothermal fluids with silica concentration of over 300 ppm. Other methods to increase silica concentration in geothermal fluids, and to minimise silica precipitation are described in PCT/NZ2015/050064 and NZ705380.

The present invention employs ultrafiltration to recover silica colloids over a particular size from the geothermal fluid. Therefore if the fluid is saturated with silica, but colloids have not formed, recovery using UF will be essentially 0%. At 40° C. saturation is around 250 ppm therefore the geothermal fluid is required to have a silica content well above saturation (i.e. $SiO_2$>300 ppm) for there to be economic recovery of colloidal silica by ultrafiltration.

Accordingly, in one embodiment, the invention has particular use to produce a colloidal silica concentrate from a geothermal fluid with silica concentration of at least 300 ppm. The methods described herein are also applicable to geothermal fluids with higher silica concentration and such fluids provide advantages by not requiring such a degree of concentration to reach commercially acceptable concentrations of silica (e.g. over 15 m %). Accordingly, the concentration of silica in the geothermal fluid is at least 400 ppm, at least 500 ppm, or at least 600 ppm, at least 700 ppm, at least 800 ppm, at least 900 ppm, at least 1000 ppm, at least 1100 ppm, at least 1200 ppm, at least 1300 ppm, at least 1400 ppm, at least 1500 ppm, at least 1600 ppm, at least 1700 ppm, at least 1800 ppm, at least 1900 ppm, at least 2000 ppm, at least 2100 ppm, at least 2200 ppm, at least 2200 ppm, at least 2300 ppm, at least 2400 ppm, at least 2500 ppm, at least 2600 ppm, at least 2700 ppm, at least 2800 ppm, at least 2900 ppm, at least 3000 ppm, at least 4000 ppm or at least 5000 ppm.

Precipitated Silica

The inventors have found that the methods described herein can also be used as a precursor to a method for preparing precipitated silica. Precipitated silica may be formed from the silica concentrate at any stage in the process although preferably the precipitated silica is obtained from the colloidal silica concentrate obtained at approximately 2 m % to 50 m %. Precipitation may be carried out before or after heat curing. In one embodiment, the colloidal silica feed fluid is treated to produce precipitated silica. Preferably, precipitated silica is formed by one or more of the following processes:
  addition of a precipitant to the colloidal silica feed fluid;
  addition of a precipitant to a UF retentate;
Precipitated silica could be produced from fluid before or after concentration by ultrafiltration or other methods such as reverse osmosis.

Preferably, the method for the production of a colloidal silica concentrate further comprises a step of producing precipitated silica from the UF retentate after ultrafiltration. Preferably, the step of producing precipitated silica comprises adding a precipitant to the UF retentate to produce a precipitant feed mixture. Preferably, the precipitant is at least one of NaCl, $CaCl_2$, $MgCl_2$, $FeCl_3$, Polyaluminium chloride and PLC. Preferably, the colloidal silica feed fluid is passed to an agitated tank for mixing with the precipitant. The mixed fluid is then passed to a settling tank for precipitation to occur.

Preferably, the step of producing precipitated silica further comprises:
  a. settling the precipitant feed mixture to allow precipitated silica to settle
  b. adding a flocculant to bind the silica flocs together; and
  c. removing the precipitated silica;

Preferably, the precipitant feed mixture is agitated, preferably in an agitated tank. Preferably, the precipitated silica is washed. Preferably, the precipitated silica is dried. Preferably the flocculant is sodium silicate.

Preferably the step of producing precipitated silica is carried out on a UF retentate comprising silica colloids of from 5 nm to 50 nm. The precipitation step may be carried out on any sized colloid depending on the desired end product. In one embodiment, the precipitation step is carried out on a colloid of size 5-8 nm, or from 7-12 nm, or from 8-11 nm, or from 15 to 30 nm, or from 15 to 25 nm, or approximately 5 nm, 8 nm, 10 nm, 12 nm, 15 nm, 20 nm, 25 nm or 50 nm.

Figure 2:
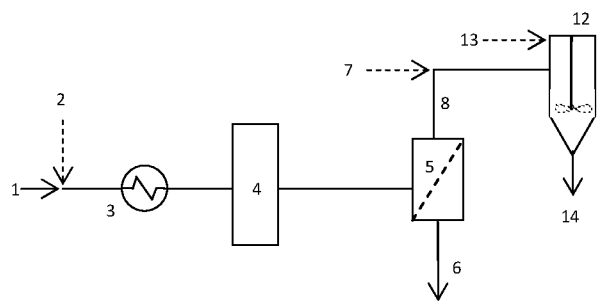
FIG. 2 shows a process flow diagram of an embodiment of the invention in which precipitated silica is produced.

FIG. 2 shows an embodiment of the invention in which the pH of geothermal fluid 1 is adjusted to between pH8-9 via a dosing means 2 then passed to a heat exchanger 3. The cooled fluid is passed to a curing tank 4 where colloid growth proceeds. The cured UF feed is passed to a first ultrafiltration unit 5. The UF filtrate 6 is discarded or sent for reinjection. A diafiltration stream 7 is added to the UF retentate 8. Once the silica is present in the UF retentate at the desired concentration, the colloidal silica concentrate is passed to a settling tank 12 to which is added a precipitant 13. Following a settling period, the precipitated silica is filtered from the mixture and removed 14.

In a particular embodiment, the step of producing precipitated silica uses the "seed" colloid concentrate (as defined herein) as a feed. Preferably, the seed colloid concentrate comprises silica colloids of approximately 5-8 nm and at a concentration of from 2% to 15%, more preferably from 5% to 12%, or from 8% to 12%. The precipitation step may be carried out instead of heat curing. Alternatively, heat curing may be performed as described above, and the heat cured colloidal silica concentrate may be treated to produce precipitated silica.

Preferably, the step of removing precipitated silica comprises filtering the precipitant feed mixture. In an alternative embodiment, the step of removing precipitated silica comprises spray drying the precipitant feed mixture. The removal of precipitated silica may be carried out according to methods known to those of skill in the art. In particular embodiments, the precipitated silica is removed by a filter capable of collecting precipitated silica from the settling tank. Preferably, the filter is a vacuum filter or a filter press.

Pressurising the Plant Inlet

The inventors found that introducing the geothermal fluid to a pressurised system assisted with obtaining a high silica saturation index and prevented flashing of the fluid. Preferably the system was pressurised when introducing high temperature geothermal fluid (above 100° C.) to prevent flashing of geothermal fluid. To do this, a clean water source was used to pressurise the plant inlet above the saturation pressure of geothermal fluid at the incoming fluid temperature. Accordingly, in one embodiment, the method comprises pressurising the system for cooling the geothermal fluid to a nucleation temperature to a pressure greater than the saturation pressure of geothermal fluid at the incoming fluid temperature.

Reheat of Fluid Discharge

Preferably, a fluid discharged from the process is reheated by heat captured during cooling of the geothermal fluid. Preferably, the fluid discharged is the UF filtrate from any one or more of the UF units. Preferably, the fluid discharged from the process is re-heated to between 60 and 80° C. Reheating is often a requirement of the geothermal field operator to prevent undue cooling of the geothermal fluid. The inventors have found that a particularly efficient way to re-heat the fluid to be discharged from the process is to use heat from the cooling of the geothermal fluid prior to or during colloid formation. Preferably, the fluid discharged from the process is at least one of a UF filtrate from the ultrafiltration unit, the precipitant feed mixture, a reverse osmosis permeate, or any other liquid stream produced as a result of the process.

Dispersant

Previous attempts to produce colloidal silica from geothermal fluids have required the use of a dispersant (otherwise known as a stabiliser) to reduce particle agglomeration. The inventors have found that the methods described herein can be used without a dispersant. This reduces overall material cost and improves the purity of the colloidal silica product which makes it suitable for various commercial uses. Accordingly, in one embodiment, the method of producing a colloidal silica concentrate does not include the use of a dispersant.

In one particular embodiment, the invention provides a method of producing a colloidal silica concentrate from a geothermal fluid comprising silica, the method comprising:
  a. cooling a geothermal fluid from an initial temperature of over about 85° C. to a nucleation temperature between about 25° C. and about 70° C. to initiate silica colloid growth;
  b. curing the geothermal fluid after cooling to produce an ultrafiltration (UF) feed with a mean silica colloid size of between about 3 nm and about 8 nm;
  c. treating the UF feed using ultrafiltration to yield a UF retentate;
  d. diafiltering the UF retentate during or after ultrafiltration to produce a colloidal silica concentrate;
wherein the step of cooling a geothermal fluid from an initial temperature of over 85° C. to a nucleation temperature occurs in a period of less than about 30 seconds, and the method further comprises pressurising the system for cooling the geothermal fluid to a pressure greater than the saturation pressure of the geothermal fluid at the fluid temperature and wherein the silica saturation index (SSI) achieved during nucleation is at least 1.5.

In a further particular embodiment, the invention provides a method of producing a colloidal silica concentrate of between about 15 m % and about 50 m % from a geothermal fluid comprising silica, the method comprising:
  a. cooling a geothermal fluid from an initial temperature of over 85° C. to a nucleation temperature of between about 25° C. and about 70° C. to initiate silica colloid growth;
  b. curing the geothermal fluid after cooling for a curing period sufficient to produce an ultrafiltration (UF) feed with a mean silica colloid size of between about 3 nm and about 8 nm;
  c. treating the UF feed using ultrafiltration to yield a first UF retentate of approximately 1-7 m %
  d. diafiltering the first UF retentate to produce a second UF feed;
  e. treating the second UF feed using ultrafiltration to yield a second UF retentate of approximately 8-15 m %;
  f. heat curing the second UF retentate, wherein heat curing comprises heating the UF retentate to a temperature and for a period sufficient to produce a colloidal silica concentrate with a mean silica colloid size of between about 8 nm and about 25 nm;
  g. treating the heat cured second UF retentate using a third ultrafiltration to yield a colloidal silica concentrate;
wherein the polydispersity index of the silica concentrate is less than 1.5.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

EXAMPLES

Example 1—Comparison of Commercial Grade Colloidal Silica with Colloidal Silica Produced by the Present Invention Materials and Methods Chemical analysis was undertaken at a commercial lab using ICP and XRF Results

TABLE 1

Comparison of commercial grade colloidal silica with colloidal silica produced by the present invention

| | LUDOX HS-40 | EM Colloid | |
| --- | --- | --- | --- |
| | Size | | |
| Element | 12 nm (%) | 8 nm (%) | Factor Difference |
| $SiO_2$ | 94.125 | 94.125 | 1.0 |
| Ca | 0.014 | 0.216 | 15.5 |
| K | 0.083 | 0.227 | 2.7 |
| Al | 0.026 | 0.086 | 3.3 |
| Na | 0.987 | 0.915 | 0.9 |
| B | 0.0352 | 0.0555 | 1.6 |
| Sb | nd | nd | |
| As | nd | nd | |
| S | 0.038 | 0.008 | 0.2 |
| Cl | 0.041 | 0.012 | 0.3 | nd = not detectable using this analytical method

Conclusion

Silica produced according to the present invention is comparable in quality to commercial grade silica. The content of toxic components such as Arsenic (As), Antimony (Sb) and Boron (B) are all well within acceptable safety limits.

Example 2

Silica recovery at various nucleation temperatures was measured by rate of molybdate reactive silica disappearance. This shows the conversion of monomeric silica to colloidal silica.

Materials and Methods

Geothermal fluid was received at 124° C. and samples (approx. 200 ml each) were taken following cooling to specified temperatures. The samples were immediately tested using the molybdate reactive silica test in an on-site laboratory (refer to definition for test information). Trials at two different geothermal sites were carried out (Trial A and Trial B)

Results

FIG. 3A shows the silica recovery for Trial A at various nucleation temperatures ranging from 30° C. to 70° C. FIG. 3B shows the silica recovery for Trial B at various nucleation temperatures ranging from 30° C. to 50° C. FIG. 4 shows the particle size attained at various nucleating temperatures from approximately 30° C. to approximately 70° C.

Conclusion

It can be seen that the fastest conversion of monomeric silica into colloidal silica growth is where the nucleation temperature=30° C. When tested at a nucleation temperature of 40° C., it can be seen that there is a generally logarithmic decay in the rate of colloidal silica production. The reason for this is likely because the driving force of the reaction is the degree of oversaturation. As more monomeric silica polymerizes, the extent of oversaturation lessens and so the rate should decline.

As well as affecting particle growth rate, the nucleation temperature was also found to affect particle size. The methods of the invention provide a method of producing a size-specific silica colloid from 4-8 nm using a nucleation temperature from 30° C. to 70° C.

Example 3

The objective of this trial was to produce 10 m % of ~5 nm colloidal silica from Separated Geothermal Water (SGW) with a silica concentration of ~550 ppm. The SGW was cooled to 32° C. prior to the fluid entering curing tanks and it was concentrated using a first and second ultrafiltration unit.

Materials and Methods

SGW was drawn from the Wairakei source at a temperature of 124° C. and passed through cartridge pre-filters (filtration size of 100 micron). The fluid was then cooled to ~32° C. using a plate heat exchanger prior to entering the curing tanks. The silica concentration increased from ~0.027 m % to ~2 m % through the use of a spiral wound ultrafiltration unit (UF1). Locally sourced potable water was used for diafiltration following UF1. The fluid was further concentrated to 10 m % using a second spiral wound ultrafiltration unit (UF2).

TABLE 2

Process parameters for UF treatment method

| Key Process Parameters: Description | Data |
| --- | --- |
| SGW Feed Temperature | 124° C. |
| SGW Feed Flow rate | 1.09 L/sec |
| SGW Feed Pressure | 3.35 bar |
| Colloid Formation Temperature | ~32° C. |
| Growing Tank Time | ~28 minutes |
| UF1 Type | 4-8 inch Spiral wound |
| UF1 Number of Elements | 4 |
| UF1 Vessel Used | UF1-301A |
| UF1 Feed Flow rate | 3.5 L/sec |
| UF1 Temperature | ~31-32° C. |
| pH | 8.4 (native SGW) |
| UF1 Average Flux | ~25 LMH |
| UF2 Type | 4 inch Spiral Wound |
| UF2 Number of Elements | 1 |
| UF2 Feed Flow Rate | 1 L/sec |
| UF2 Temperature | Ambient |

Results

Figure 5:
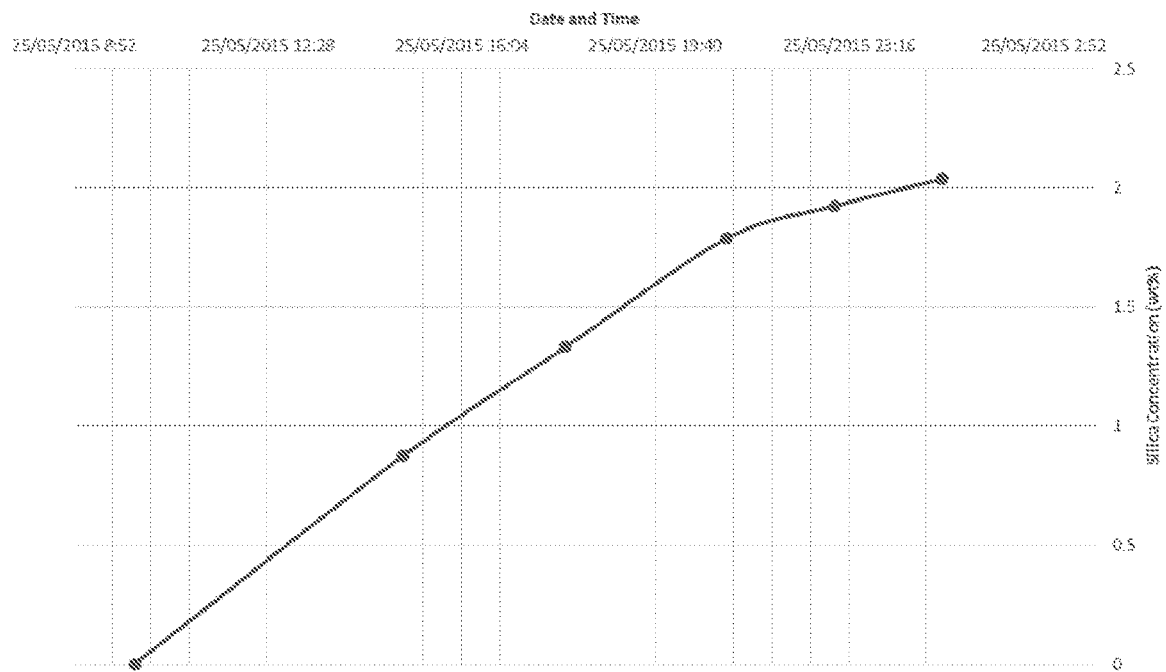
FIGS. 5 and 6 show the silica concentration over time as measured by determining the density of the fluid through the use of hydrometers as described in example 3.

FIG. 5 shows the silica concentration over time as measured by determining the density of the fluid through the use of hydrometers. The silica concentration increased from ~0.027 m % to 2 m % in UF1 within a 14 hour period with ~470 L of processing fluid.

A 4-inch spiral would ultrafiltration membrane in UF2 was used to increase the 2 m % silica concentration to 10.14 m % over 2-3 hours. There was no significant drop is differential pressure across the membrane during the trial.

The final particle size was 5.52 nm in diameter measured using Sears Titration technique with a final silica concentration of 10.14 m %.

Figure 6:
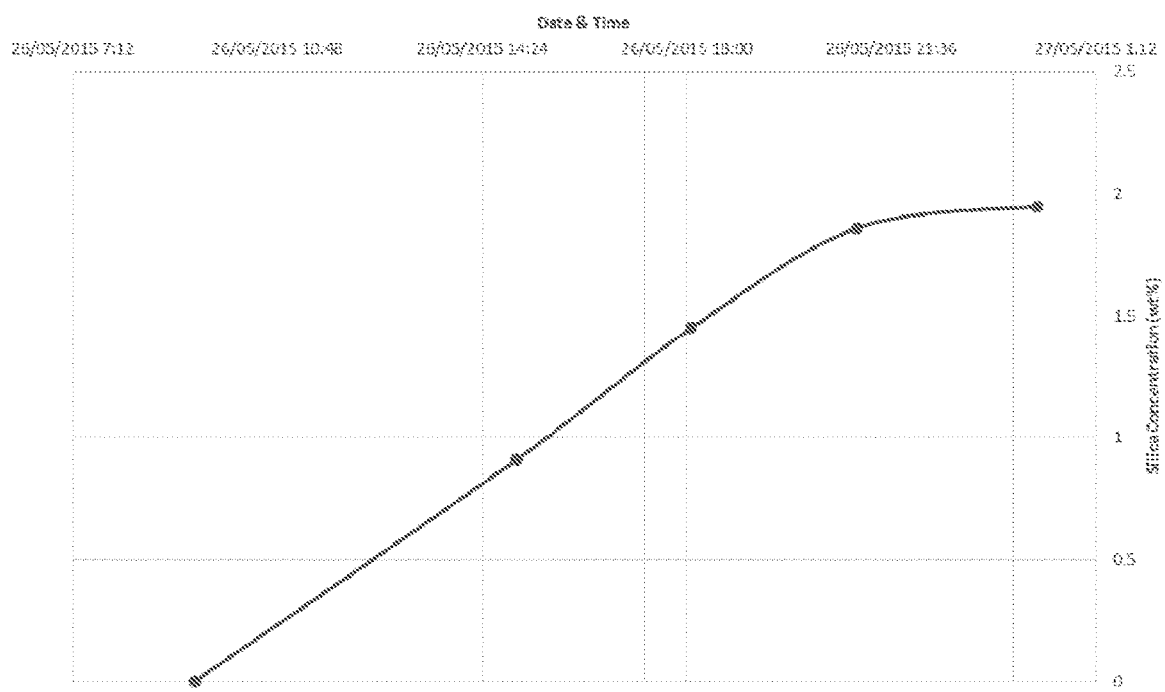

The above trial was repeated using the same process parameters and time (see FIG. 6). A final particle size of 5.57 nm in diameter was obtained measured using Sears Titration technique with a final silica concentration of 10.63 wt %.

Conclusion

A particle size of 5.52 nm (trial 1) and 5.57 nm (trial 2) was achieved at a concentration of 10.14 m % and 10.63 m % using both primary and secondary ultrafiltration systems and no chemical additions. This process demonstrates the effectiveness of the method in producing a commercial-grade colloidal silica concentrate. The concentrate produced may be used directly in an industrial process (e.g. in paper production), or may be used as a "seed" for the production of larger colloids (see example 4).

Example 4

Materials and Methods

The objective of this trial was to produce larger silica colloids by heat curing from a silica colloid "seed" concentrate (for example that produced in example 3). Two methods were used.

Unpressurised

At temperatures of less than 100° C., the UF retentate with colloids of approximately 5 nm at a starting silica concentration of approximately 10 m % was heated to 97° C. in a jacketed tank and maintained at that temperature for the period of time required to grow the colloid. Trials were carried out at two different sites (site A and site B).

Pressurised

At temperatures of over 100° C. samples of the UF retentate with colloids of approximately 5 nm at a starting silica concentration of 10 m % were encapsulated in a pressure vessel which was heated in an oven for the desired temperature and time.

Samples were taken at different heat curing periods and colloid size was measured using the Sears titration technique. Trials were carried out at two different sites (site A and site B).

Results

Figure 10A:
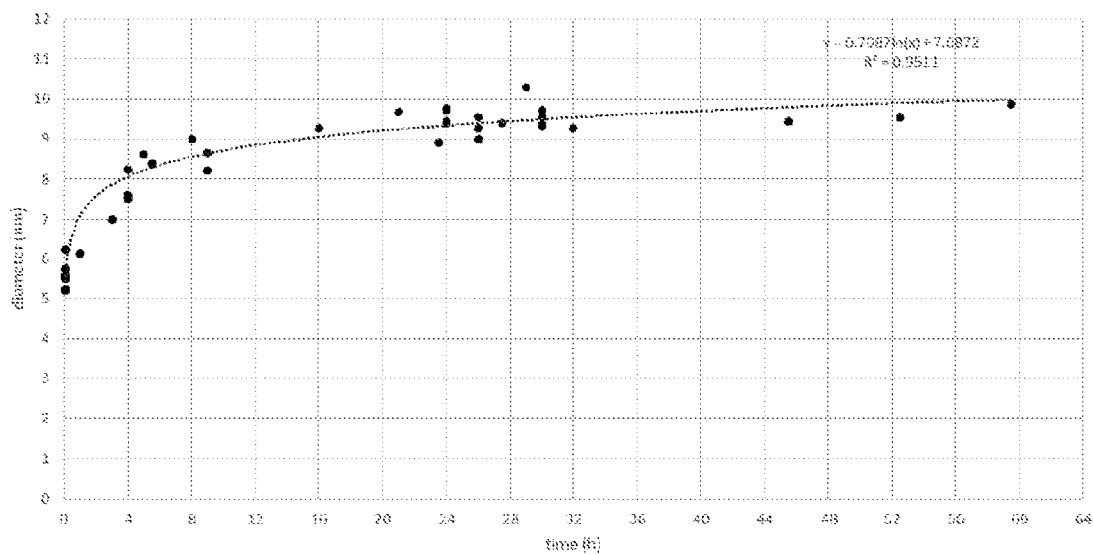
FIGS. 10A and 10B show the size range of colloids produced during the colloid growth process at a temperature of between 95 to 100° C. over time at site A (FIG. 10A) and site B (FIG. 10B) as described in example 4.

FIG. 10A shows spontaneous particle growth at temperatures from 95° C. to 100° C. at atmospheric pressure at site A. Colloid size is from 6 nm to 10.3 nm.

Figure 10B:
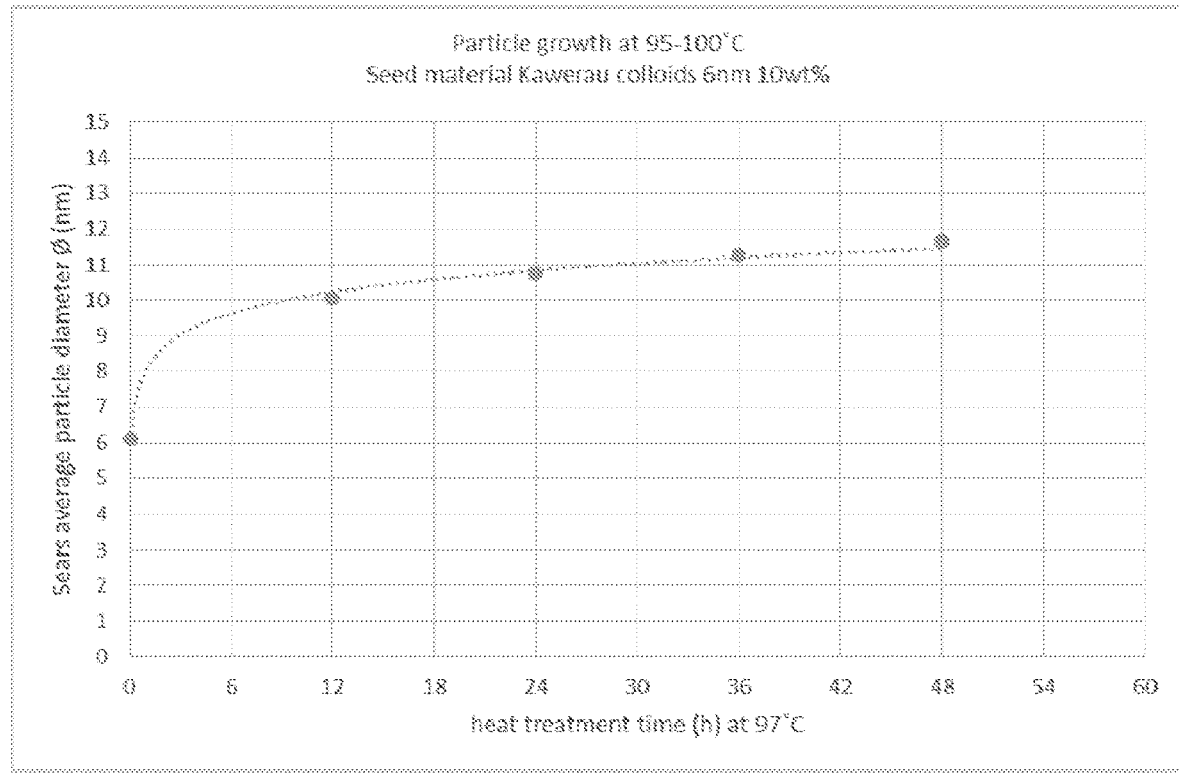

FIG. 10B shows spontaneous particle growth at temperatures from 95° C. to 100° C. at atmospheric pressure at site B. Colloid size is from 6 nm to 12 nm.

Figure 11A:
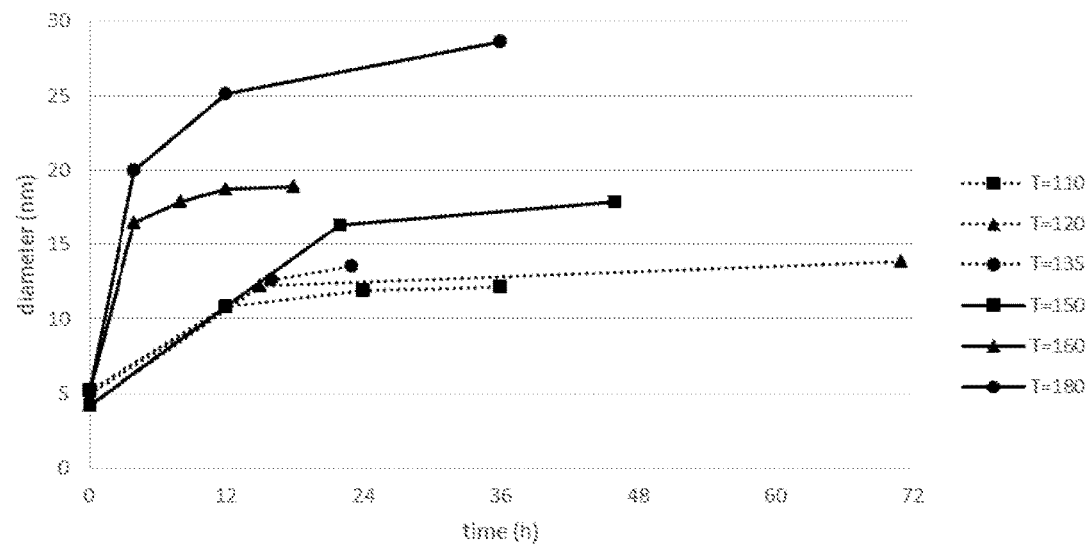
FIGS. 11A and 11B show the size range of colloids produced during the colloid growth process at varying temperatures over time at site A (FIG. 11A) and site B (FIG. 11B) as described in example 4.
Figure 11B:
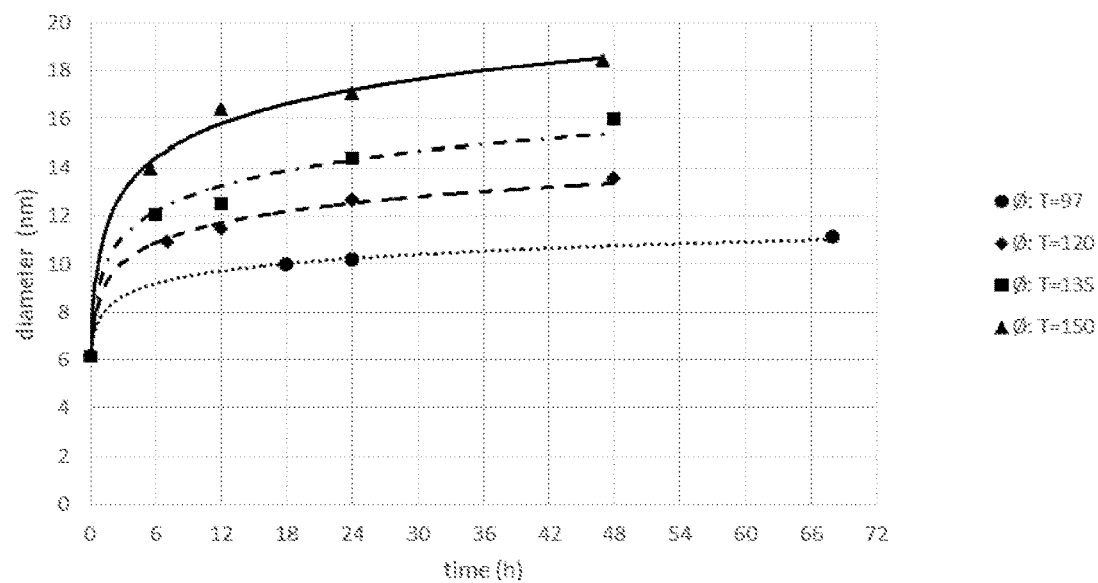

FIGS. 11A and 11B shows spontaneous particle growth at various temperatures (° C.) at pressure. Colloid size is from 11 nm to 28 nm.

Conclusion

FIGS. 10A and 10B show that colloids can be grown from a UF concentrate (approximately 5-7 nm) to approximately 10 nm through spontaneous growth by heating the seed solution (approximately 10 m %, diafiltrated) to temperature of 97° C. for a period of up to 1 week. The colloids asymptotically approached a larger final size when subjected to the heat treatment. FIG. 11 shows that colloids can be grown from a UF concentrate (5 nm) to diameter of at least 30 nm by heating the UF concentrate to a temperature above 100° C. and up to 180° C. in a pressurised vessel. The hotter temperatures both grew the particles faster and to a larger size when compared to colder temperatures. These were conducted at the natural alkalinity of the fluid, with no chemical additives.

Example 5—Dispersity of Colloids

Materials and Methods

Figure 7:
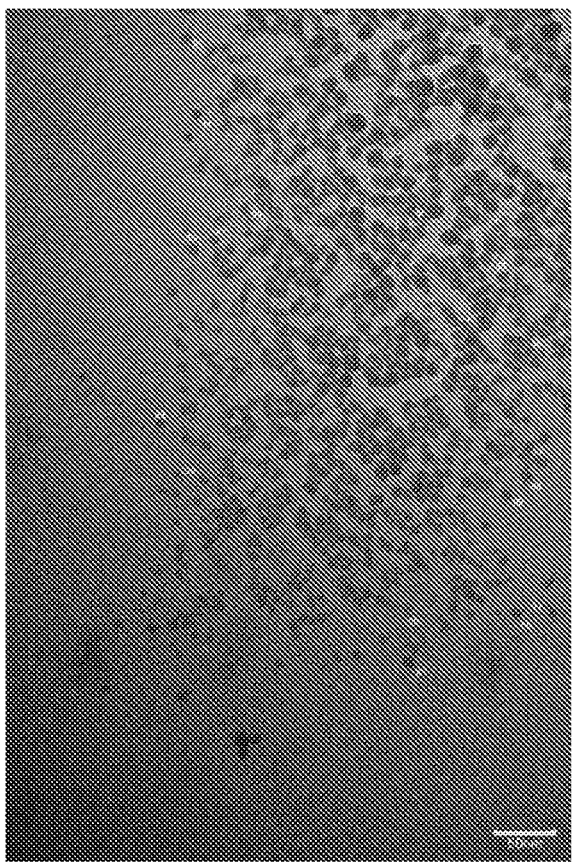
FIG. 7 shows a TEM image silica colloids produced by a method of the invention (example 5).

Colloids were grown in the process described in example 2 and then heat treated in the process described in example 4 at a temperature of 97° C. for a period of 2 hours Results FIG. 7 shows a TEM image of silica colloids formed. The size distribution (dispersity) was measured and is shown in FIG. 8. The mean colloid size was 8.77 nm and the dispersity was 4 to 15 nm.

Conclusion

This experiment shows that the colloids produced according to the methods described herein are substantially monodisperse and are appropriate for most commercial applications.

Example 6—Precipitation of Silica

Materials and Methods

A "seed" colloidal silica concentrate was prepared according to the method of example 3 (5-6 nm at approximately 10 m %). 25 g of NaCl was added per litre of concentrate and the resulting precipitant feed mixture was agitated. 30% by weight sodium silicate was added to the precipitant feed mixture to bind the silica flocs together. A light acid wash with hydrochloric acid was carried out to adjust the pH to approximately pH 5.0. Sodium silicate was obtained by adding 1 part sodium hydroxide to 2 parts silicon dioxide. The mixture was mixed in an agitated tank then passed to a settling tank to allow precipitation to occur. The precipitated silica was recovered by filtration.

Results

Two trials were carried out and precipitated silica was produced.

TABLE 3

Analysis of silica produced via UF

| Conditions Results of Precipitate | Units | PS-000-1_A | PS-001-1_A |
|---|---|---|---|
| Surface Area | m²/g | 264 | 396 |
| External Surface Area | m²/g | 226 | 360 |
| Pore Volume | cm³/g | 1.549 | 1.51 |
| Average Pore diameter nm | nm | 24.5 | 14.7 |

Conclusion

The invention provides a method of preparing high grade precipitated silica from geothermal fluid.

Example 7—Dispersity of Colloids

Materials and Methods

SGW was drawn from the Wairakei source at a temperature of 124° C. and passed through cartridge pre-filters (filtration size of 100 micron). The fluid was then cooled to either 32° C. (trial A) or 50° C. (trial B) using a plate heat exchanger prior to entering the curing (growth) tanks for a period of 28 min. The silica concentration increased from ~0.027 m % to ~2 m % through the use of a spiral wound ultrafiltration unit (UF1). Locally sourced potable water was used for diafiltration following UF1. The fluid was further concentrated to 15 m % using a second spiral wound ultrafiltration unit (UF2).

TABLE 4

Process parameters for UF treatment trial A and B

| Key Process Parameters: Description | Trial A | Trial B |
|---|---|---|
| SGW Feed Temperature | 124° C. | 124° C. |
| SGW Feed Flow rate | 1.09 L/sec | 1.09 L/sec |
| SGW Feed Pressure | 3.35 bar | 3.35 bar |

TABLE 4-continued

Process parameters for UF treatment trial A and B

Key Process Parameters:

| Description | Trial A | Trial B |
|---|---|---|
| Colloid Formation Temperature | 32° C. | 50° C. |
| Growing Tank Time | ~28 minutes | ~28 minutes |
| UF1 Type | 4 inch Spiral wound | 4 inch Spiral wound |
| UF1 Number of Elements | 4 | 4 |
| UF1 Vessel Used | UF1-301A | UF1-301A |
| UF1 Feed Flow rate | 3.5 L/sec | 3.2 L/sec |
| UF1 Temperature | ~31-32° C. | ~47-48° C. |
| pH | 8.4 (native SGW) | 8.4 (native SGW) |
| UF1 Average Flux | ~25 LMH | ~32-33 LMH |
| UF2 Type | 4 inch Spiral Wound | Tubular |
| UF2 Number of Elements | 1 | 7 |
| UF2 Feed Flow Rate | 1 L/sec | 7 L/sec |
| UF2 Temperature | Ambient | Ambient |

Dispersity of the colloids was measured using TEM.

Results

The size distribution (dispersity) of the colloids produced was measured and is shown in FIG. 9. The mean colloid size of 104 colloids (trial A) was 5.82 nm at a nucleation temperature of 32° C. with a polydispersity index (dispersity) of 1.13. The mean colloid size of 105 colloids (trial B) was 8.81 nm at a nucleation temperature of 50° C. with a polydispersity index (dispersity) of 1.2.

Conclusion

These trials show that the colloids produced according to the methods described herein are substantially monodisperse and are appropriate for most commercial applications. Modifying the nucleation temperature allows variation of the mean colloid size but has minimal effect on dispersity.

Example 8—Colloidal Silica Production Via Three-Stage UF Process

Materials and Methods

SGW was drawn from a geothermal source at two sites at a temperature of 124° C. and passed through cartridge pre-filters (filtration size of 100 micron). The fluid was then cooled to either 32° C. (trial A) or 50° C. (trial B) using a plate heat exchanger prior to entering the curing (growth) tanks for a period of 28 min.

First Stage (UF1)

The UF1 system concentrates geothermal water to produce a colloidal silica solution of about 2 m %. The UF1 system operates as a continuous system which concentrates the colloidal silica from a native starting concentration (of about 0.027 m %) to a final concentration of about 2 m %. Once concentrated to 2 m %, diafiltration takes place, wherein the salinity of the colloidal silica solution is lowered by addition of a solvent (potable town water) with has lower concentration of ions or impurities to the colloidal silica solution (feed) in order to dilute the components of the feed.

One 4-metre vessel housing four spiral wound elements (8040) in series processed the 0.027 wt % colloidal silica solution a pressure in between 3.1-3.5 bar and a flow rate of 3.5 L/s. Concentrated colloidal silica was re-circulated back into the system, while the filtrate was directed to waste. Diafiltration was carried out in UF1 to further purify the product and reduce overall salinity. Once diafiltration was completed, a running flush is performed on the spiral wound membranes. The flush fluid (potable water) is directed into the UF1 system and the concentrated colloidal silica solution is shut-off. The fast flush procedure prevents any colloidal silica from settling on the surface of the membrane as the flush fluid passes through at a high flow rate.

Second Stage (UF2)

The UF2 system is to concentrate the colloidal silica solution from about 4 m % to about 10 m %. One 1.2 metre vessel housing one 4-inch spiral wound element (8040) received 4 m % colloidal silica solution. The solution was fed through the spiral wound membranes at a pressure in between 0.5-1.25 bar and a flow rate of 1 L/s. Concentrated colloidal silica was then re-circulated back into the system, while the filtrate was directed to waste. Once concentration was completed, a running flush is performed on the spiral wound membranes. The flush fluid is directed into the UF2 system feed and the concentrated colloidal silica solution directed to waste. The fast flush procedure prevents any colloidal silica from settling on the surface of the membrane as the flush fluid passes through at a high flow rate.

Third Stage (UF3)

The UF3 system is designed to concentrate colloidal silica, which has been extracted from geothermal water, from a starting concentration of about 10 m % to a final concentration of 30 m %. This system follows two prior ultrafiltration steps (UF1 and UF2) which bring the concentration up to about 10 m %. From a 28 L tank, fluid was pumped through a series of four tubular perforated membrane housings, each 1000 mm in length. The housings each hold an FP200 tubular membrane. The 10 wt % colloidal silica solution is pumped through the tubular membranes at a pressure of approximately 1.5 bar and a flow rate of 0.5 L/s. Filtrate is squeezed through the membrane and drips out of the perforations, while the concentrated colloidal silica is fed back into the top of the tank. As more filtrate is removed the colloidal silica concentration in the tank increases to about 30 m %, after which time it is removed from the tank.

Silica recovery from each stage was measured and dispersity measurements were taken for UF2 and UF3 colloids.

Results

UF1

Figure 12A:
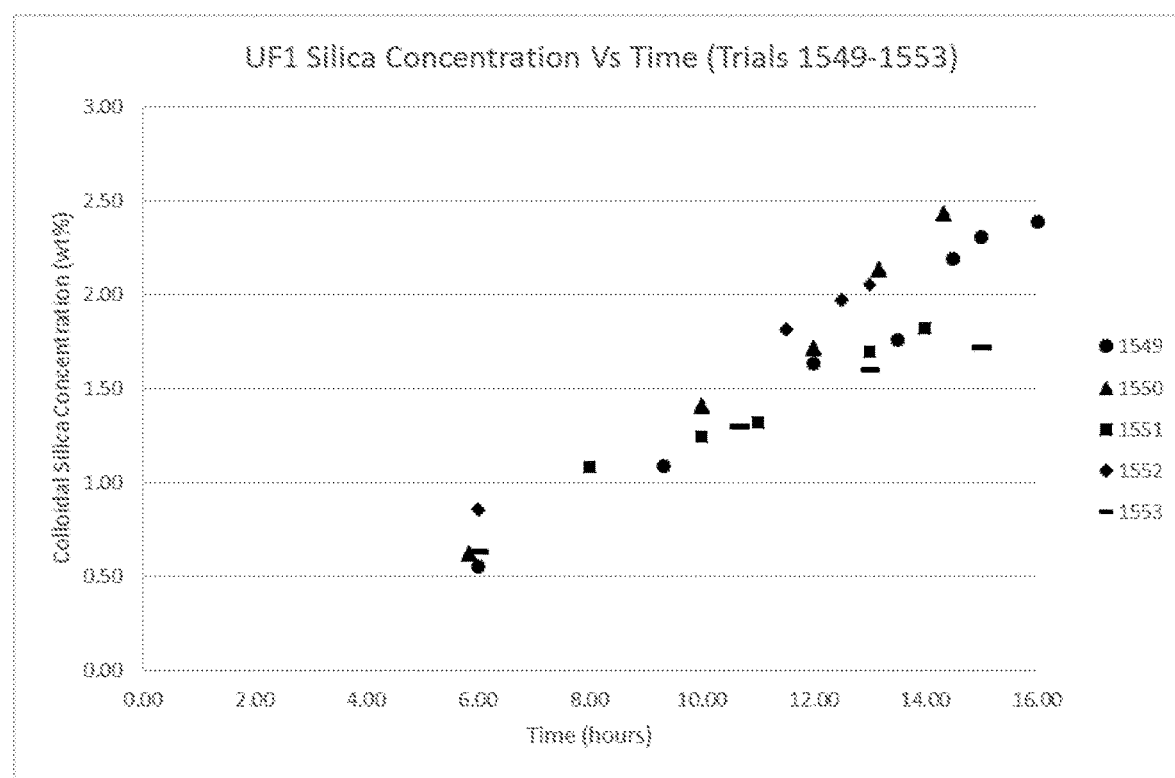
FIGS. 12A and 12B shows colloidal silica concentration following first ultrafiltration stage.
Figure 12B:
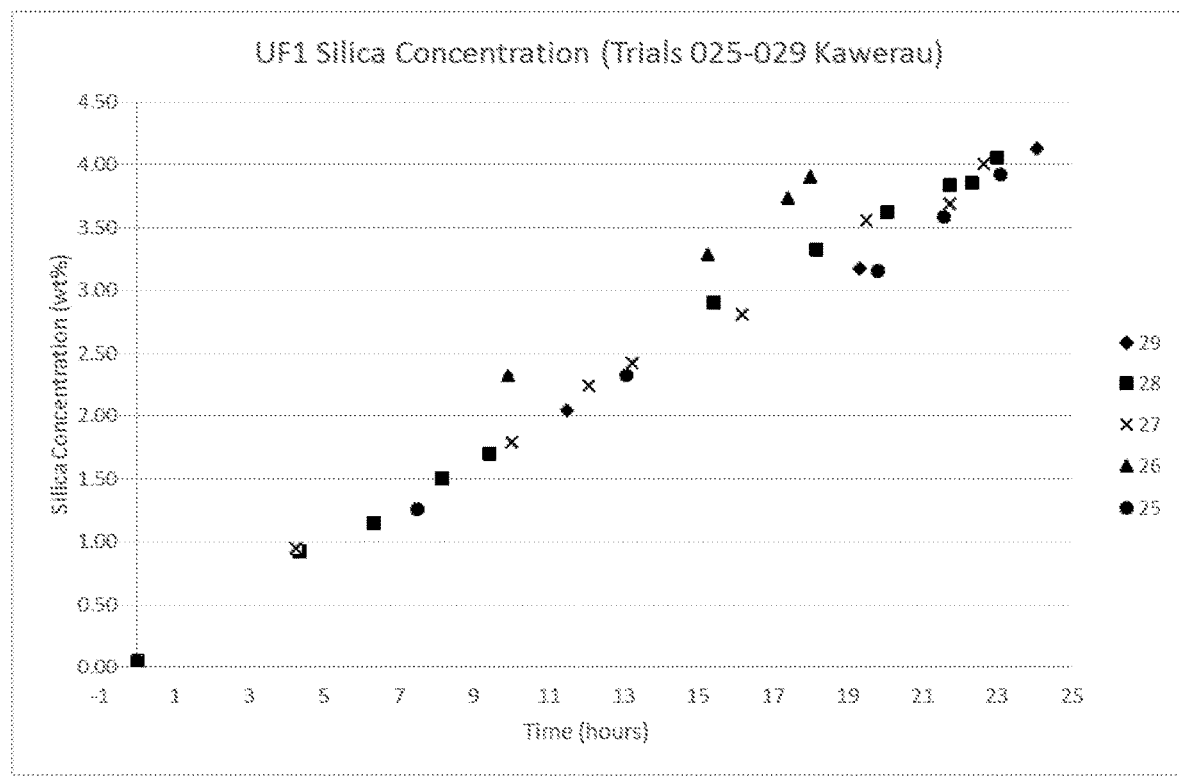

The colloidal silica concentration increased from the native concentration of about 0.057 m % to 2 m % over a 12 hour period as shown in FIG. 12A. Silica recovery rate was 59%. A further trial was performed to concentrate to approximately 4 m % as shown in FIG. 12B.

UF2

Figure 13:
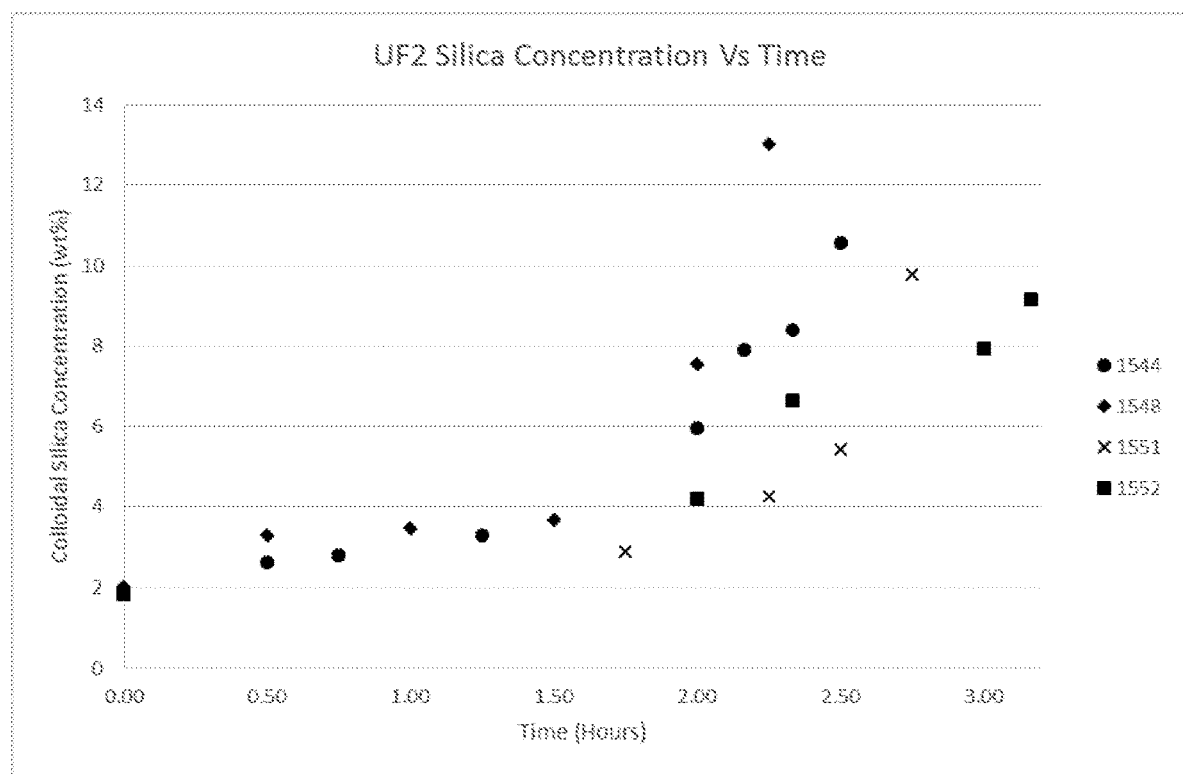
FIG. 13 shows colloidal silica concentration following second ultrafiltration stage.
Figure 21:
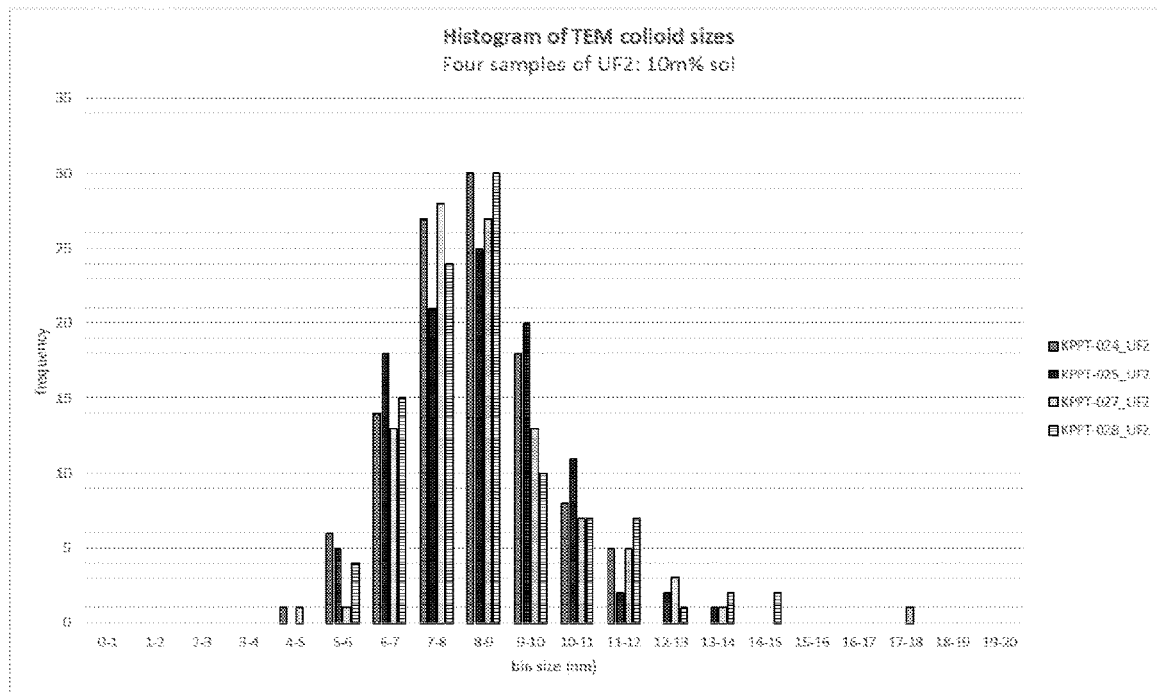
FIG. 21 shows a histogram of colloid sizes as referred to in example 8.
Figure 22:
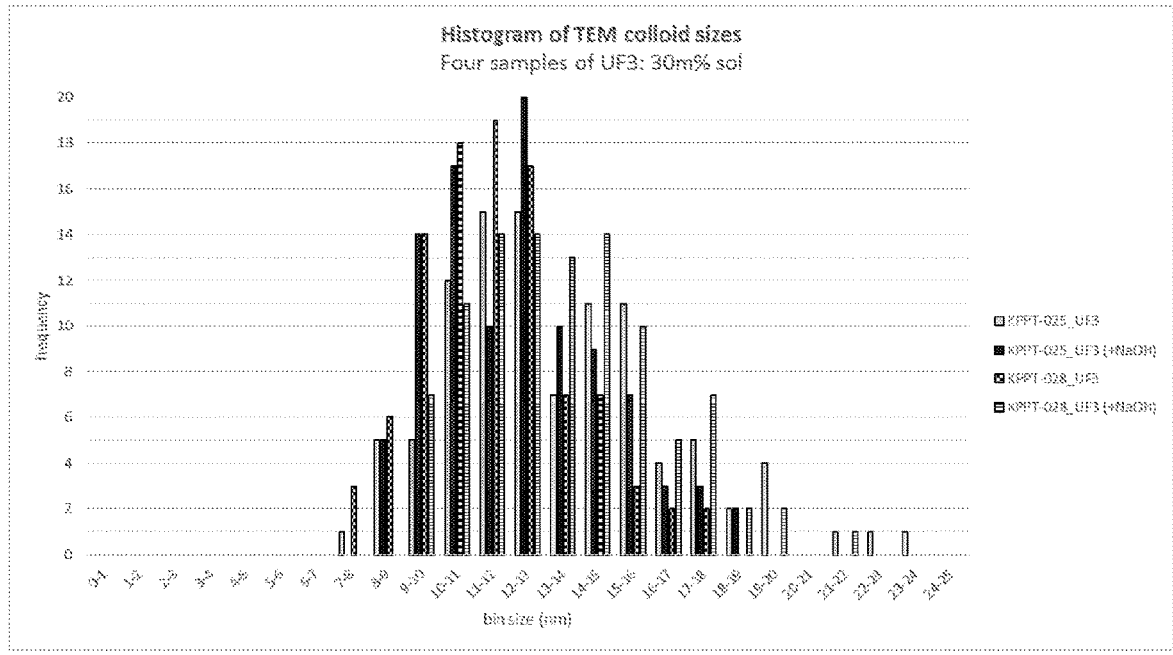
FIG. 22 shows a histogram of colloid sizes as referred to in example 8.

As the filtrate was removed over a 2-hour period, the colloidal silica concentration increased to about 10 m % (see FIG. 13). Silica recovery rate was 99%. FIG. 21 shows dispersity of colloid sizes and table 5A below details TEM measurements.

TABLE 5A

Statistical analyses of TEM results for UF2 samples

| process conditions | | ~10% sol, no heat treatment | ~10% sol, no heat treatment |
|---|---|---|---|
| minimum | nm | 4.93 | 5.00 |
| maximum | nm | 11.71 | 13.93 |
| standard deviation | nm | 1.44 | 1.66 |
| median | nm | 8.20 | 8.55 |
| mode | nm | 8.09 | 8.97 |
| mean | nm | 8.24 | 8.47 |
| sample size | | 109 | 105 |
| 90% confidence error | mean± | 0.23 | 0.27 |
| number mean diameter ($D_{[1,0]}$) | nm | 8.24 | 8.47 |
| volume mean diameter ($D_{[4,3]}$) | nm | 8.97 | 9.44 |
| surface mean diameter ($D_{[3,2]}$) | nm | 8.74 | 9.12 |
| polydispersity index (U) | | 1.09 | 1.11 |

TABLE 5A-continued

Statistical analyses of TEM results for UF2 samples

| process conditions | | ~10% sol, no heat treatment | ~10% sol, no heat treatment |
|---|---|---|---|
| coefficient of variance ($C_v$) | | 17.51% | 19.62% |
| absolute span | nm | 3.74 | 4.03 |
| relative span | | 0.46 | 0.47 |

Figure 14:
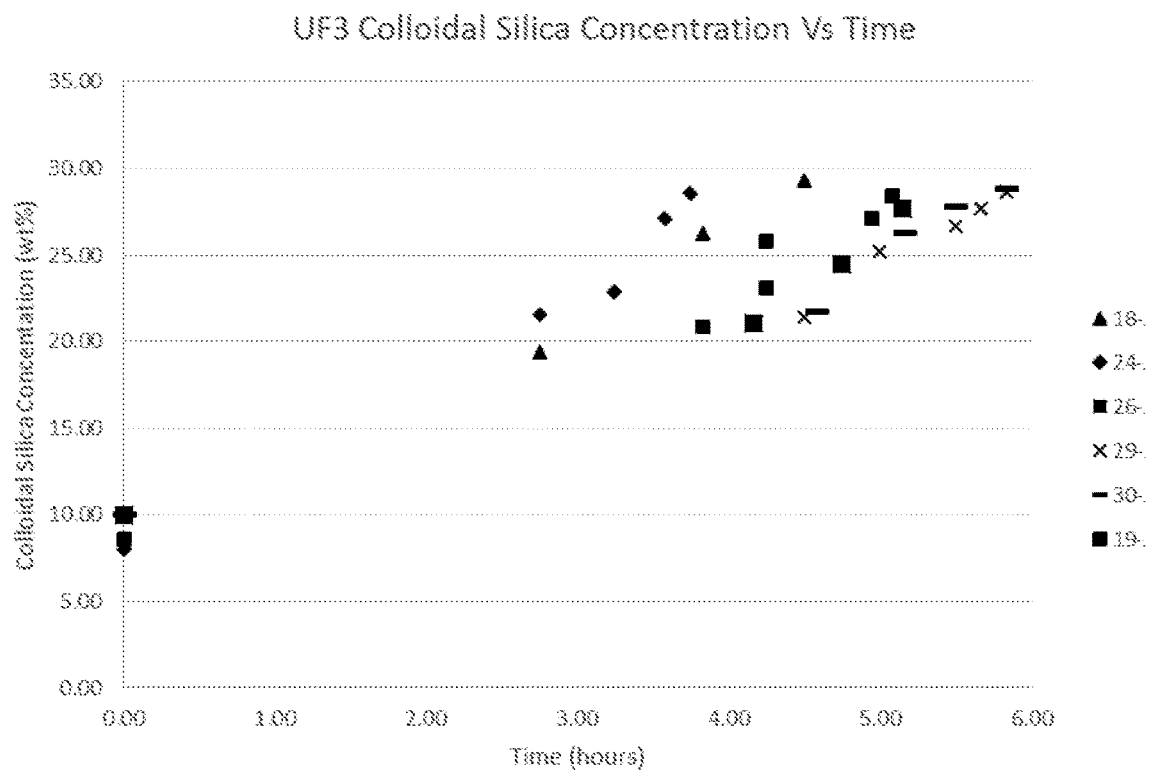
FIG. 14 shows colloidal silica concentration following third ultrafiltration stage.

UF3 Batches were concentrated from approximately 10 m % to 30 m %. The results from four batch trials are presented in FIG. 14. The results show a relatively linear relationship between the silica concentration and the membrane flux (filtrate flow per square meter of membrane). As the concentration of colloidal silica increases the membrane flux decreases, this is mainly due to the increase in density and viscosity of the fluid at higher concentrations. Silica recovery rate was 99%. FIG. 21 shows dispersity of colloid sizes and table 5A below details TEM measurements.

TABLE 5B

Statistical analyses of TEM results for UF3 samples

| | | Sample 1 | Sample 2 |
|---|---|---|---|
| minimum | nm | 7.48 | 7.23 |
| maximum | nm | 23.85 | 32.81 |
| standard deviation | nm | 3.23 | 2.99 |
| median | nm | 12.91 | 11.45 |
| mode | nm | 10.15 | 9.98 |
| mean | nm | 13.47 | 11.84 |
| sample size | | 100 | 99 |
| 90% confidence error | nm | 0.53 | 0.49 |
| number mean diameter ($D_{[1,0]}$) | nm | 13.47 | 11.84 |
| volume mean diameter ($D_{[4,3]}$) | nm | 15.90 | 16.25 |
| surface mean diameter ($D_{[3,2]}$) | nm | 15.05 | 13.89 |
| polydispersity index (U) | | 1.18 | 1.37 |
| coefficient of variance ($C_v$) | | 23.95% | 25.26% |
| absolute span | nm | 7.82 | 4.92 |
| relative span | | 0.61 | 0.43 |

Conclusions

The three stage process described provides an effective method for concentrating colloidal silica in geothermal fluid to about 30 m %. Using the particular flush procedures described in the methods means that no chemical clean is required of the UF1, UF2 or UF3 membranes. This has benefits including reduced reagent cost, reduced risk of product contamination and reduced downtime between batches. The tEM analyses show that a substantially monodisperse colloid was formed with a polydispersity index of less than 1.5.

Example 9—Recoveries from Trial Site and Projected Recovery from Alternative Test Sites with Different Feed Silica Concentrations Materials and Methods Based on the results of the analyses in example 8, the silica recoveries for each of the three ultrafiltration processes were calculated. Silica recovery is calculated according to the following formula:

$$\frac{SiO_{2(SGW)} - SiO_{2(filtrate)}}{SiO_{2(SGW)}} \times 100$$

Where:

$SiO_{2(SGW)}$ is the total silica concentration of the separated geothermal water, which is continuously fed into the UF system.

$SiO_{2(filtrate)}$ is the total silica concentration in the UF1 filtrate and is assumed to be constant at 217 mg/L.

Results

The silica recovery is summarised in table 6A below:

TABLE 6A

Silica recovery from UF1, UF2 and UF3 ultrafiltration steps outlined in example 8
Wairakei Pilot Plant Silica Recoveries (530 ppm)

| System | Total Silica Recovery |
|---|---|
| Ultrafiltration 1 | 59% |
| Ultrafiltration 2 | 99% |
| Ultrafiltration 3 | 99% |
| Overall silica recovery | 0.59 × 0.99 × 0.99 = 58% |

Conclusions

Based on the results achieved in Wairakei at 530 ppm, the projected recovery rates for other sites increases with increasing feed silica concentration. This assumes that the total silica in the UF1 filtrate will remain constant (at an identical nucleation temperature) no matter what the SGW silica concentration is. Silica rejection in UF2 and UF3 is assumed to be the same as at the Wairakei location, as the feed concentration of each of these systems will be identical.

TABLE 6B

Projected silica recovery from UF1, UF2 and UF3 ultrafiltration steps when applied to other sources of geothermal fluid according to the process described in example 8.

| Feed Silica Concentration ppm | Saturated Silica Concentration ppm | UF1 Silica Recovery % | UF2 Silica Recovery % | UF3 Silica Recovery % | Total Silica Recovery % |
|---|---|---|---|---|---|
| 400 | 200 | 50% | 99% | 99% | 49% |
| 400 | 250 | 38% | 99% | 99% | 37% |
| 400 | 300 | 25% | 99% | 99% | 25% |
| 500 | 200 | 60% | 99% | 99% | 59% |
| 500 | 250 | 50% | 99% | 99% | 49% |
| 500 | 300 | 40% | 99% | 99% | 39% |
| 600 | 200 | 67% | 99% | 99% | 65% |
| 600 | 250 | 58% | 99% | 99% | 57% |
| 600 | 300 | 50% | 99% | 99% | 49% |
| 700 | 200 | 71% | 99% | 99% | 70% |
| 700 | 250 | 64% | 99% | 99% | 63% |
| 700 | 300 | 57% | 99% | 99% | 56% |

TABLE 6B-continued

Projected silica recovery from UF1, UF2 and UF3 ultrafiltration steps when applied to other sources of geothermal fluid according to the process described in example 8.

| Feed Silica Concentration ppm | Saturated Silica Concentration ppm | UF1 Silica Recovery % | UF2 Silica Recovery % | UF3 Silica Recovery % | Total Silica Recovery % |
|---|---|---|---|---|---|
| 800 | 200 | 75% | 99% | 99% | 74% |
| 800 | 250 | 69% | 99% | 99% | 67% |
| 800 | 300 | 63% | 99% | 99% | 61% |
| 900 | 200 | 78% | 99% | 99% | 76% |
| 900 | 250 | 72% | 99% | 99% | 71% |
| 900 | 300 | 67% | 99% | 99% | 65% |
| 1000 | 200 | 80% | 99% | 99% | 78% |
| 1000 | 250 | 75% | 99% | 99% | 74% |
| 1000 | 300 | 70% | 99% | 99% | 69% |

This shows that the methods are projected to work well at higher feed silica concentrations. This also suggests that an increased total silica recovery can be achieved at higher initial silica concentrations. Table 1a and 1b in WO 2015/178783 A1 (page 14) shows that most known geothermal sources will fall within a range of feed silica concentrations between 400 ppm and 950 ppm.

Example 10—Colloid Growth at Varying Heat Curing Temperatures

The objective of this trial was to produce larger silica colloids by heat curing from a silica colloid "seed" concentrate (for example that produced in example 3).

Materials and Methods

The UF retentate with colloids of approximately 5-7 nm at a starting silica concentration of approximately 7-15 m % was heated in a heat curing tank and maintained at that temperature for period of time to grow the colloid.

The particle sizes were evaluated by a Sears Titration according to known methods (Sears 1956).

Results

Figure 11C:
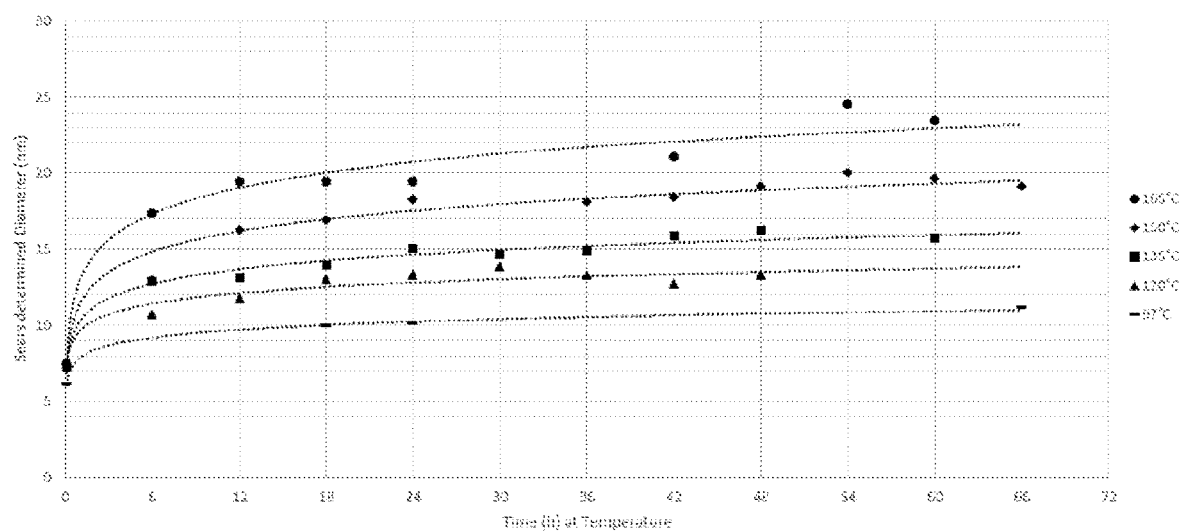
FIG. 11C shows the size range of colloids produced during the colloid growth process at varying temperatures over time as described in example 11.

Table 7 below and FIG. 11C shows the final colloid particle size versus temperature and time:

TABLE 7

Spontaneous Growth from a variety of heat treatments

| Initial 7-15% Product (nm) | Final 7-15% Product (nm) | Heat Treatment Temperature (° C.) | Time (h) |
|---|---|---|---|
| 5-7 | 8-10 | 97 | 12-18 |
| 5-7 | 10-12 | 97 | 56-68 |
| 5-7 | 8-10 | 110 | 6-12 |
| 5-7 | 10-12 | 110 | 18-30 |
| 5-7 | 12-14 | 120 | 60-72 |
| 5-7 | 12-14 | 135 | 18-30 |
| 5-7 | 14-16 | 150 | 18-30 |
| 5-7 | 16-18 | 160 | 12-18 |
| 5-7 | 18-20 | 180 | 3-9 |
| 5-7 | 24-26 | 180 | 9-15 |

Conclusion

The results demonstrate that the process of the invention can be used to produce stable silica colloids of varying size depending on the heat curing temperature and heat curing period of the heat curing step.

Example 11—Colloid Size Distribution (Dispersity)

Tests were carried out to determine the dispersity, chemical composition and stability of products produced according to the present invention.

Materials and Methods

SGW was drawn from the Wairakei source at a temperature of 124° C. and passed through cartridge pre-filters (filtration size of 100 micron). The fluid was then cooled to approximately 40° C. using a plate heat exchanger prior to entering the curing (growth) tanks for a period of 30 minutes.

The colloidal silica formed in the curing tanks was concentrated to 2 m % through a continuous operational mode of UF1. It was then diafiltered using potable water until the conductivity of the filtrate stream could drop no further. The colloidal silica solution was further dewatered to 10 m % through a batch operational mode of UF2. The resultant product was analysed. The 10 m % diafiltered colloidal silica solution was heated between 95-100° C. for a period of to allow for colloidal growth up to 12-14 nm. Sample 1 was treated for 60 hours and sample 2 for 94 hours. The colloidal silica was then further concentrated to the final 30 m % concentration using a third ultrafiltration step.

Physical and chemical properties as well as the particle size distribution were examined. To compare the samples, the following tests were done.

Silica chemical analysis
Physical properties
TEM Imaging

The tests were carried out on two colloidal silica concentrate samples 9 and 10 months respectively after the samples were produced. This provides a good indication of the stability of the colloidal silica concentrate produced from geothermal fluid.

Results

Figure 15A:
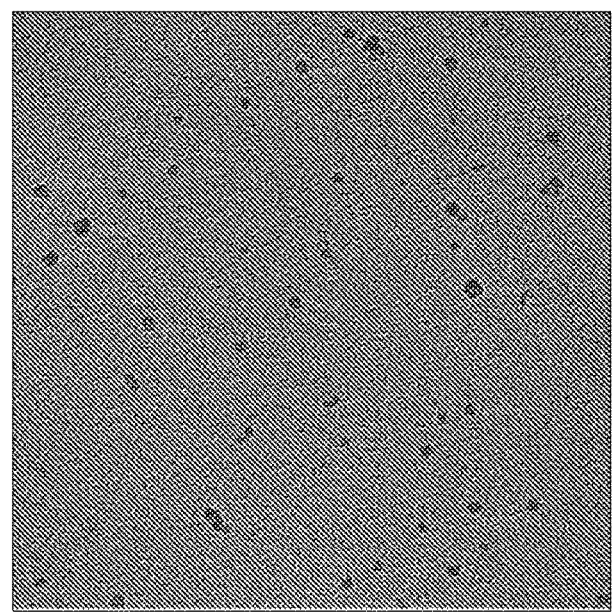
FIG. 15A shows a TEM image of silica colloids produced by a method of the invention (example 11).
Figure 15B:
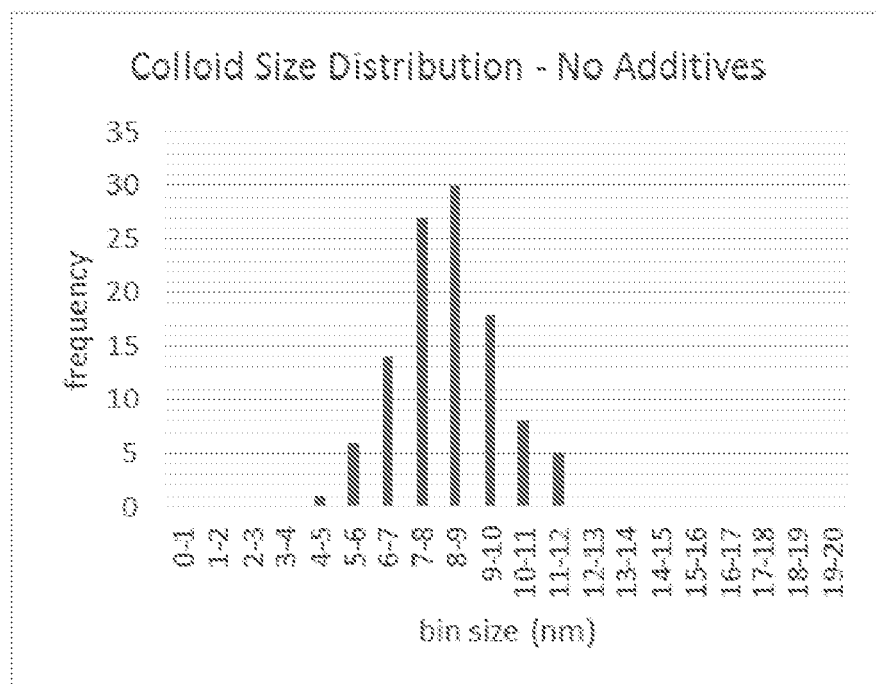
FIG. 15B shows a histogram of TEM measurements of silica colloids. This graph shows the size distribution (dispersity) of the colloidal silica concentrate (example 11).
Figure 16A:
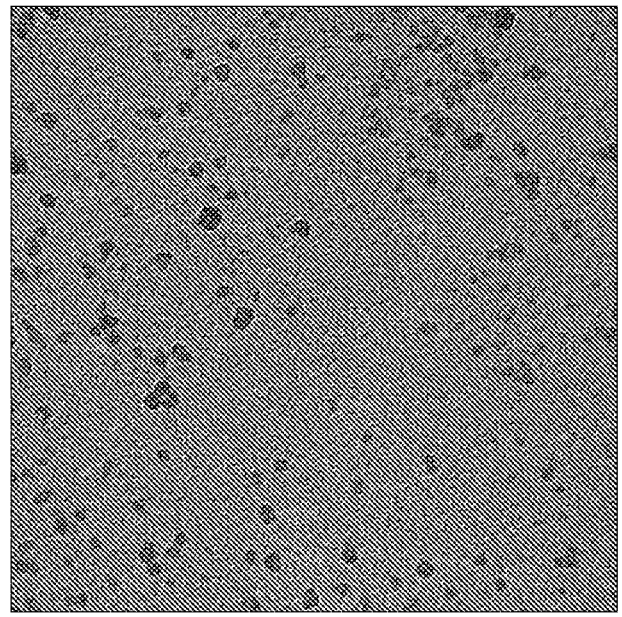
FIG. 16A shows a TEM image of silica colloids produced by a method of the invention (example 11).
Figure 16B:
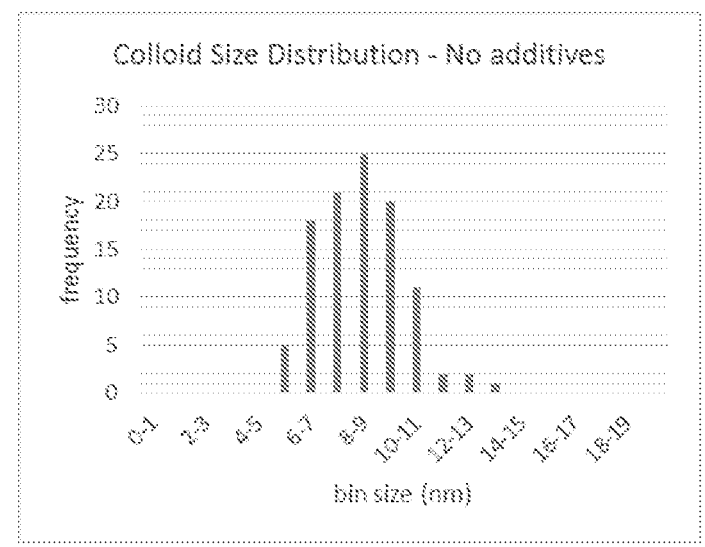
FIG. 16B shows a histogram of TEM measurements of silica colloids. This graph shows the size distribution (dispersity) of the colloidal silica concentrate (example 11).

TEM images were taken from the two 10 m % samples. These images are presented in FIGS. 15A and 16A for samples 1 and 2 respectively. Colloid size distribution (dispersity) is presented in FIGS. 15B and 16B for samples 1 and 2 respectively.

| | Units | Minimum | Mean | Maximum |
|---|---|---|---|---|
| Sample 1 | nm | 4.93 | 8.24 | 11.71 |
| Sample 2 | nm | 5.0 | 8.47 | 13.93 |

Silica concentration of the two final 30 m % samples was as follows:

TABLE 8 silica composition of samples 1 and 2.

| | Sample | |
|---|---|---|
| | 1 | 2 |
| Heat Treatment | 97° C. for 60 hours | 97° C. for 94 hours |
| Silica composition (% solids-dry) | 95.408 | 95.408 |
| Silica composition (% ppm-wet) | 304351.9 ppm (~30 m %) | 299581.5 ppm (~30 m %) |
| Ø Diameter—TEM (nm) | 13.2 | 14.1 |

Figure 17A:
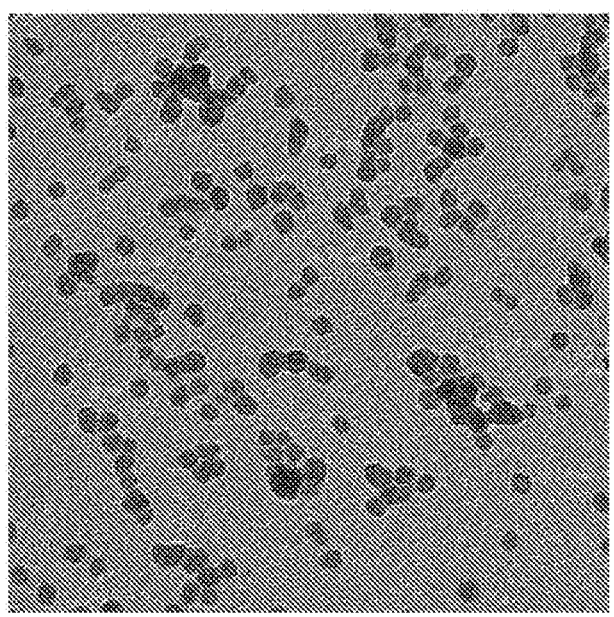
FIG. 17A shows a TEM image of silica colloids (30 m %) produced by a method of the invention (example 11).
Figure 17B:
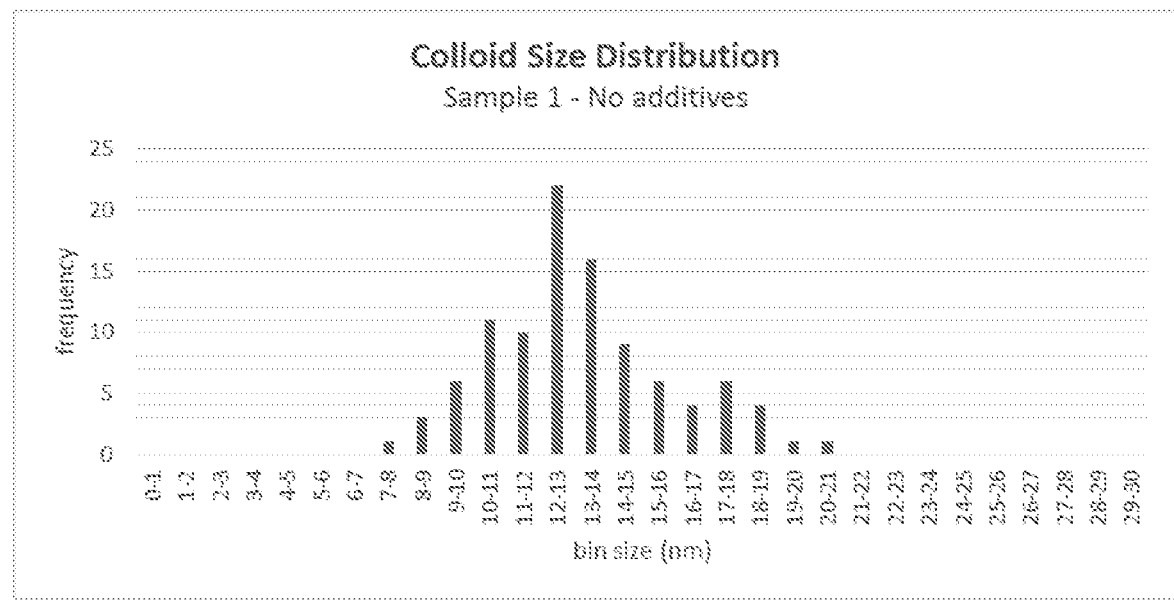
FIG. 17B shows a histogram of TEM measurements of silica colloids (30 m %). This graph shows the size distribution (dispersity) of the colloidal silica concentrate (example 11).
Figure 18A:
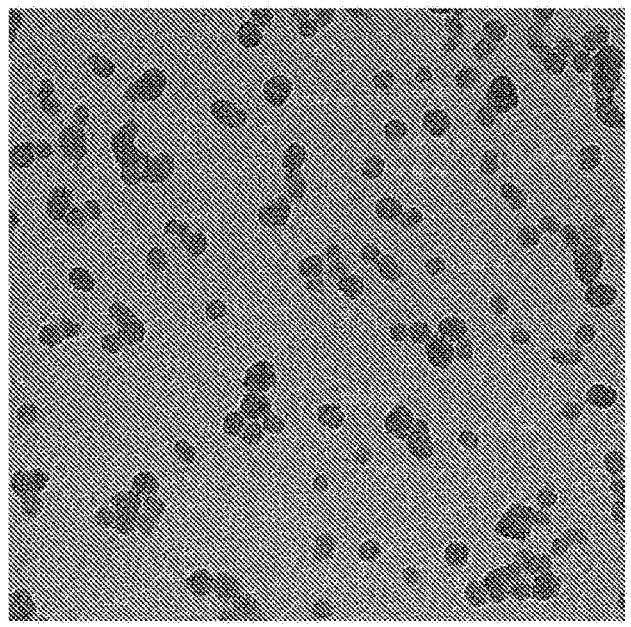
FIG. 18A shows a TEM image of silica colloids (30 m %) produced by a method of the invention (example 11).
Figure 18B:
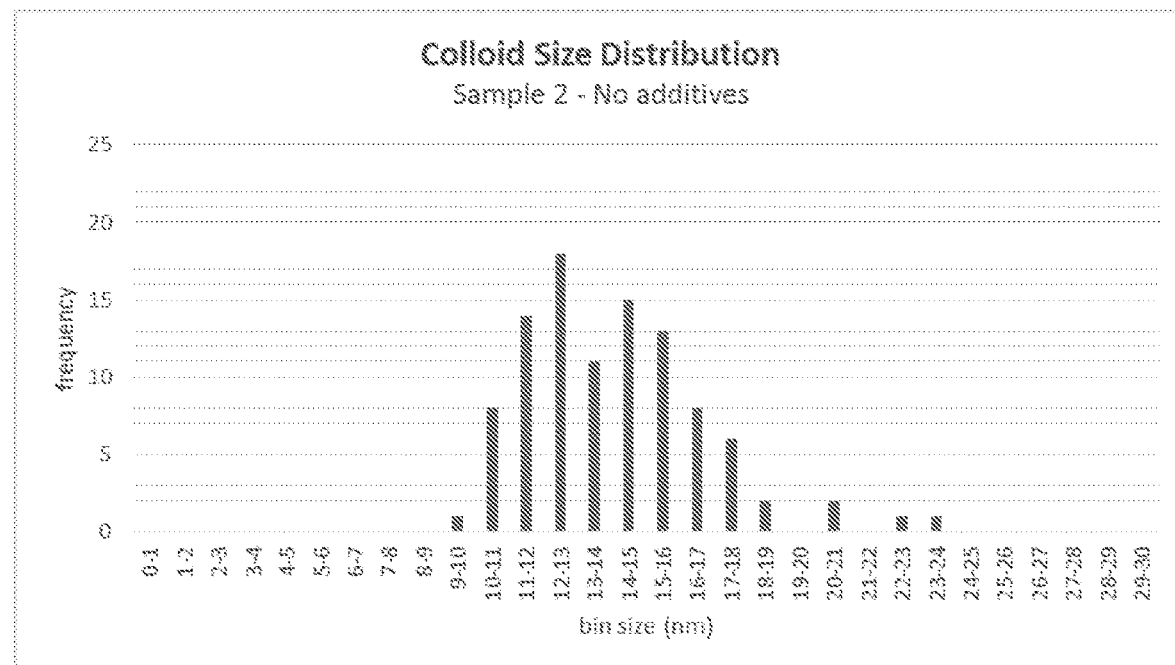
FIG. 18B shows a histogram of TEM measurements of silica colloids. This graph shows the size distribution (dispersity) of the colloidal silica concentrate (example 11).

TEM images were taken from the two 30 m % samples. These images are presented in FIGS. 17A and 18A for samples 1 and 2 respectively. Colloid size distribution (dispersity) is presented in FIGS. 17B and 18B for samples 1 and 2 respectively.

TABLE 9

Statistical analyses of TEM results for samples 1 and 2.

| Heat Treatment | | 97° C. for 60 hours | 97° C. for 94 hours |
|---|---|---|---|
| Parameter | unit | Sample 1 | Sample 2 |
| minimum | nm | 7.78 | 9.91 |
| maximum | nm | 20.62 | 23.38 |
| standard deviation | nm | 2.68 | 2.62 |
| median | nm | 12.78 | 13.81 |
| mode | nm | 13.76 | 12.39 |
| mean | nm | 13.20 | 14.05 |
| sample size | | 100 | 100 |
| 90% confidence error | nm | 0.44 | 0.43 |
| number mean diameter ($D_{[1,0]}$) | nm | 13.20 | 14.05 |
| volume mean diameter ($D_{[4,3]}$) | nm | 14.84 | 15.66 |
| surface mean diameter ($D_{[3,2]}$) | nm | 14.29 | 15.07 |
| polydispersity index (U) | | 1.12 | 1.11 |
| coefficient of variance ($C_v$) | | 20.27% | 18.68% |
| absolute span | nm | 7.43 | 6.14 |
| relative span | | 0.58 | 0.45 |

Conclusions

This example shows that the methods of the present invention can be successfully used to produce a high concentration, stable and substantially monodisperse colloidal silica concentrate. With regard to stability, the samples still had a viscosity of <10 mPa·s, suggesting that the natural alkalinity of the fluid has been enough to keep the product stable. This provides an unexpected benefit of using geothermal fluids to produce a colloidal silica concentrate.

Example 12—Acid Dosing

Materials and Methods

Two samples were dosed with acid to adjust the pH to 8.2, while two samples were left un-modified as the fluid entered the pilot plant. This was done to investigate the differences between an acid dosed sample and one that was not dosed. The samples were dosed to achieve a pH in the 10 m % UF2 retentate of 8.8 (with acid dosing of 81 ppm in the geothermal fluid) versus 9.5 (without acid dosing).

Results

The recovery in UF1 is determined by the dissolved silica losses in the UF filtrate stream. The greater the losses, the lower the UF recovery. Table 10 below shows the average monomeric silica lost through the UF filtrate with the acidified samples is between 228-240 ppm compared to 287 ppm without the addition of acid.

TABLE 10

Recovery of monomeric silica from UF filtrate.

| | | NO ACID | | ACID DOSING | |
|---|---|---|---|---|---|
| | | Sample Reference | | | |
| | units | 1 | 2 | 3 | 4 |
| Monomeric Silica | ppm | 286.8 | | 240.5 | 228.2 |

TABLE 11

Recovery of monomeric silica from UF filtrate.

| Element/Compound | (% solids-dry) | (ppm-wet) | (% solids-dry) | (ppm-wet) |
|---|---|---|---|---|
| silica | 93.2689 | 100730.4 | 93.6968 | 102129.5 |

TABLE 12

Effect of acid dosing on chemical composition at 30 m %.

| | | $[solute]_{sol}$ $CF[SiO_2]_c \times [solute]_{SGW}$ | |
|---|---|---|---|
| Species | UNIT | No Additives retained | Acid Only retained |
| silica | $SiO_2$ | 61.3% | 69.2% |
| calcium | Ca | 29.9% | 23.8% |
| potassium | K | 1.6% | 1.2% |
| aluminium | Al | 71.5% | 60.4% |
| sodium | Na | 0.7% | 0.4% |
| sulphur | S | 0.2% | 0.2% |
| chlorine | Cl | 0.0% | 0.0% |
| boron | B | 0.6% | 0.9% |
| lithium | Li | 0.5% | 0.4% |
| rubidium | Rb | 2.6% | 1.8% |
| strontium | Sr | 17.7% | 10.4% |

TABLE 13

Analysis of silica colloids with and without acid dosing at 30 m % silica concentration

| | | Without Acid | With acid dosing |
|---|---|---|---|
| minimum | nm | 7.48 | 7.23 |
| maximum | nm | 23.85 | 32.81 |
| standard deviation | nm | 3.23 | 2.99 |
| median | nm | 12.91 | 11.45 |
| mode | nm | 10.15 | 9.98 |
| mean | nm | 13.47 | 11.84 |
| sample size | | 100 | 99 |
| 90% confidence error | nm | 0.53 | 0.49 |
| number mean diameter ($D_{[1,0]}$) | nm | 13.47 | 11.84 |
| volume mean diameter ($D_{[4,3]}$) | nm | 15.90 | 16.25 |
| surface mean diameter ($D_{[3,2]}$) | nm | 15.05 | 13.89 |
| polydispersity index (U) | | 1.18 | 1.37 |
| coefficient of variance ($C_v$) | | 23.95% | 25.26% |
| absolute span | nm | 7.82 | 4.92 |
| relative span | | 0.61 | 0.43 |

Conclusions

Acid dosing to decrease pH was found to increase silica recovery during UF steps. It was also found to decrease the retention of other solutes thus providing a concentrate with higher purity as well as increased silica yield. Acid dosing has little effect on the dispersity of the colloids in the resultant concentrate.

Example 13—Effect of pH on Colloidal Silica Formation

Materials and Methods

Geothermal fluid samples were taken and reduced to a nucleating temperature of 40° C. and then stored in the laboratory oven at that same temperature. This was done at various induced pH, by injecting acid into the SGW prior to the heat exchanger. Aliquots of the sample were taken periodically and subjected to the colorimetric silicon-molybdate test, in order to determine the level of dissolved silica remaining. From the extent of dissolved silica disappearance, the amount of colloidal silica formation can be inferred. Three acid dosing scenarios were used—pH=8.9 (natural), pH=8.5 ([HCl]~50 ppm SGW) and pH=8.2 ([HCl] ~80 ppm SGW.

Results

Figure 20A:
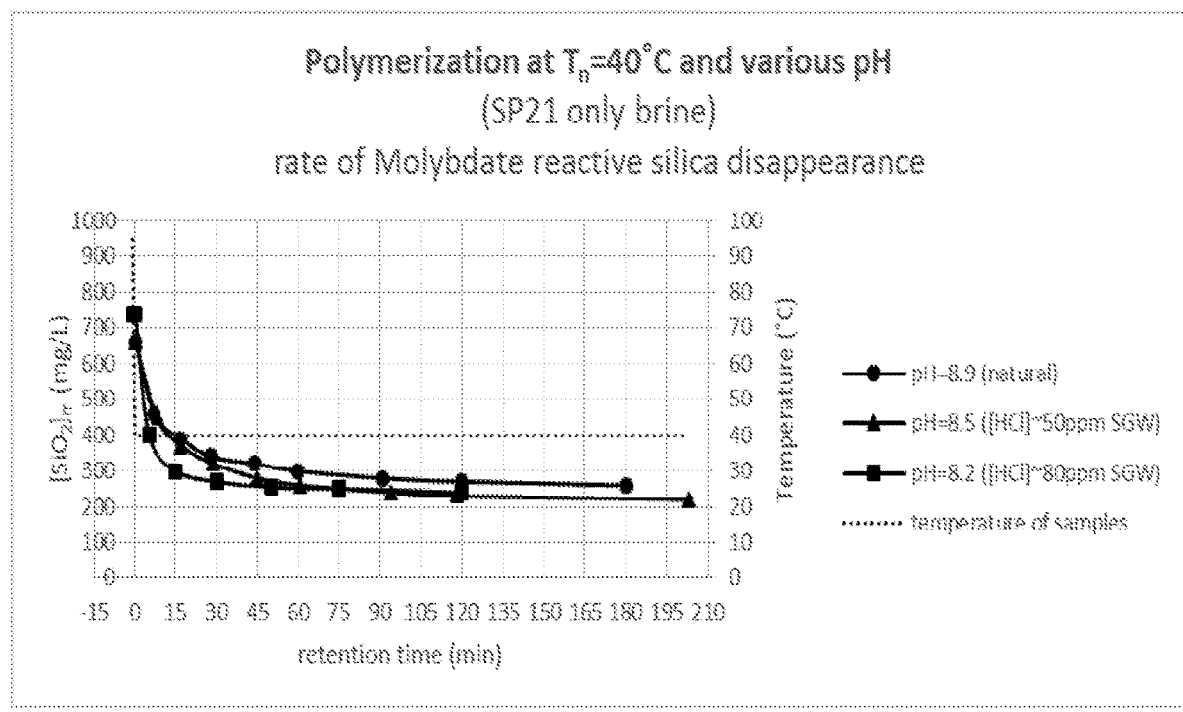
FIG. 20A shows silica recovery at differing nucleation pHs by rate of molybdate reactive silica disappearance as described in example 13.
Figure 20B:
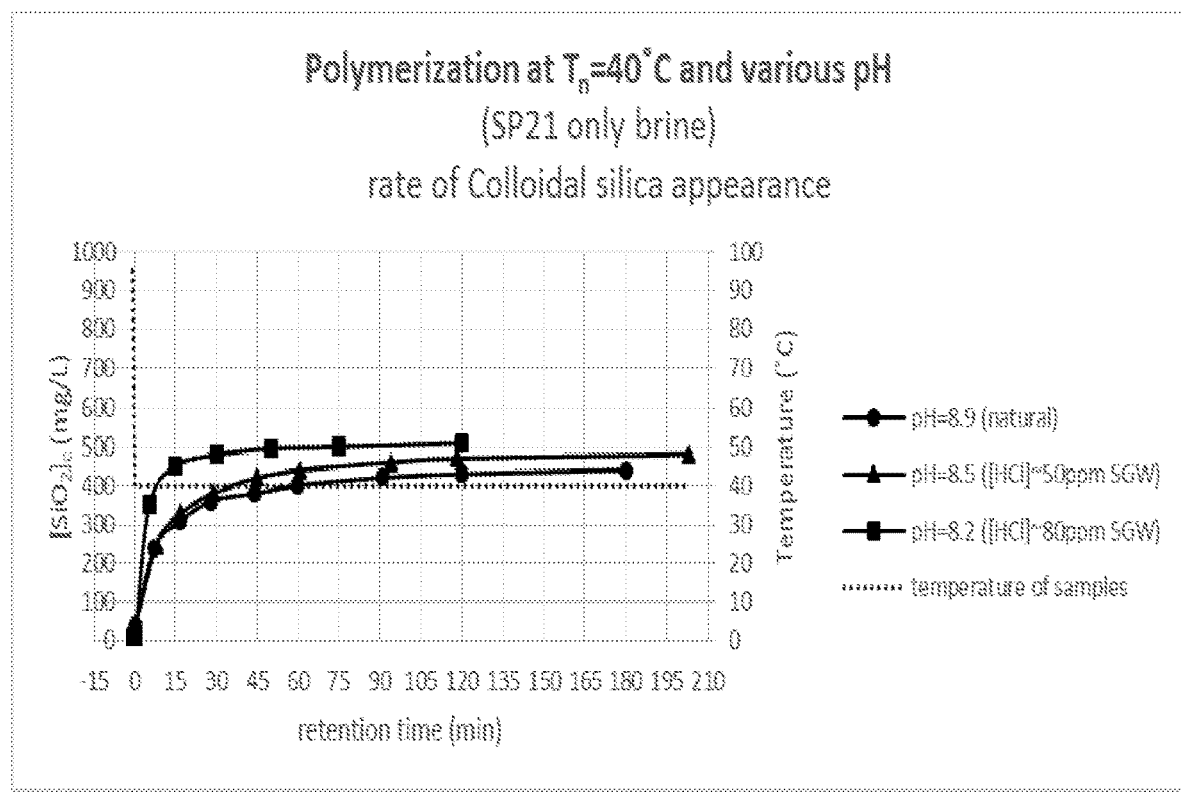
FIG. 20B shows colloidal silica production at differing nucleation pHs as described in example 13.

FIGS. 20A and 20B show that lowering the pH both increased the rate of reaction and recovery. The saturated silica is represented by where the curves plateau.

Conclusions

Acid dosing to achieve an initial pH of 8.2 at 40° C. required ~80 g HCl per tonne of SGW. This resulted in an extra ~70 ppm of recoverable colloidal silica, when compared to not acid dosing. Acid dosing to achieve an initial pH of 8.5 at 40° C. required ~50 g HCl per tonne of SGW. This resulted in an extra ~40 ppm of recoverable colloidal silica, when compared to not acid dosing. Based on these results, acid dosing provides an unexpected advantage and maximizes silica recovery.

REFERENCES

Harper et al. 1992—Towards the efficient utilization of geothermal resources. Geothermics 21, pp 641-651;
Harper, 1997—U.S. Pat. No. 5,595,717A—Controlled precipitation of amorphous silica from geothermal fluids or other aqueous media containing silicic acid.
R. K. Iler, The Chemistry of Silica, John Wiley & Sons, New York, (1979).
Sears, G. W. (1956) Analytical Chemistry, vol. 28, pp. 1981-1983.

The invention claimed is:

1. A method of producing a colloidal silica concentrate from a geothermal fluid comprising silica, the method comprising:
    a. cooling a geothermal fluid from an initial temperature of over about 85° C. to a nucleation temperature between about 25° C. and about 70° C. to initiate silica colloid growth;
    b. curing the geothermal fluid after cooling to produce an ultrafiltration (UF) feed with a mean silica colloid size of between about 3 nm and about 8 nm;
    c. treating the UF feed using ultrafiltration to yield a UF retentate;
    d. diafiltering the UF retentate during or after ultrafiltration to produce a colloidal silica concentrate;
wherein heat from the geothermal fluid recovered during the cooling from an initial temperature to the nucleation temperature is used to heat an ultrafiltration filtrate produced during ultrafiltration wherein the ultrafiltration filtrate is sent for reinjection to the ground.

2. A method as claimed in claim 1 wherein the step of cooling a geothermal fluid from an initial temperature of over 85° C. to a nucleation temperature occurs in a period of less than 20 seconds and/or continuously.

3. A method as claimed in claim 1 wherein the colloid particles have a polydispersity index of less than about 1.5.

4. A method as claimed in claim 1 wherein the method does not comprise the dosing of a dispersant.

5. A method as claimed in claim 1 wherein curing is carried out for a curing period sufficient to produce a mean silica colloid size of between 3 nm and 8 nm.

6. A method as claimed in claim 1 wherein the UF retentate comprises a silica concentration of between about 1 m % and about 15 m %.

7. A method as claimed in claim 1 wherein the step of diafiltering the UF retentate reduces salts content to less than 600 ppm salts.

8. A method as claimed in claim 1 wherein treating the UF feed using ultrafiltration comprises a first ultrafiltration step to yield a first UF retentate, wherein the silica concentration of the first UF retentate is between 1 m % and 7 m %, and a second ultrafiltration step to yield a second UF retentate, wherein the second UF retentate comprises a colloidal silica concentration of between about 8 m % and 15 m % and/or wherein the first or second UF retentate comprises silica colloids with a particle size of between 3 nm and 8 nm.

9. A method as claimed in claim 1 wherein ultrafiltration is carried out in at least one UF unit comprising a spiral wound membrane.

10. A method as claimed in claim 1 wherein the curing period is between about 10 minutes and 2 hours.

11. A method as claimed in claim 1 wherein the method of producing a colloidal silica concentrate includes further steps prior to step a. comprising:
    a. determining the pH of the fluid;
    b. if the pH of the fluid lies outside of the range of pH 8-9, adjusting the pH to be within this range.

12. A method as claimed in claim 1 wherein ultrafiltration yields a UF filtrate with a silica concentration of less than 300 ppm and/or wherein the first or further UF retentate is diafiltered prior to the colloidal silica concentration reaching 5 m %, and/or claims wherein the UF retentate is treated using heat curing to increase the mean silica colloid size.

13. A method as claimed in claim 1 wherein the UF retentate is treated using heat curing to increase the mean silica colloid size and wherein the heat cured UF retentate is treated using ultrafiltration to yield a colloidal silica concentrate of between about 15 m % and about 50 m %.

14. A method as claimed in claim 1 wherein the UF retentate is treated using heat curing to increase the mean silica colloid size and wherein heat curing comprises heating the UF retentate to a temperature and for a period sufficient to produce a colloidal silica concentrate with a mean silica colloid size of between about 8 nm and about 25 nm.

15. A method as claimed in claim 1 wherein the UF retentate is treated using heat curing to increase the mean silica colloid size and wherein heat curing is carried out at a temperature of between about 80° C. and about 180° C. and the colloid size in the colloidal silica concentrate is increased to between about 8 nm and about 30 nm.

16. A method as claimed in claim 1 wherein the UF retentate is treated using heat curing to increase the mean silica colloid size and wherein heat curing further comprises pressurisation of the first or further UF retentate.

17. A method as claimed in claim 1 wherein the UF retentate is treated using heat curing to increase the mean silica colloid size and wherein the heat cured UF retentate is treated using ultrafiltration to yield a heat cured UF retentate optionally comprising a silica concentration of between about 15 m % and about 50 m %, and wherein the ultrafiltration is optionally carried out in at least one UF unit comprising a tubular membrane.

18. A method as claimed in claim 1 further comprising a step of producing precipitated silica from the UF retentate after ultrafiltration or after heat curing wherein precipitated silica is produced by:
   a. addition a precipitant to the UF retentate or the heat cured UF retentate to produce a precipitant feed mixture
   b. settling the precipitant feed mixture to allow precipitated silica to settle; and
   c. removing the precipitated silica.

19. A method as claimed in claim 1 wherein the geothermal fluid after cooling is cured for a curing period of at least 10 minutes, and wherein ultrafiltration comprises:
   i. a first ultrafiltration to yield a first UF retentate comprising colloidal silica with a mean silica colloid size of between about 3 nm and about 8 nm;
   ii. a second ultrafiltration to yield a second UF retentate;
   wherein the first UF retentate is diafiltered before or during the second ultrafiltration;
   wherein the second UF retentate undergoes heat curing comprising heating the UF retentate to a temperature and for a period sufficient to produce a colloidal silica concentrate with a mean silica colloid size of between about 8 nm and about 25 nm;
   wherein the heat cured second UF retentate is treated using a further ultrafiltration to yield a colloidal silica concentrate of between about 15 m % and about 50 m %.

20. A method for producing a colloidal silica concentrate from a geothermal fluid comprising silica, the method comprising:
   a. receiving a silica concentrate of between about 5 m % and 15 m % produced from a geothermal fluid;
   b. heat curing the concentrate, wherein heat curing comprises heating the concentrate to a temperature and for a period sufficient to produce a colloidal silica concentrate with a mean silica colloid size of between about 5 nm and 120 nm, more preferably between about 8 nm and about 25 nm and wherein the colloid particles preferably have a polydispersity index of less than about 1.5;
   c. treating the heat cured concentrate using ultrafiltration to yield a colloidal silica concentrate of between about 15 m % and about 50 m %.

* * * * *

UNITED STATES PATENT AND TRADEMARK OFFICE
CERTIFICATE OF CORRECTION

PATENT NO. : 10,717,655 B2
APPLICATION NO. : 15/737178
DATED : July 21, 2020
INVENTOR(S) : Mitchelmore et al.

Page 1 of 1

It is certified that error appears in the above-identified patent and that said Letters Patent is hereby corrected as shown below:

On the Title Page

Item (54) and in the Specification, Column 1, Lines 1-2, should read:
Method of Production of a Silica Concentrate Signed and Sealed this
Tenth Day of November, 2020

Andrei Iancu
*Director of the United States Patent and Trademark Office*